United States Patent
Doronichev et al.

(10) Patent No.: US 9,911,238 B2
(45) Date of Patent: Mar. 6, 2018

(54) VIRTUAL REALITY EXPEDITIONS

(71) Applicant: Google Inc., Mountain View, CA (US)

(72) Inventors: Andrey Doronichev, San Francisco, CA (US); Ben Schrom, San Francisco, CA (US); Antonio Bernardo Monteiro Costa, San Francisco, CA (US); Ana Krulec, Santa Cruz, CA (US); Jon Bedard, New York, NY (US); Jennifer Holland, New York, NY (US); David Louis Bergman Quaid, New York, NY (US); Yunxin Zheng, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/165,855

(22) Filed: May 26, 2016

(65) Prior Publication Data

US 2016/0350977 A1    Dec. 1, 2016

Related U.S. Application Data

(60) Provisional application No. 62/167,206, filed on May 27, 2015.

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06F 3/013* (2013.01); *G06F 3/0482* (2013.01);
(Continued)

(58) Field of Classification Search
CPC ........ G06F 3/011; G06F 3/013; G06F 3/0482; G06F 3/04883; G06F 3/147; G06F 3/16;
(Continued)

(56) References Cited

U.S. PATENT DOCUMENTS

2004/0113935 A1    6/2004  O'Neal et al.
2005/0160368 A1    7/2005  Liu et al.
(Continued)

OTHER PUBLICATIONS

International Search Report and Written Opinion for PCT Patent Application No. PCT/US2016/034741, dated Sep. 5, 2016, 10 pages.

*Primary Examiner* — Jin-Cheng Wang
(74) *Attorney, Agent, or Firm* — Brake Hughes Bellermann LLP

(57) ABSTRACT

In a general aspect, a system can include a leader device. The leader device can include an interface configured to display a plurality of preview images, each preview image corresponding with respective virtual reality (VR) content. The leader device also include a selection device configured to select a preview image of the plurality of preview images and a leader application configured to control presentation of the respective VR content associated with the selected preview image. The system can further include a plurality of participant devices that are operationally coupled with the leader device. Each participant device of the plurality of participant devices can be configured to, responsive to the leader device, display at least one image included in the respective VR content corresponding with the selected preview image.

20 Claims, 46 Drawing Sheets

(51) Int. Cl.
- *G06F 3/0482* (2013.01)
- *G06F 3/0484* (2013.01)
- *G06F 3/0488* (2013.01)
- *G09B 5/06* (2006.01)
- *G09B 5/10* (2006.01)
- *H04N 5/232* (2006.01)
- *G09G 5/00* (2006.01)
- *G06F 3/147* (2006.01)
- *G06F 3/16* (2006.01)
- *H04W 4/20* (2018.01)

(52) U.S. Cl.
CPC ...... *G06F 3/04842* (2013.01); *G06F 3/04883* (2013.01); *G06F 3/147* (2013.01); *G06F 3/16* (2013.01); *G09B 5/065* (2013.01); *G09B 5/10* (2013.01); *G09G 5/003* (2013.01); *H04N 5/23238* (2013.01); *H04W 4/206* (2013.01); *G09G 2370/02* (2013.01); *G09G 2370/16* (2013.01)

(58) Field of Classification Search
CPC ........ G06T 19/006; G09B 5/065; G09B 5/10; G09G 2370/02; G09G 2370/16; G09G 5/003; H04N 5/23238; G06Q 50/14

USPC .................. 715/810, 863; 709/204; 345/633
See application file for complete search history.

(56) References Cited

U.S. PATENT DOCUMENTS

| | | | |
|---|---|---|---|
| 2010/0203868 A1* | 8/2010 | Sagie | G01C 21/20 455/414.1 |
| 2013/0215148 A1* | 8/2013 | Antonyuk | G06T 19/006 345/633 |
| 2013/0271560 A1* | 10/2013 | Diao | H04N 7/15 348/14.08 |
| 2013/0290421 A1* | 10/2013 | Benson | G06F 15/163 709/204 |
| 2014/0046829 A1* | 2/2014 | Serban | G06Q 20/123 705/39 |
| 2014/0089850 A1* | 3/2014 | Gorstan | G06F 3/0487 715/810 |
| 2014/0215356 A1* | 7/2014 | Brander | H04L 67/36 715/753 |
| 2015/0046822 A1 | 2/2015 | Kitch et al. | |
| 2015/0127486 A1* | 5/2015 | Advani | G06Q 30/0241 705/26.41 |
| 2016/0300392 A1* | 10/2016 | Jonczyk | G06T 19/003 |

\* cited by examiner

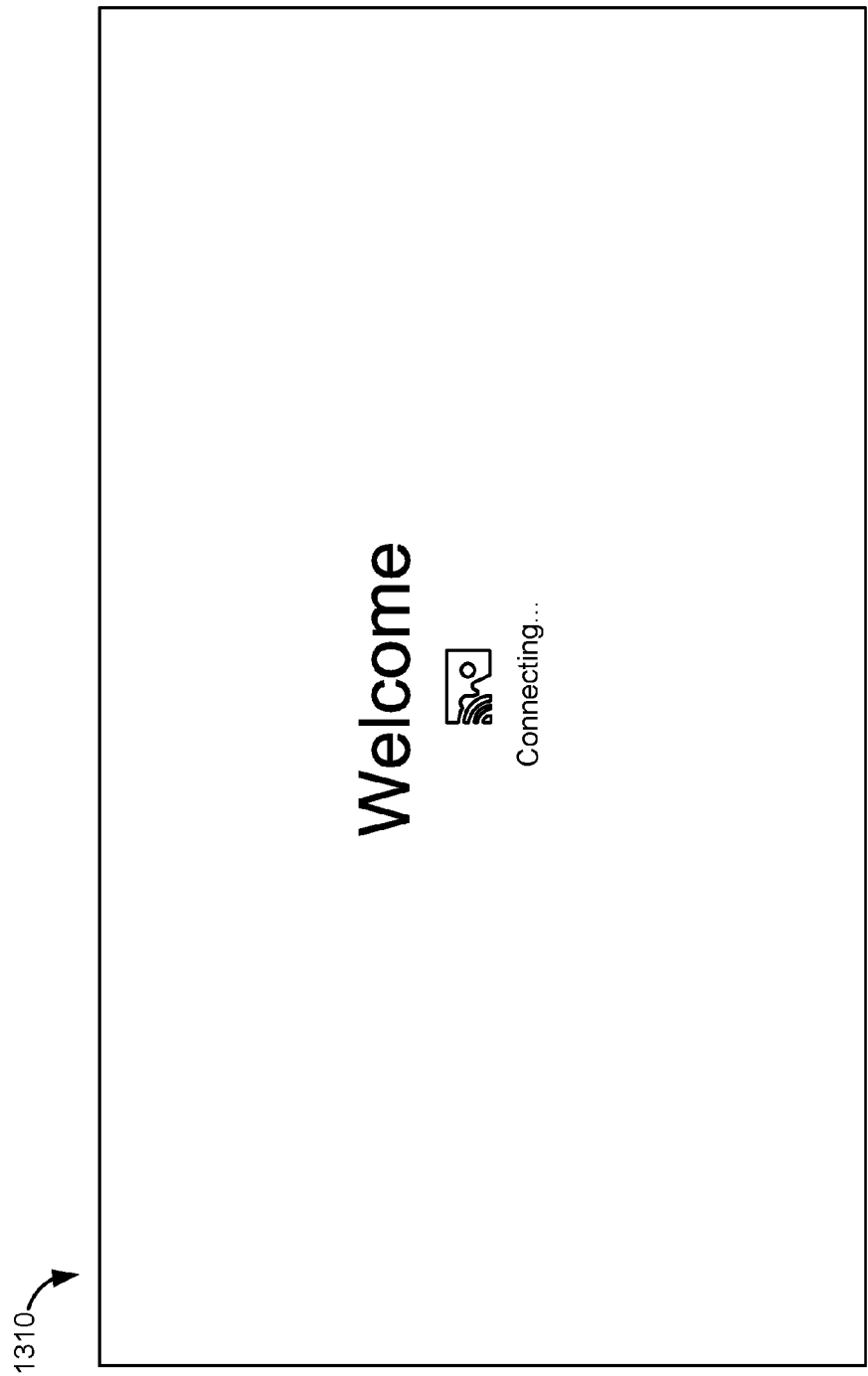

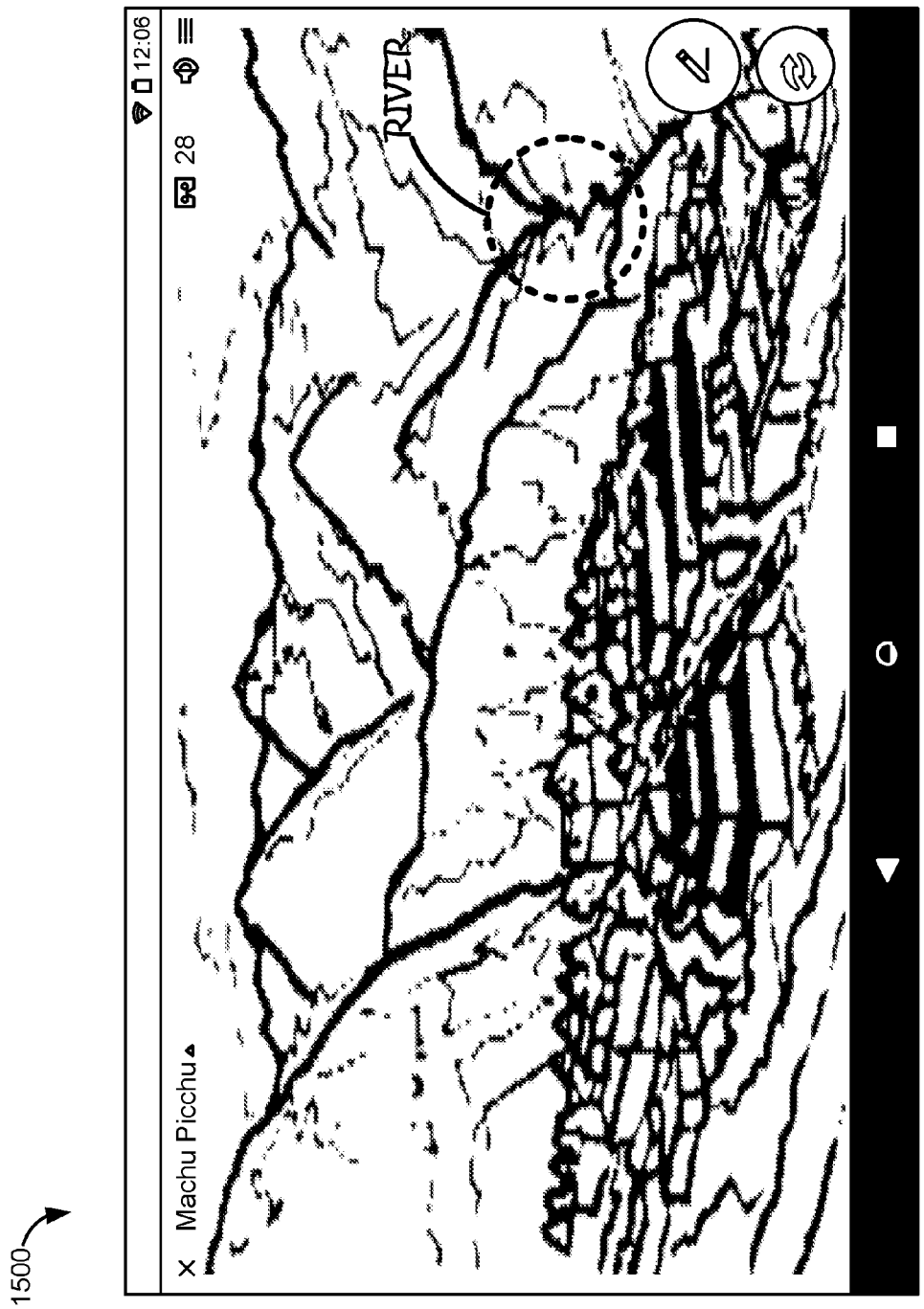

VIRTUAL REALITY EXPEDITIONS

CROSS-REFERENCE TO RELATED APPLICATION(S)

This application is a Nonprovisional of, and claims priority to, U.S. Patent Application No. 62/167,206, filed on May 27, 2015, entitled "VIRTUAL REALITY EXPEDITIONS", which is incorporated by reference herein in its entirety.

TECHNICAL FIELD

This description generally relates to the use of virtual reality (VR) content. More specifically, this description relates to presentation of VR content (e.g., in an educational setting) along with supplemental teaching and/or informational annotations and materials to provide an immersive, VR experience.

SUMMARY

In a general aspect, a system can include a leader device. The leader device can include an interface configured to display a plurality of preview images, each preview image corresponding with respective virtual reality (VR) content. The leader device can also include a selection device configured to select a preview image of the plurality of preview images and a leader application configured to control presentation of the respective VR content associated with the selected preview image. The system can further include a plurality of participant devices that are operationally coupled with the leader device. Each participant device of the plurality of participant devices can be configured to, responsive to the leader device, display at least one image included in the respective VR content corresponding with the selected preview image.

Implementations can include one or more of the following features. For example, the at least one image can include a three-dimensional (3D) panorama. The at least one image can include a 3D photosphere.

The system can include a data network router. The plurality of participant devices can be operationally coupled with the leader device via the data network router. The leader device can include a wireless data network interface. The plurality of participant devices can be operationally coupled with the leader device via the wireless data network interface.

The system can include at least one audio device that is configured to, responsive to the leader device, play audio content of the selected VR content associated with the selected preview image. The at least one audio device can be wirelessly coupled with the leader device. The at least one audio device can include a plurality of audio devices. Each audio device of the plurality of audio devices can be included in a respective participant device of the plurality of participant devices.

The interface can be configured, during presentation of the respective VR content associated with the selected preview image, to display a plurality of gaze indicators. Each gaze indicator of the plurality of gaze indicators can correspond with a respective participant device of the plurality of participant devices and indicating a location in the respective VR content associated with the selected preview image where a user of the respective participant is currently looking.

Each of the participant devices can include a VR visual content viewer.

The interface can be configured, during presentation of the respective VR content associated with the selected preview image, to display a panel including information corresponding with the respective VR content associated with the selected preview image. The leader device can be further configured to facilitate presentation of information from the panel. The presentation of information from the panel can include displaying a text annotation on the plurality of participant devices, playing an audio clip on at least one audio device that is operationally coupled with the leader device and/or displaying a map on the plurality of participant devices.

The interface can be configured, during presentation of the respective VR content associated with the selected preview image, to receive a selection indicating a point of interest in the respective VR content associated with the selected preview image. The plurality of participant devices can be further configured to, in response to the selection indicating the point of interest, display a marker in association with the selected point of interest. The marker, for each participant device, can indicate whether the point of interest is within or outside a respective field of view of the participant device. Receiving the selection indicating the point of interest can include receiving input on a touchscreen of the leader device within the interface. The marker can include an indication of a dwell time corresponding with the marker. The marker can be configured to disappear after expiration of the dwell time.

The system can include a container configured to store and charge the leader device and the plurality of participant devices The interface can include at least one button. Selection of a button of the at least one button on the leader device can concurrently control a corresponding function on each of the participant devices of the plurality of participant devices.

The interface can include an indication of a number of participant devices that are operationally coupled with the leader device.

In another general aspect, a system can include a leader device means. The leader device means can include an interface means for displaying a plurality of preview images. Each preview image can correspond with respective virtual reality (VR) content. The leader device means can further include a selection means for selecting a preview image of the plurality of preview images. The leader device means can still further include a leader application means for controlling presentation of the respective VR content associated with the selected preview image. The system can also include a plurality of participant device means that are operationally coupled with the leader device means. Each participant device means of the plurality of participant device means for, responsive to the leader device means, displaying at least one image included in the respective VR content corresponding with the selected preview image.

Implementations can include one or more of the following features. For example, the system can include a data networking means for operationally coupling the plurality of participant device means with the leader device means. The system can include an audio device means for, responsive to the leader device means, playing audio content of the selected VR content associated with the selected preview image.

BRIEF DESCRIPTION OF THE DRAWINGS

FIGS. 13A, 13B, 13C, 13D, 13E and 13F are diagrams illustrating status screen displays that can be implemented in conjunction with the system of FIG. 1, according to an implementation.

FIGS. 15A and 15B are diagrams illustrating use of hand-written notations in a VR expedition, according to an implementation.

Like reference symbols in the various drawings indicate like elements.

DETAILED DESCRIPTION

Figure 1:
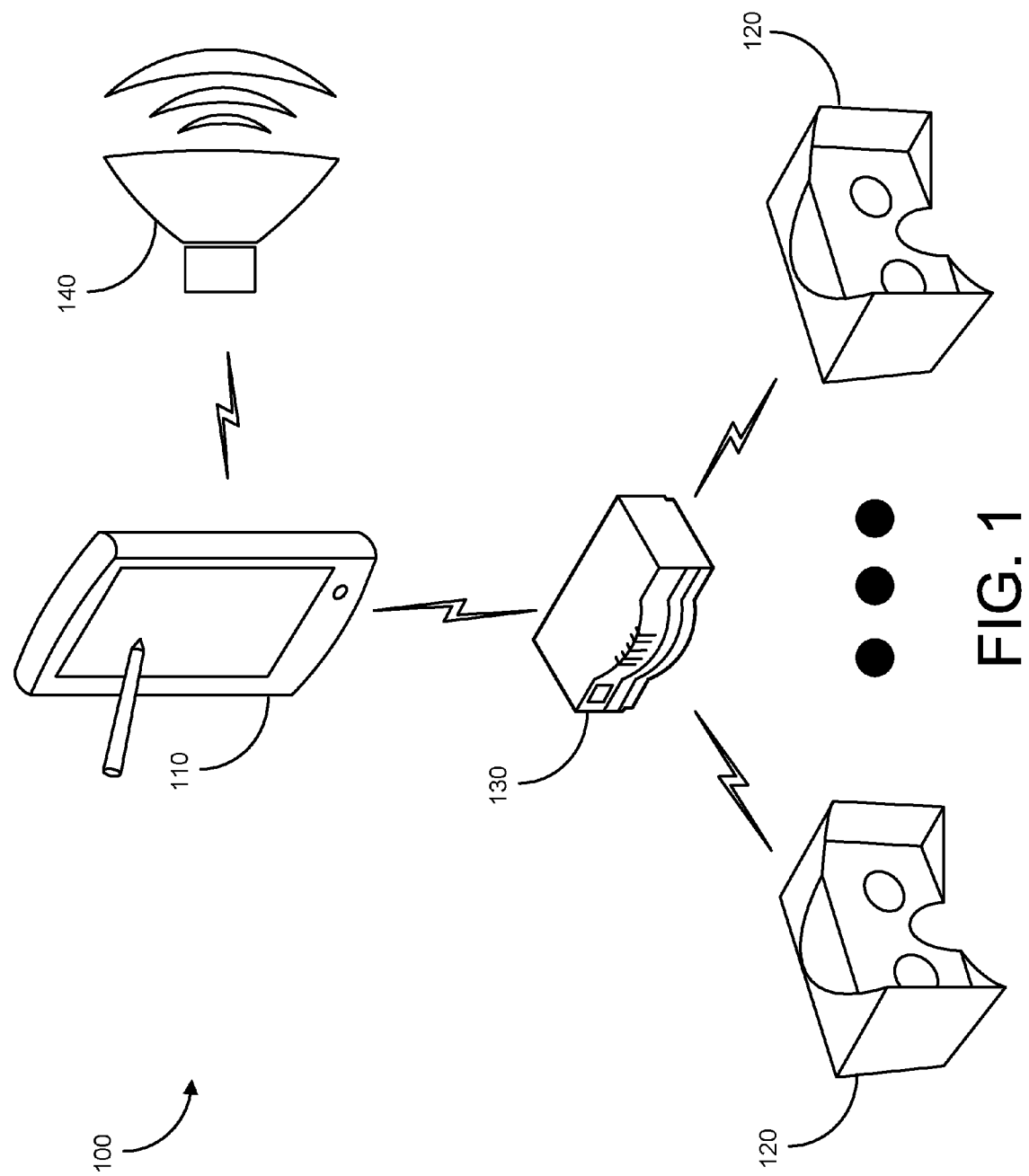
FIG. 1 is a diagram that illustrates a system for presenting informative and/or educational virtual reality (VR) content, according to an implementation.

The following description is generally directed to the use of virtual reality (VR) content (such as three-dimensional (3D) images, audio, informational annotations, etc.) in educational and/or instructional settings. It will be appreciated, however, that the approaches described herein can also be used in other settings, such as professional presentations, tradeshow presentations, conference presentations and so forth. Also, while the following description generally discusses the presentation of educational and/or informative materials using VR content, these approaches can also be used to present such materials using two-dimensional (2D) visual content, such as using a "magic-window" mode on a laptop computer, tablet, or other electronic device. For purposes of this disclosure, images, user interfaces, etc., may be shown as either 2D images or stereoscopic images, and are shown by way of illustration. In other implementation, other images, graphics, arrangements and/or approaches may be used, such as 3D video. For instance, accessibility features may be added/implemented. For example, increases in text size, audio prompts, or other features may be implemented in addition to, in conjunction with, and/or in place of features described herein.

In instructional settings, such as school classrooms, educational and informative materials can often fail to fully engage the attention of students and/or audience participants. The use of VR hardware and/or VR content, alone, or in conjunction with conventional educational and informative materials, can provide an immersive educational experience that more readily engages students and/or audience participants. For instance, VR hardware and/or VR content can be used by teachers and students to take VR field trips (which can also referred to VR expeditions or expeditions) to places in the world (or out of the world) that are not practically accessible via traditional field trips. For example, using the approaches described herein, teachers and students can take media-rich, immersive VR expeditions, in a classroom setting, to coral reefs around the world, outer space, the seven world wonders, museums around the world, and so forth.

Using the systems and techniques described herein, teachers (or other presenters) who want to more effectively engage their students (or audience) can use VR-hardware and VR-content to solidify and support teaching in conjunction with conventional materials, by making their lessons and presentations more engaging by incorporating VR expeditions. Such VR expeditions, due to their media-rich content, can be much more student immersive than conventional instructional materials (e.g., books, videos or slideshows).

In the following description, systems and techniques for taking (presenting, experiencing, etc.) VR expeditions are described. Such systems can include, at least, a content component, a software component and a hardware component. The specific components used can depend on the particular implementation.

Content for such VR expeditions (VR field trips) can include collections of high-resolution photographic panoramas or photospheres, along with other digital content, such as 3D video, audio (ambient sounds, narration, music, etc.), informational notations, and so forth. For instance, images implemented as part of a VR expedition can be high-quality, high-resolution stereoscopic images (e.g., 3D panoramas and/or photospheres) that provide an immersive 3D experience as part of a VR expedition. The content of a given VR expedition can be created by a content provider, such as an educational content supplier, by a teacher, by a student, and so forth.

As discussed herein, a VR expeditions system can include a virtual trip creation tool, where a teacher, student or otherwise can author a VR expedition. In other instances, content for VR expeditions can be provided on a subscription basis, where content of VR expeditions can be aligned with other curriculum materials such as textbooks, lesson plans, institutional requirements, etc. Content (e.g., visual content) for VR expeditions can be obtained from any number of available sources, such as existing image and/or video collections (e.g., Internet-based collections, private collections, etc.) by partnering with owners and/or custodians of such content.

Figure 2:
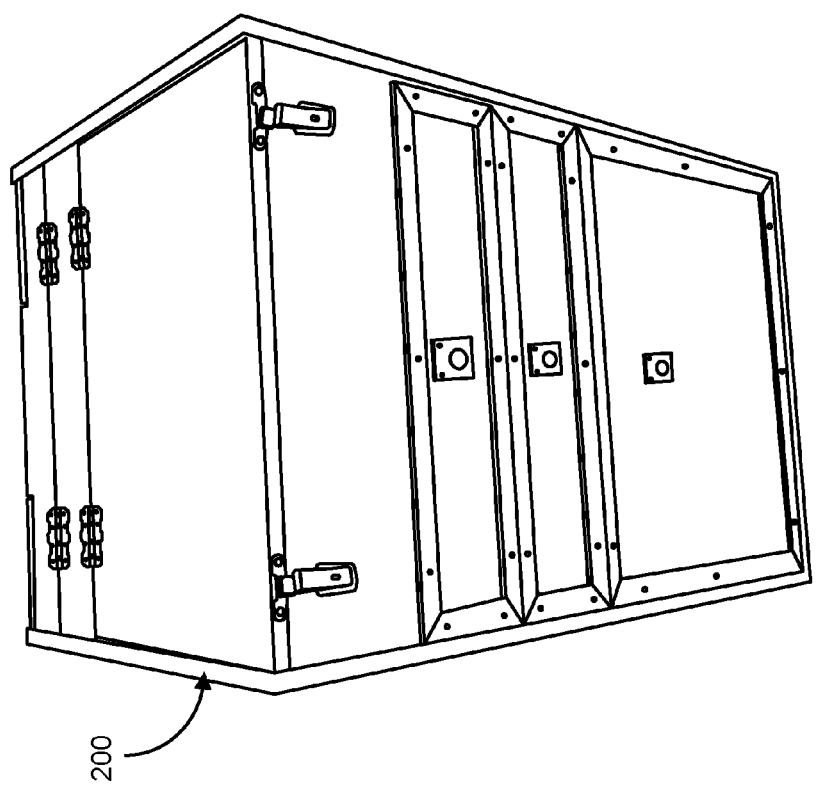
FIG. 2 is a drawing that illustrates a storage box and/or charging station for the components of the system of FIG. 1, according to an implementation.
Figure 3:
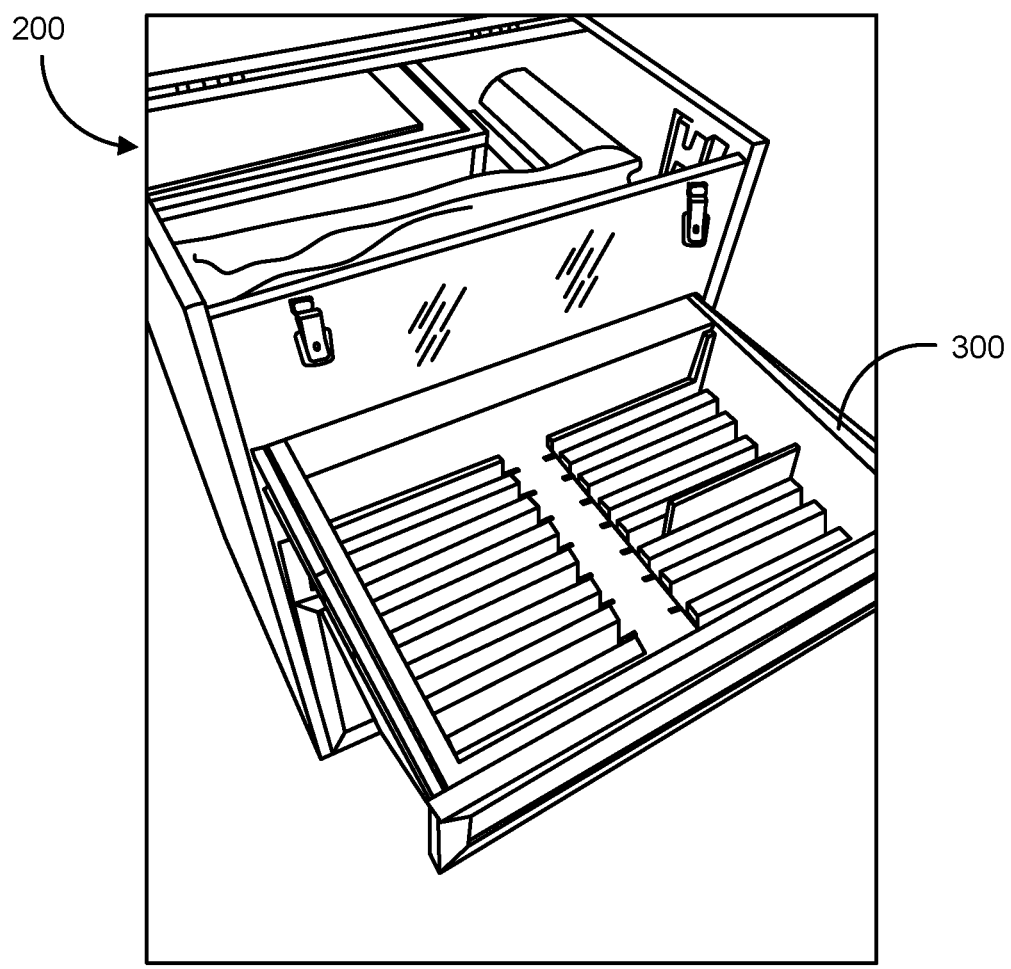
FIG. 3 is a drawing that illustrates a charging tray for the components of the system of FIG. 1, where the charging tray can be implemented in the storage box of FIG. 2, according to an implementation.

Example hardware and equipment that can be included in an example VR expeditions system is shown in FIGS. 1-3, which are discussed further below. Briefly, however, the hardware components of such a VR expeditions system (kit) can include a tablet computer (or other computing device) that is configured for use by the VR expedition guide (e.g., a teacher) to lead a VR expedition, VR viewers for explorers (e.g., students), a router (e.g., so a VR expedition can be run on a local network without need for Internet connectivity), a speaker (or speakers) to provide corresponding audio (ambient noises, soundtracks, narration, etc.) for the VR expedition and a durable box to transport, charge and store the other hardware of the system. Such hardware can be provided (sold) as a kit. In other instances, appropriate hardware can be obtained by a teacher, school, etc., where the content and software components for VR expeditions can then be downloaded and installed on that hardware.

In an example implementation, the software component(s) (application or app) can be implemented as two applications, a "guide" application (leader application, etc.) and an "explorer" application (participant application, etc.). In such an approach, the guide application can allow a guide (a teacher, instructor, presenter, etc.) to lead a group of explorers (students, audience members, etc.) through a VR field trip (VR expedition) by choosing what VR content the explorers view and by pointing out and discussing specific points of interest along the way. The explorer application allows a user to join a VR expedition, and be led through the expedition by a guide. In some implementations, the explorer application can be configured to operate in a single-user mode, e.g., to allow an explorer to take (experience) an unguided VR expedition.

FIG. 1 is a diagram that illustrates a system 100 for presenting informative and/or educational virtual reality (VR) content, in accordance with an implementation. As shown in FIG. 1, the system 100 includes a guide (e.g., teacher, leader, and so forth) device 110 that is configured to allow a guide to create, select and/or lead a VR expedition (VR field trip). While the guide device 110 in FIG. 1 is illustrated as a tablet computer, in other implementations, the guide device may take other forms, such as a laptop computer, a desktop computer, a netbook, etc.

The system 100 can also include a router 130 that is used to provide data connections between the guide device 110 and explorer (e.g., student, participant and so forth) devices 120. While the data connections in FIG. 1 are illustrated as being wireless connections, use of wired connections is also possible. In other implementations, the guide device 110 can operate as a wireless network hotspot. In such an approach, the router 130 could be omitted and the explorer devices 120 could connect directly with the guide (e.g., via a wireless data connection). In still other implementations, the system 100 could include other data and/or network devices, such as a modem (cable modem, fiber optic modem, etc.) to provide internet connectivity and/or a server computer to store VR expedition content, as some examples. In such approaches, the system 100 could be used in a remote teaching setting (e.g., over the Internet, such as for an online class or course).

In one implementation, the explorer devices 120 can each be implemented as a single, integrated device. For example, the explorer devices 120 can include an electronic device (e.g., smartphone, tablet, etc.) that is integrated (e.g., permanently installed) in a VR viewer (VR goggles). In such an implementation, a teacher and/or student would not have to insert/remove the electronic device from the VR viewer, which can reduce setup time in starting a VR expedition. Such integrated explorer devices 120 (as well as other implementations of explorer devices 120) can be configured to be efficiently packed in a storage and/or charging box/tray (such as the example implementations illustrated in FIGS. 2 and 3). In such an approach, when the explorer devices 120, and/or the guide device 110, are placed on such a charging tray or in a charging/storage box, the explorer devices 120 and/or the guide device 110 can be connected to a power supply and charged. The charging system can be wired and/or wireless.

The VR viewers of the explorer devices 120 can include a housing that is formed using plastic, rubber, or other material that is easy to keep clean and hygienic, such as would be desirable for shared use of explorer devices 120 in a classroom setting (e.g., by students in different classrooms). The batteries in the electronic devices of the explorer devices 120 should last for at least two hours of VR expedition(s), so that a student's VR expedition isn't cut short due to loss of battery power. In some implementations, the electronic devices of the explorer devices 120 can be configured to operate exclusively as part of an explorer device 120 for use in taking (experiencing) VR expeditions.

In other implementations, the electronic devices of the explorer devices 120 can be separable from (e.g., insertable to and removable from) the VR viewers of the explorer devices 120. In such implementations, the VR viewers can include VR optics and have housings made of plastic, so as to be durable and easy to clean that also allow for insertion and removal of a corresponding electronic device in the VR viewer, such as using a flap, door, or the like. In such an approach, the electronic devices of the explorer devices 120 can then be inserted in the VR viewers when starting a VR expedition and removed from the VR viewers of the explorer devices 120 after completing the VR expedition (e.g., to recharge the electronic devices). In such approaches, the electronic devices of the explorer devices 120 can be supplied to the students by the teacher and/or can be electronic devices that are owned by the students. Further, VR viewers of the explorer devices 120 can be given to students for their individual use (e.g., throughout a school year) or can be shared by multiple students (e.g. in different classrooms).

In other implementations, other types of VR viewers can be used to experience VR expeditions, such as cardboard VR viewers, which can reduce overall cost of a corresponding VR expeditions system. Of course, other types of VR viewers can also be used to implement the explorer devices 120. In still other implementations, the explorer devices 120 can be implemented using electronic devices (tablets, smartphones, notebooks, etc.) in a 2D "magic window" mode (e.g., without using a VR viewer). The guide device 110 and the explorer devices 120 can be preloaded with one or more VR expeditions so that they are ready for use "out of the box."

As shown in FIG. 1, the system 100 can also include a speaker 140 that is wirelessly connected with the guide device 110 (e.g., using a BLUETOOTH® connection). The speaker 140 may be configured to play audio associated with a VR expedition, such as ambient noises appropriate for the VR expedition, a soundtrack, narration of informative annotations or other information, and so forth. In other implementations, the speaker 140 may be connected with the guide device 110 using a wired connection. In still other implementations, each explorer device 120 can include an associated wireless or wired speaker 140 (or a headset) in place of the speaker 140 shown in FIG. 1. In some implementations, other approaches for providing sound associated with a VR expedition are possible, such as using internal speakers of the electronic devices of the explorer devices 120.

FIG. 2 is a drawing that illustrates a storage box 200 for the components (the guide device 110, the explorer devices 120, the router 130 and the speaker 140) of the system of FIG. 1, according to an implementation. As shown in FIG. 2, the storage box 200 can have the look of a wooden steamer trunk. In some instances, the box 200 can be ornamented with stickers representing virtual destinations for which students can take (experience) VR expeditions (virtual field trips), such as for VR expeditions that are preloaded in the components of the system 100. In an implementation, additional stickers could be provided that can be added to the box 200 (e.g., by the students) after taking (experiencing) corresponding VR expeditions.

In some implementations, the box 200 can also be configured as a charging station for the guide device 110, the explorer devices 120 and/or the speaker 140. For instance, the box 200 can include one or more charging trays that are configured to charge the guide device 110, the explorer devices 120 and/or the speaker 140 (e.g., either in wired charging cradles or using a wireless (e.g., inductive) charging system, such as a charging pad).

FIG. 3 is a drawing that illustrates a charging tray 300 for components (e.g., the guide device 110, the explorer devices 120 and/or the speaker 140) of the system of FIG. 1, where the charging tray 300 can be implemented in the storage box 200 of FIG. 2, according to an implementation. The charging tray 300 is shown by way of example and other arrangements and/or configurations are possible. The particular arrangement of the charging tray 300 will depend, at least in part, on the electronic devices used to implement the guide device 110, the explorer devices 120 and/or the speaker 140.

The charging tray 300 can include a corresponding charge level indicator (not shown) for each of the devices (guide device 110 and explorer device 120) that is charging on the tray 300. In an implementation, each charge level indicator could include, e.g., one or more light emitting diodes (LEDs). For instance, a red LED could be used to indicate that corresponding device is charging, while a green LED could be used to indicate that the corresponding device is fully charged. Of course, other approaches for implementing a charge level indicator are possible.

Figure 4:
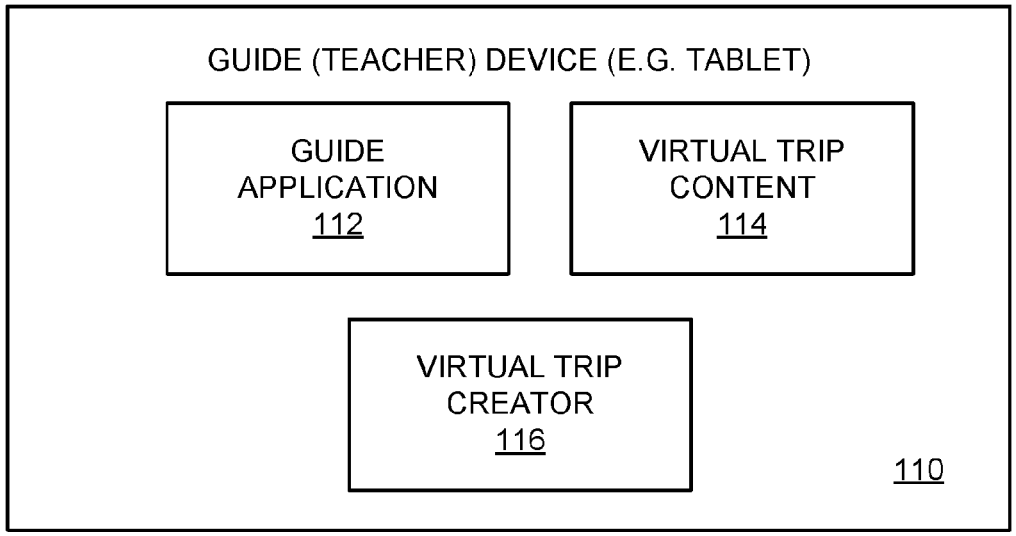
FIG. 4 is a block diagram illustrating a guide (teacher) device that can be used in the system of FIG. 1, according to an implementation.

FIG. 4 is a block diagram illustrating a guide (teacher, leader, etc.) device that can be used to implement the guide device 110 of the system of FIG. 1, according to an implementation. As discussed above, the guide device 110 can include a tablet computer, as shown in FIG. 1. In other implementations, the guide device 110 can take other forms, such as a laptop computer, a netbook, and so forth. In the system 100, while a single guide device 110 is shown, in other implementations, multiple guide devices 110 could be used, such as in a co-teaching setting. For purposes of illustration, the guide device 110 will be described with respect to its use in the system 100 shown in FIG. 1. In other implementations, the guide device 110 can be used in other VR systems to present and/or experience VR content, such as VR expeditions.

As shown in FIG. 4, the guide device 110 can include a guide application 112 that is used to select and lead VR expeditions (presentations, etc.). The guide device 110 can also include virtual trip content 114 that includes VR content (such as 3-D images, audio, informative notations, and so forth) for one or more associated VR expeditions. Examples of such content that can be included in VR expeditions are described herein. The guide device 110 can also include a virtual trip creator 116 that is configured to allow a teacher, a student, etc., to author a new VR expedition or customize an existing VR expedition, such as is discussed in further detail below.

In the guide device 110 shown in FIG. 4, the guide application 112 can be configured to allow a teacher (or other person) leading a VR expedition to select and launch a specific VR field trip (VR expedition) for students using associated explorer devices 120 (in the system 100) to participate in the selected VR expedition. The guide application 112 can also be configured to allow the teacher leading the VR expedition to select a specific VR panorama or VR photosphere (from a plurality of panoramas/photospheres that are included in a selected VR expedition), or to move the students participating in the VR expedition from one panorama/photosphere to another panorama/photosphere of the VR expedition. Selected VR panoramas or photospheres may then be displayed to (viewed by) participating students with the explorer devices 120 (e.g., using an explorer application). The guide application 112 can also allow a VR expedition leader (teacher) to view a number of students that are connected to a current VR expedition (e.g., how many explorer devices 120 are connected in the system 100) and are ready to take (experience) the selected VR expedition.

Further, in certain embodiments, the guide application 112 can be configured to allow the teacher (leader) to view curated talking points associated with specific places or things within a selected panorama or photosphere, and/or present those curated talking points to students via the connected explorer devices 120 and/or the speaker 140 (e.g., using text, audio and/or graphics, as some examples). The guide application 112 can also be configured to allow the teacher (leader) to direct student's (participant's) attention to specific places or items in a selected VR panorama or photosphere, such as using the techniques described herein. The guide application 112 can also be configured to indicate to the teacher where each student is currently looking (gazing) in the selected panorama or photosphere. Additionally, the guide application 110 can allow the teacher to turn audio on/off, start/pause/restart a VR expedition and/or exit a VR expedition. In other implementations, the guide application 110 can be configured to allow the teacher (leader) to perform other actions when leading a VR expedition, such as those described herein.

In some implementations, the guide application 112 can also be configured to provide for a student feedback mechanism. Such a feedback mechanism can be used by student to affirm their understanding and/or ask questions. For instance, students could give a thumbs-up as a "Yes!" or a thumbs-down as a "No!", where a given student's gesture is captured by a camera of the student's explorer device 120, interpreted as a "Yes" or a "No" and communicated to the teacher on the guide device 110. In an implementation, students can use a "hotword" (e.g., that can be captured by a microphone included in the explorer device 120), or by clicking into a menu tucked in a corner of a VR panorama or photosphere currently being viewed to indicate they wish to ask a question. The student may then be prompted to speak their question, where the question is either transcribed and/or saved as audio and communicated to the teacher (leader) via the router 130 and the displayed or played on the guide device 110 (or through played though the speaker 140).

Figure 5:
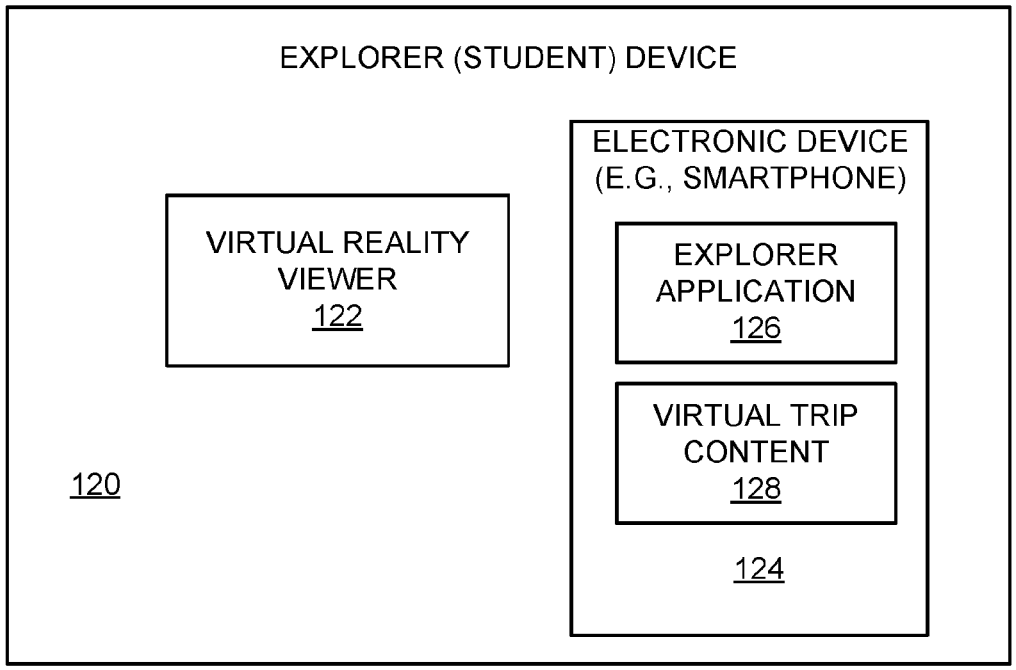
FIG. 5 is a block diagram illustrating an explorer (student) device that can be used in the system of FIG. 1, according to an implementation.

In the guide device 110 shown in FIG. 4, the virtual trip creator 116 can be configured to allow for the creation of new VR expeditions and/or to customize existing VR expeditions. For example, the virtual trip creator 116 can be configured to support combining photospheres into a new VR expedition and for adding annotations within the 3D space of the new VR expedition. The virtual trip creator 116 can also be configured to allow for adding user-created annotations to existing VR expeditions, whether newly created VR expeditions or existing VR expeditions, such as VR expeditions obtained from a content provider. The addition of user-created annotations can include allowing for changing positioning of indicated points-of-interest within a VR panorama or photosphere, adding 3D models to the 3D space, adding multiple choice questions for students to answer during a VR expedition and/or embedding documents (or hyperlinks to documents) in the 3D space of a VR expedition FIG. 5 is a block diagram illustrating an explorer (student) device that can be used to implement the explorer (participant, etc.) device 120 in the system of FIG. 1, according to an implementation. As discussed above, the explorer device 120 can be an integrated device or can be implemented using separate components. For purposes of illustration, as with the guide device 110, the explorer device 120 will be described with respect to its use in the system 100 shown in FIG. 1. In other implementations, the explorer device 120 can be used in other VR systems to present and/or experience VR content, such as VR expeditions.

As shown in FIG. 5, the explorer device 120 can include a VR viewer 122 (e.g., VR goggles) and an electronic device 124. The electronic device 124 can be a smart phone, a tablet or other appropriate electronic device. As illustrated in FIG. 5, the electronic device 124 of the explorer device 120 can include an explorer application 126 and virtual trip content 128. In some implementations, the virtual trip content 128, can be persistently stored on the electronic device 124, while in other implementations, the virtual trip content can be loaded onto the electronic device 124 once a VR expedition is selected by a teacher (leader), e.g., using the guide application 112 on the guide device 110. In other implementations, other approaches can be used for loading the virtual trip content 128 onto the electronic device 124, such as by downloading a single-player VR expedition (including associated virtual trip content) to the explorer device 120.

In the explorer device 120 of FIG. 5, the explorer application 126 can be configured to allow a student participating in a VR expedition to freely view (explore) a VR panorama or photosphere, where movement of the student's head that is detected by the electronic device 124 (e.g., using an accelerometer) is used to move the student's view within the VR panorama or photosphere. The explorer application 126 can also be configured to indicate to the student (e.g., using a site marker or set of site markers) that the teacher wishes to draw attention to a specific point or object in a VR panorama or photosphere currently being viewed. A student can then (using head movements) explore (move his or her gaze point) to view the indicated point of interest. Examples of such site markers are described in further detail herein.

The explorer application 126 can be further configured to allow students to take a "selfie" in a VR expedition. For instance, students can use an input device included in the explorer device 120 to take screenshot of a place in the VR expedition that they like. After the VR expedition is complete, the student can then be prompted to take a picture of himself or herself with a camera of the explorer device 120. The explorer application 126 can then overlay that picture of the student with the screenshot the student took while in the VR expedition. Such photos could then be saved on a shared drive that is accessible to the all of the students (participants) and the teacher (leader) to view as a reminder of their VR expedition.

FIGS. 6A-17 are diagrams illustrating various user interfaces, status screens and images that can be used in the system 100 as part of leading and participating in VR expeditions. These various user interfaces, status screens and images are given by way of example and for purposes of illustration. In other implementations other user interfaces, status screens and/or images having different appearances and/or arrangements could be used for leading and participating in VR expeditions. Further, the various features of the user interfaces, status screens and images shown in FIGS. 6A-17 can be used in conjunction with each other, where appropriate in a given implementation. While a feature of one approach may not be specifically described with respect to another approach, such inclusion or omission does not preclude or require the use of that feature in either approach. Further, for purposes of illustration, the approaches illustrated in FIGS. 6A-17 will be described with respect to their implementation in the system 100 of FIG. 1. Such approaches can, however, be implemented in other systems.

FIGS. 6A, 6B, 6C, 6D, 6E and 6F are diagrams illustrating a user interface 600 for selecting and/or presenting a VR expedition (field trip), according to an implementation. In the user interface 600, available VR expeditions are shown using preview images. For instance, in FIG. 6A, a Coral Reefs VR expedition preview image 640 is shown. A teacher can select this VR expedition using, for example, touch-screen input on the guide device 110 or other selection mechanism, such as using a mouse or trackpad to point at and click on the preview image 640. As also shown in FIG. 6, the user interface 600 includes a navigation and control menu (or drawer) icon 610, a filter menu icon 620 and a search icon 630. Example operations associated with each of these icons are described below with respect to FIGS. 6B-6E.

Figure 6A:
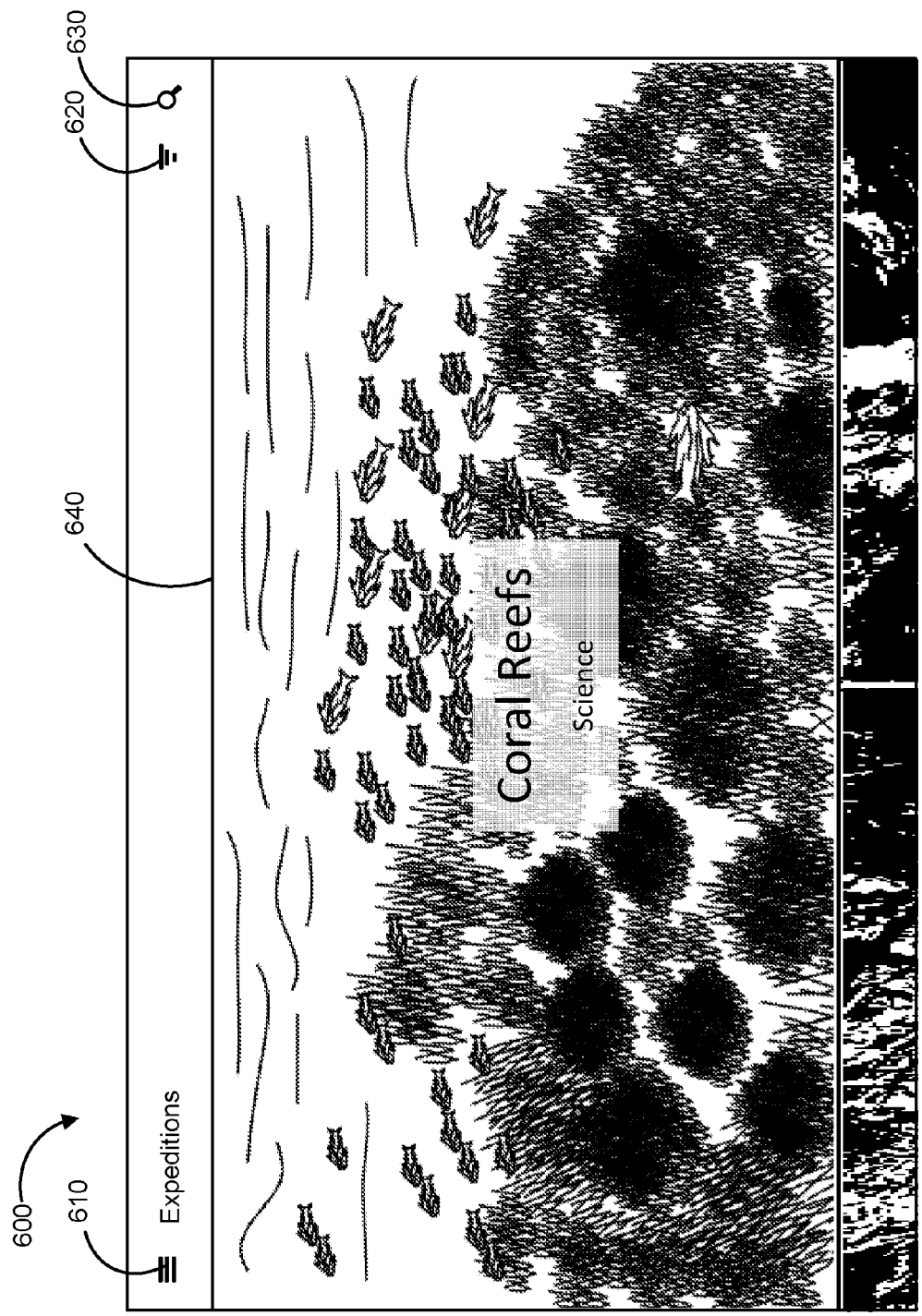
FIGS. 6A, 6B, 6C, 6D, 6E and 6F are diagrams illustrating a user interface for selecting and/or presenting a VR expedition (field trip), according to an implementation.
Figure 6B:
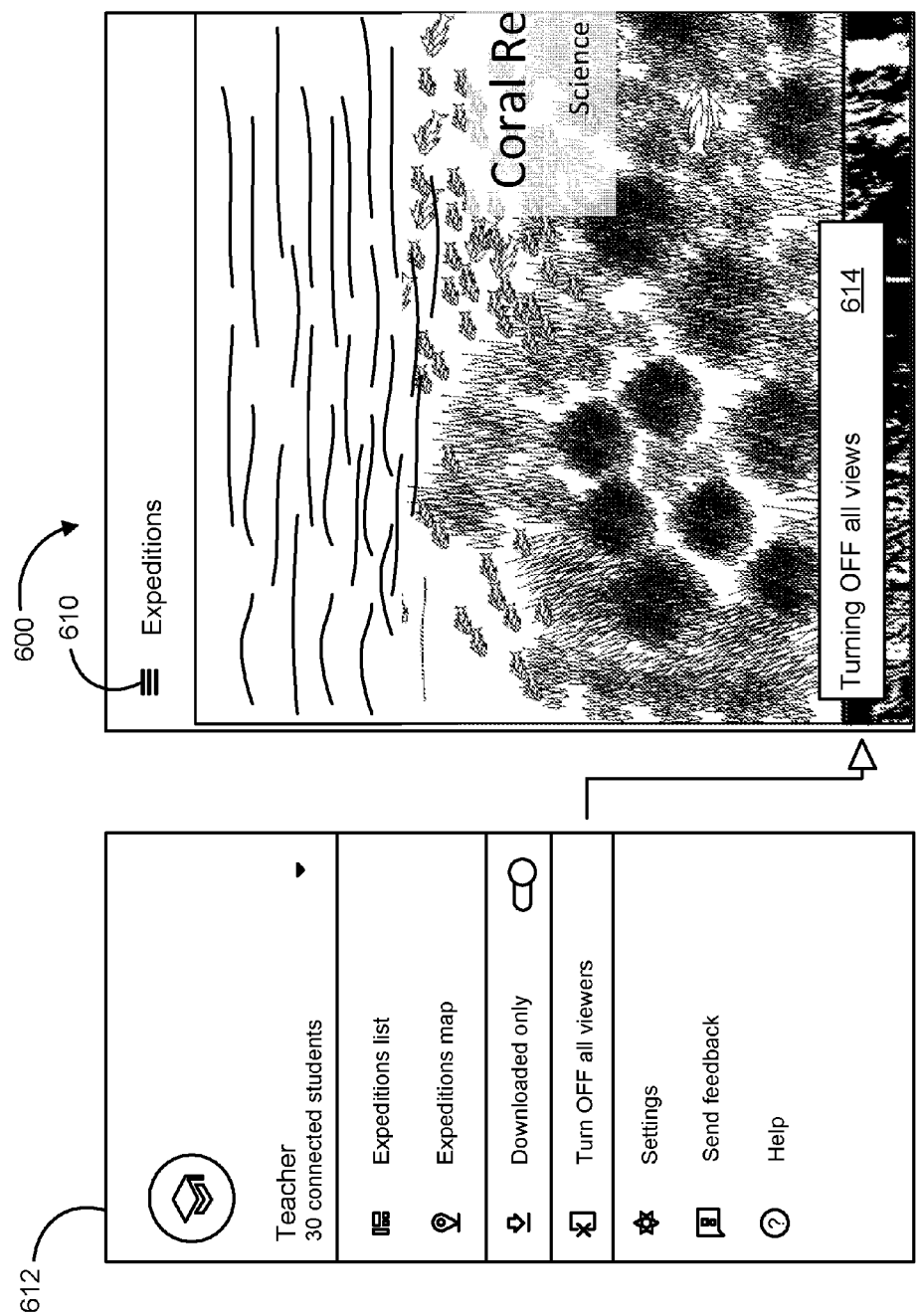

As shown in FIG. 6B, selecting the navigation and control menu icon 610 on the guide device 110 can result in a navigation control menu (drawer) 612 opening on the guide device 110. From the menu 612, the teacher can view the number of students connected in the system 100 (e.g., the number of students ready to participate in a VR expedition), view a list of available VR expeditions, view a map showing respective geographic locations of available VR expeditions, set a filter to show only downloaded VR expeditions, turn on/off explorer devices 120 participating in a VR expedition, access other settings, send feedback on the VR expeditions system and/or obtain help.

Figure 6C:
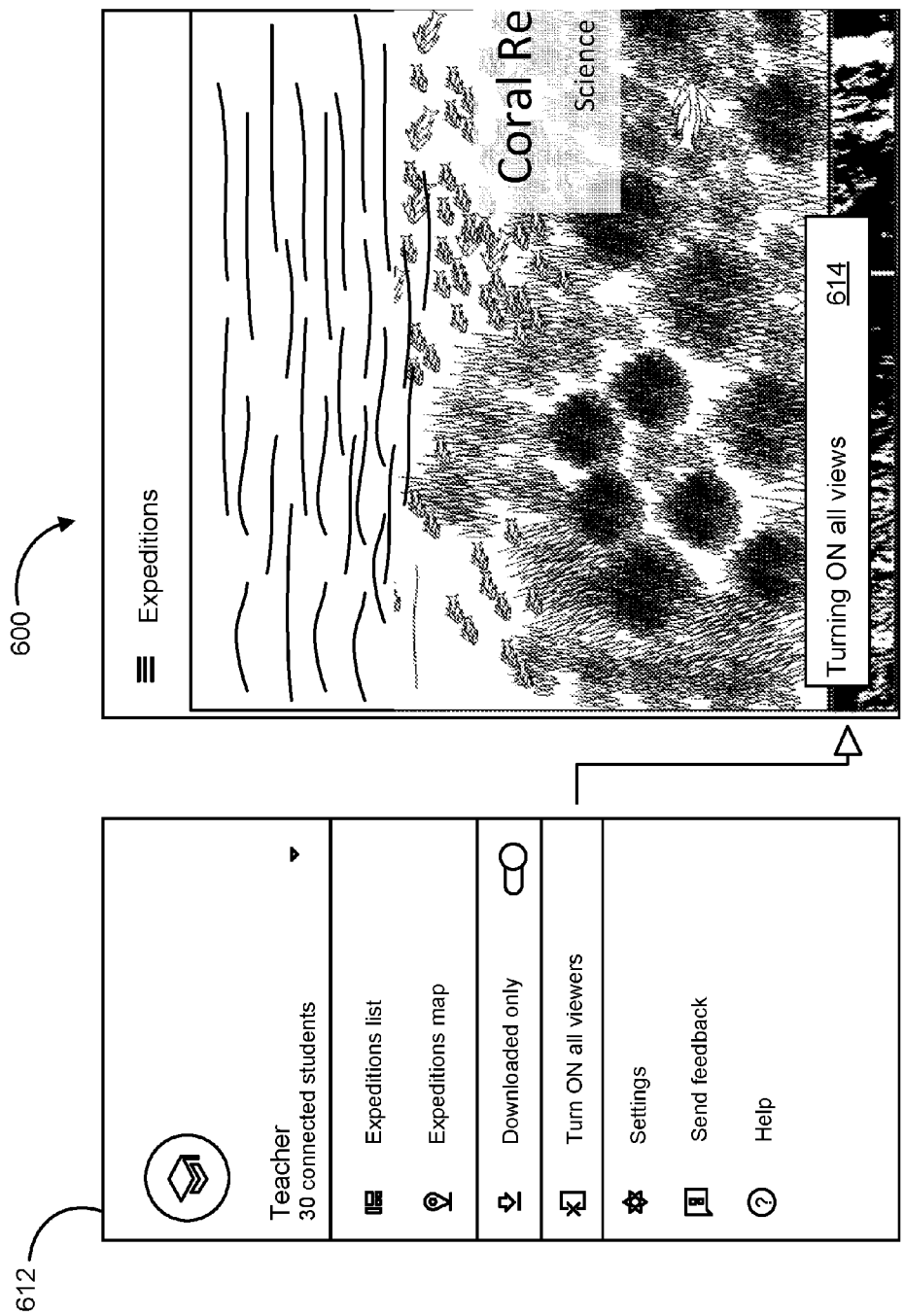

As shown in FIG. 6B, the "Turn OFF all viewers" option on the menu 612 has been selected. As shown by the status notification box 614, this selection results in all explorer devices 120 being turned off (e.g., disconnected from a VR expedition). Once all the explorer devices 120 have been turned off, this menu option can change to a corresponding option to turn on all connected explorer devices 120. As shown in FIG. 6C, the "Turn ON all viewers" option on the menu 612 has been selected, which results in all explorer devices 120 being turned on (e.g. connected with a VR expedition).

Figure 6D:
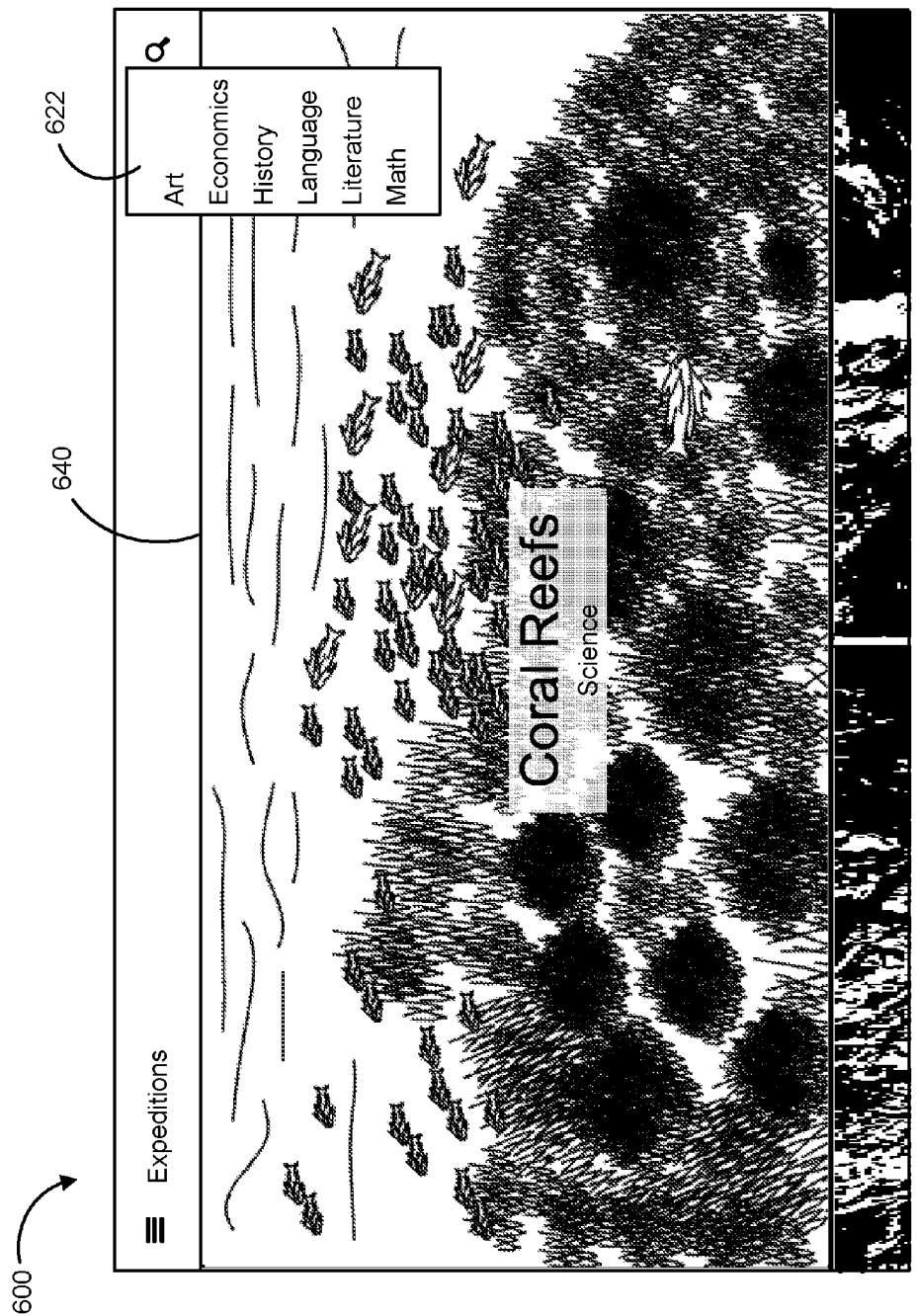

As shown in FIG. 6D, selecting the filter menu icon 620 (e.g., as shown in FIG. 6A) on the guide device 110 can result in a filter menu 622 opening on the guide device 110. From the menu 622, a teacher can select a particular subject matter area and the displayed preview images can be filtered based on that selection to only show available VR expeditions in the selected subject matter area.

Figure 6E:
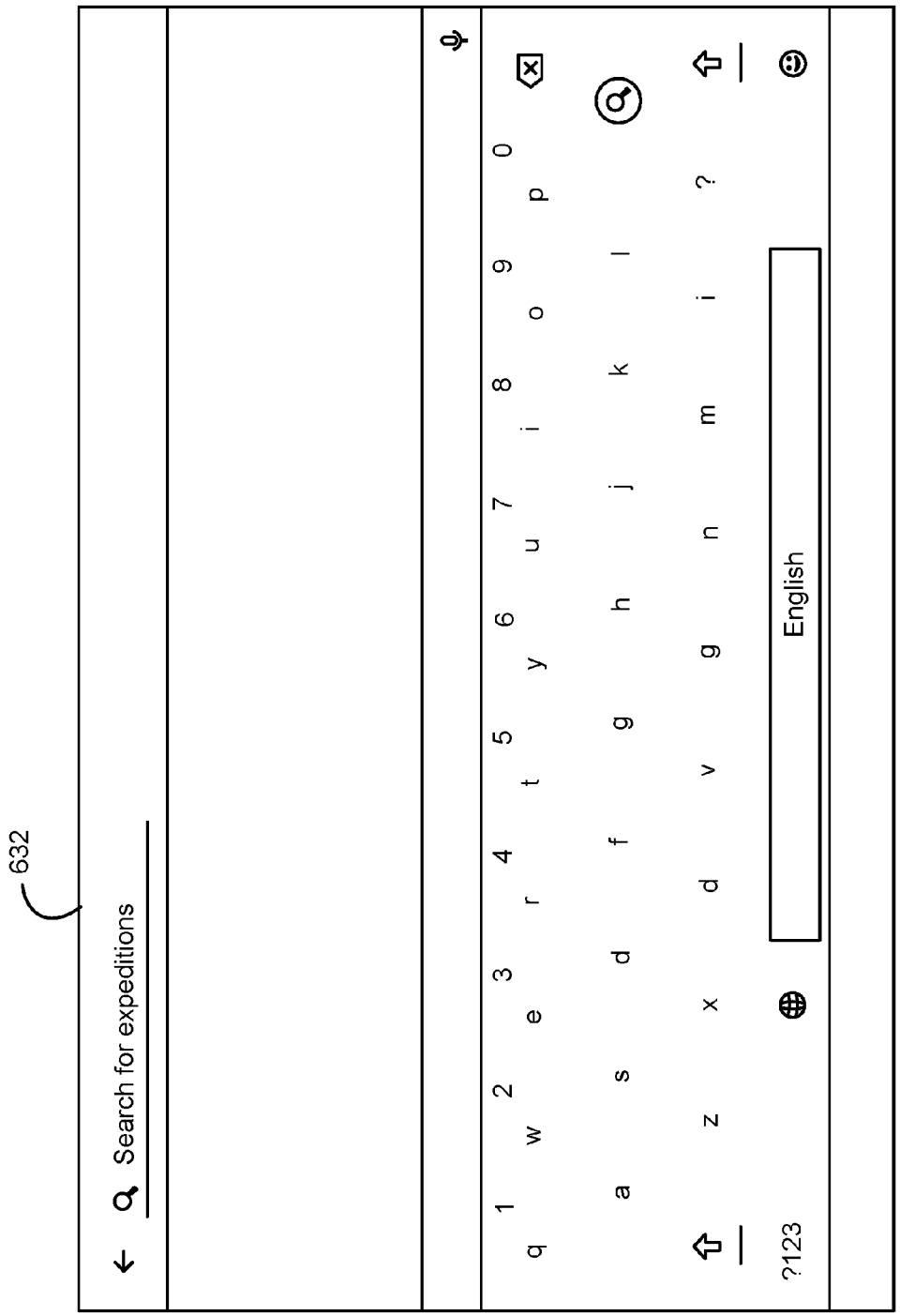

As shown in FIG. 6E, selecting the search icon 630 (e.g., as shown in FIG. 6A) from the user interface 600 on the guide device 110 can result in search screen 622 opening on the guide device 110. From the search screen 632, a teacher can search for VR expeditions by name. For example, if a teacher wants to lead a VR expedition of famous museums, the teacher could search on the term "museums" or, alternatively, search for a specific museum such as the "Louvre", as an example.

Figure 6F:

As shown in FIG. 6F, the user interface 600 of FIG. 6A can be scrolled (e.g. using a touchscreen gesture) to page up or down through a plurality of preview images corresponding with available VR expeditions. For instance, a preview image 642 for a Frontiers of Flight VR expedition is shown in FIG. 6F (e.g., after paging or scrolling down from the view shown in FIG. 6A). Also illustrated in FIG. 6F, as compared with FIGS. 6A-6D, the menu and icons along the top of the user interface 600 may disappear (auto-hide), such as after a timeout. In such an approach, the menu and icons may reappear in response to interaction with the guide device 110 (e.g., interaction with a button and/or touchscreen of the guide device 110).

Figure 7A:
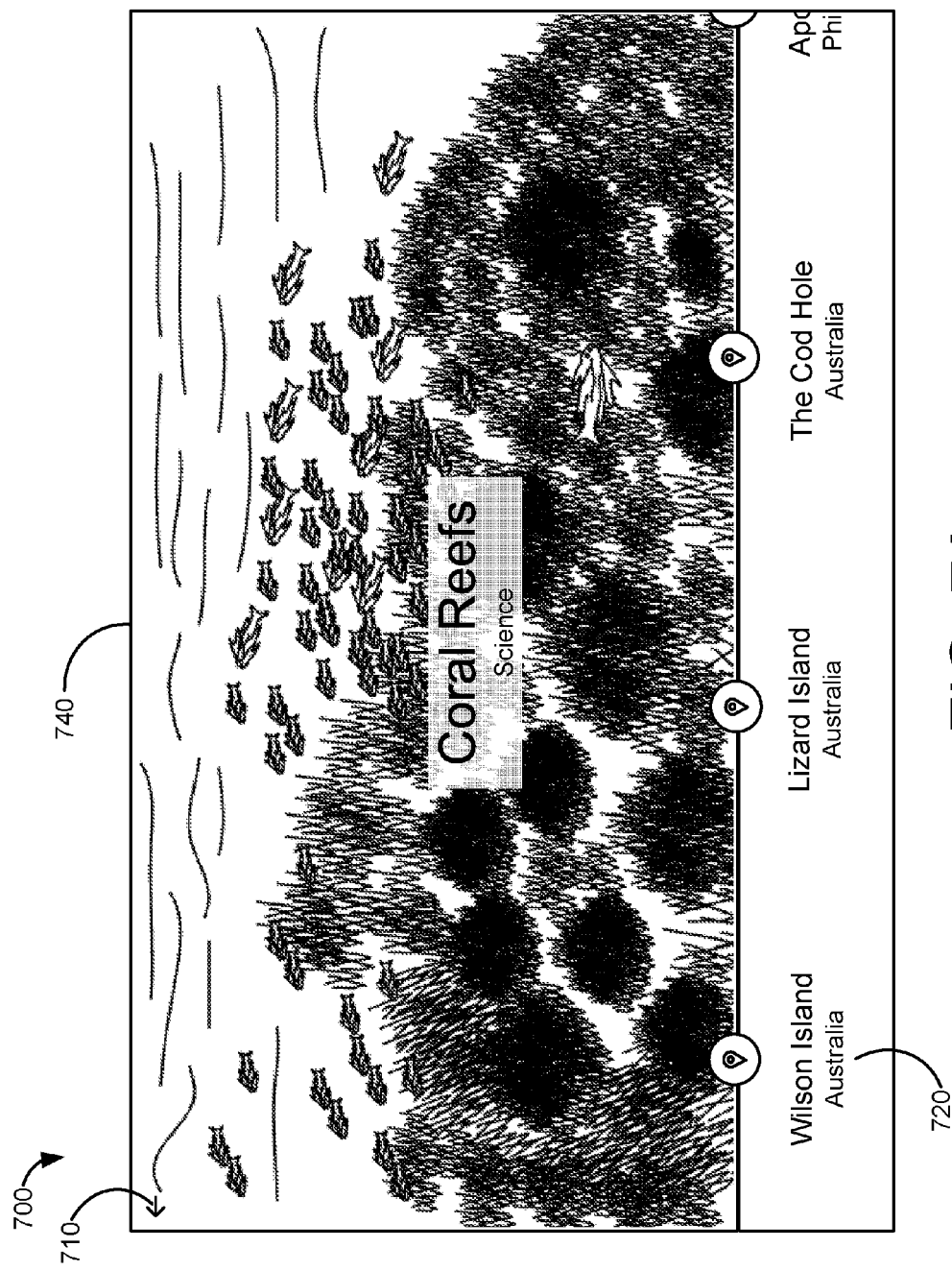
FIGS. 7A, 7B and 7C are diagrams illustrating a user interface for selecting and/or presenting a panorama (photosphere) from a set of panoramas (photospheres) that are included in a selected VR expedition, according to an implementation.
Figure 7B:
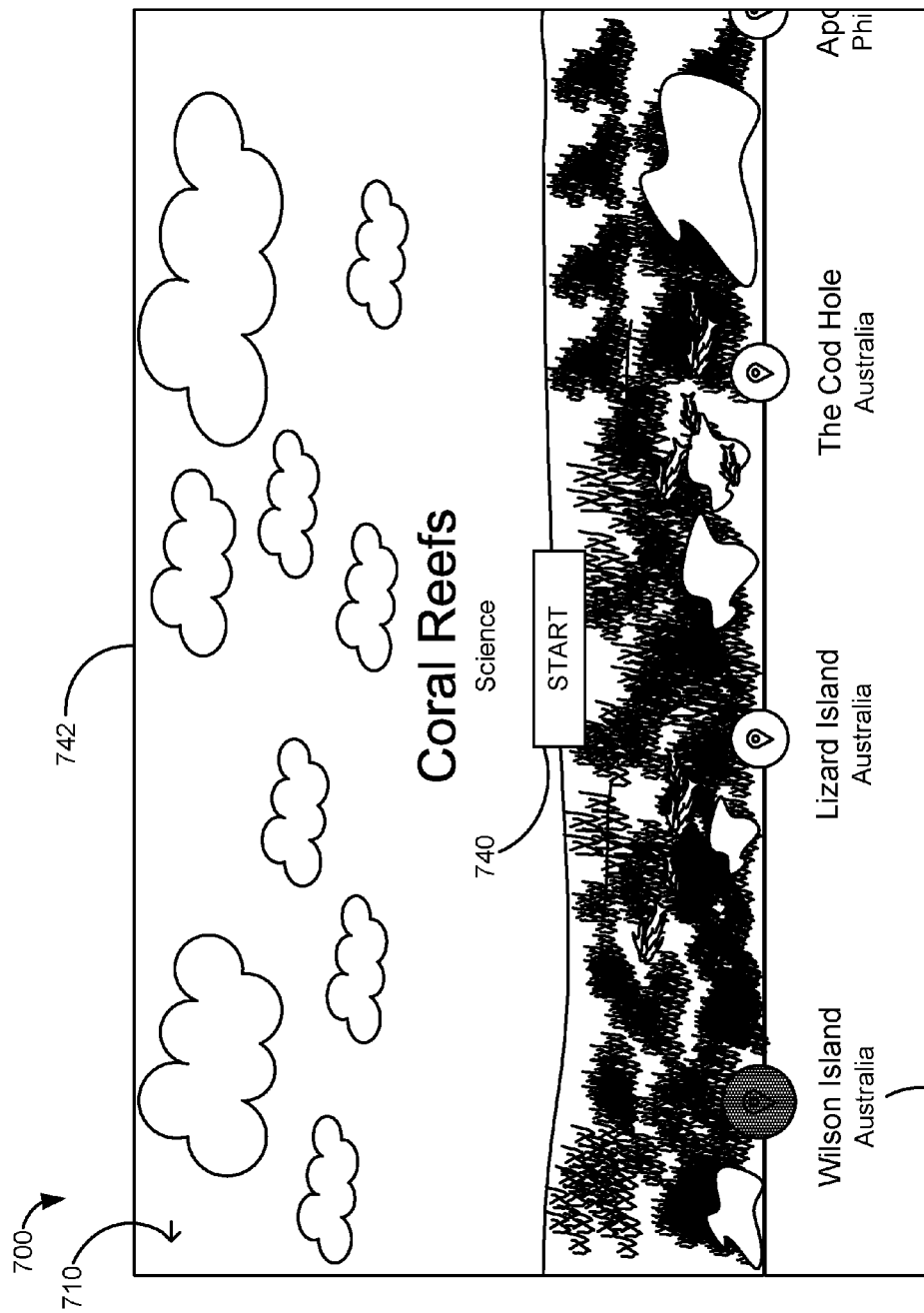
Figure 7C:
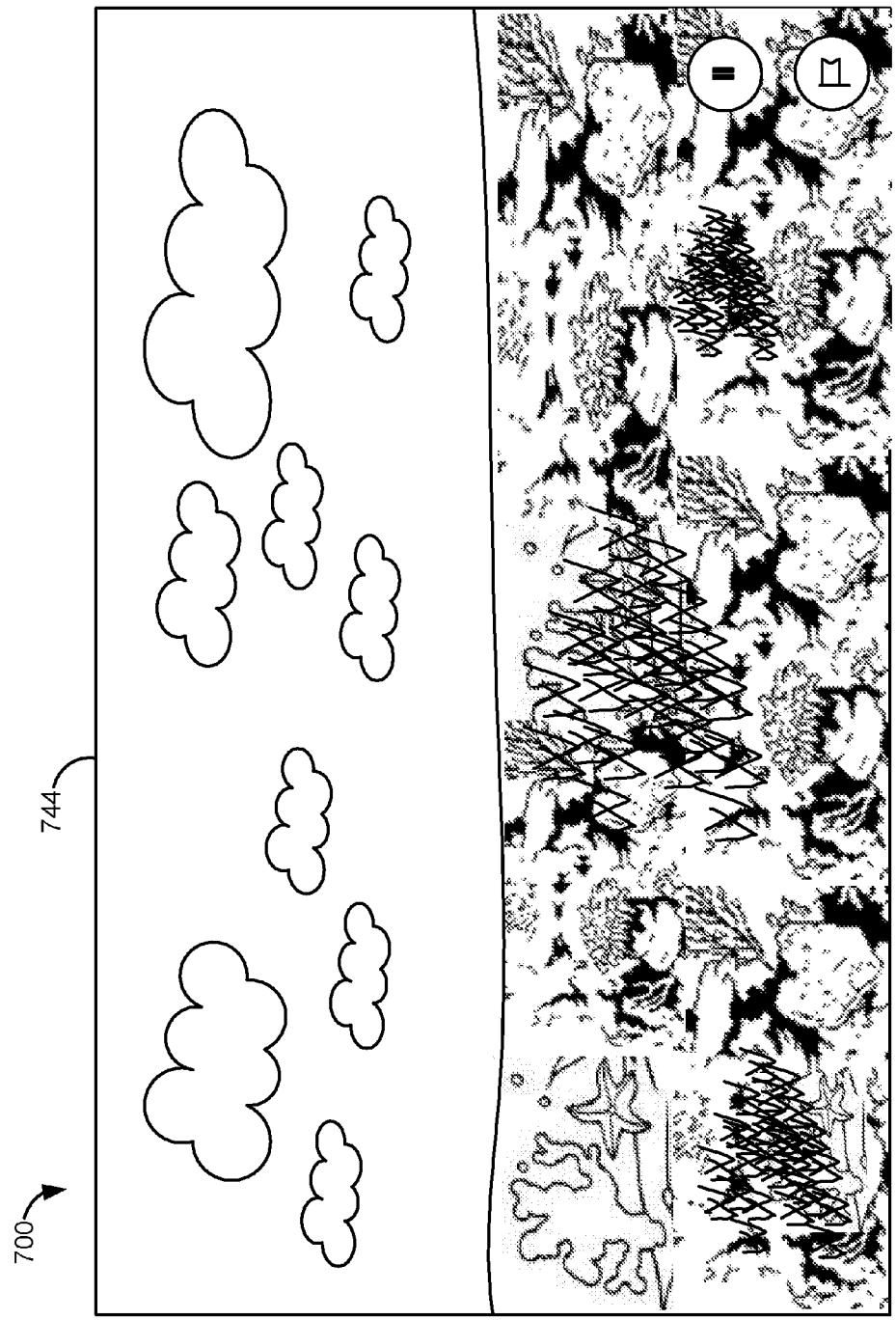

FIGS. 7A, 7B and 7C are diagrams illustrating a user interface 700 for selecting and/or presenting a panorama (photosphere) from a set of panoramas (photospheres) that are included in a selected VR expedition, according to an implementation. In this example, a Coral Reefs VR expedition has been selected from the user interface 600 of FIGS. 6A-6F. As shown in FIG. 7A, the user interface 700 can include a back icon 710 (e.g., to return to the user interface 600), a panorama or photosphere selection menu 720 and a preview image 740 for the selected VR expedition.

In FIG. 7B, a panorama or photosphere selection has been highlighted on the menu 720 (e.g., Wilson Island). There is a Start button 740 that a teacher can select (press, click, etc.) to allow students to start exploring (viewing) the Wilson Island VR panorama or photosphere and a preview image 742 corresponding with the Wilson Island VR panorama or photosphere. The available VR panoramas or photospheres of a selected expedition can be scrolled through on the menu 720 (e.g., using a left right swiping motion on a touchscreen interface of the guide device 110). In certain implementations, a preview image for the center-most selection of the menu 720 can be loaded after a predetermined period of time where the options of the menu 720 are not scrolled. In other implementations, the same VR expeditions preview image 740 can be displayed until a selected VR panorama or photosphere is started for viewing on the explorer devices 120 using the guide device 110.

In FIG. 7C, the Wilson Island VR panorama or photosphere 744 has been started and is being displayed, allowing students to explore the corresponding 3D space using the explorer devices 120. As shown in FIG. 7C, the menus (e.g., the top menu of the interface 600 and the menu 720) are not shown (e.g., have timed out or been closed in response to the selection of the Wilson Island VR panorama or photosphere 744). As described herein, while students are exploring the selected VR panorama or photosphere 744, audio can be played through the speaker 140. Such audio can include ambient sounds (e.g., ocean sounds), narration, music and/or other audio.

Figure 8A:
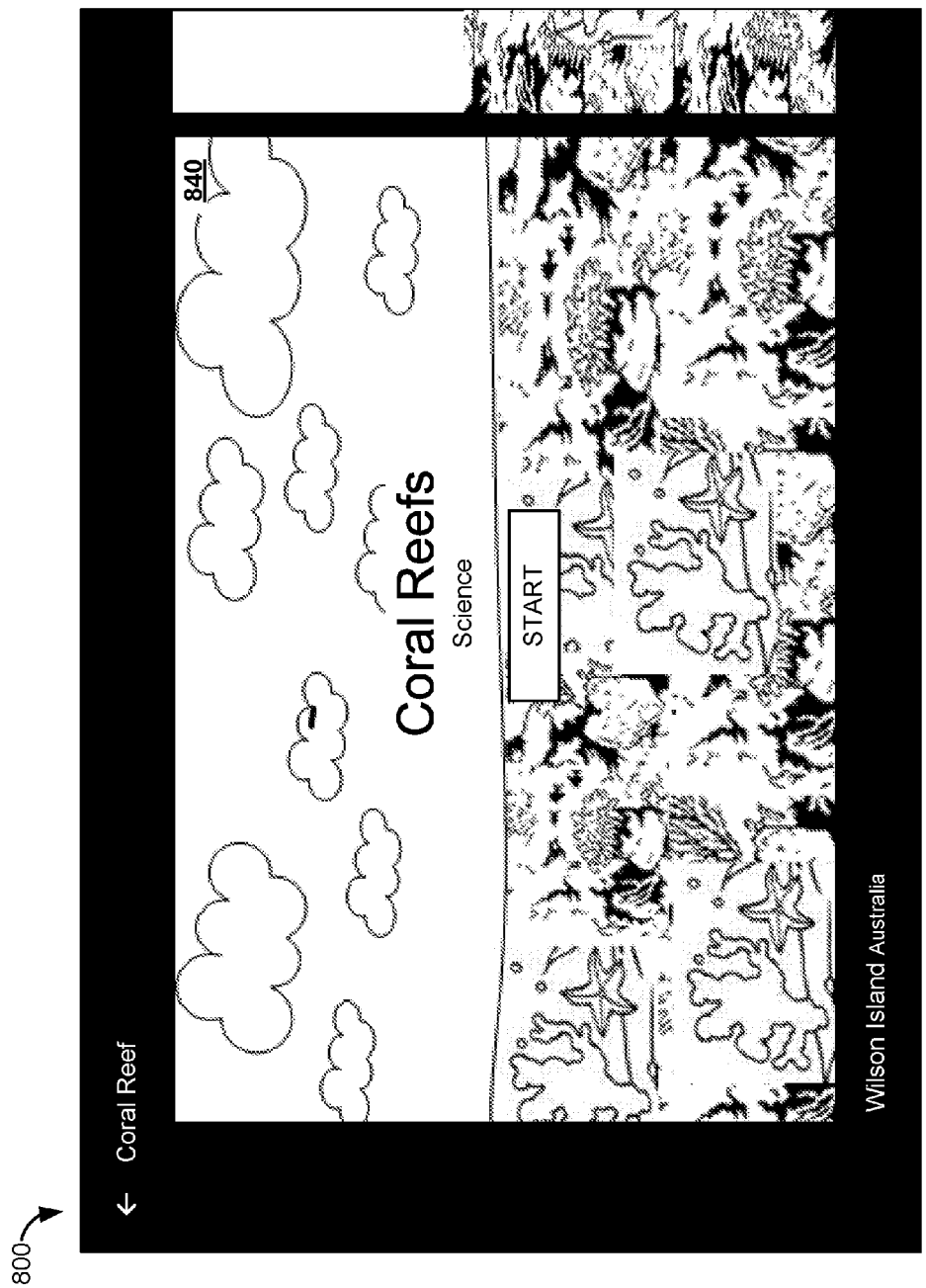
FIGS. 8A and 8B are diagrams illustrating another user interface for selecting and/or presenting a panorama (photosphere) from a set of panoramas (photospheres) that are included in a selected VR expedition, according to an implementation.
Figure 8B:

In FIGS. 8A and 8B are diagrams illustrating another user interface 800 for selecting and/or presenting a panorama (photosphere) from a set of panoramas (photospheres) that are included in a selected VR expedition, according to an implementation. As with FIGS. 7A-7C, in this example, the Coral Reefs VR expedition has been selected from the user interface 600 of FIGS. 6A-6F. As shown in FIG. 8A, the user interface 800 can include a preview image 840 for the Wilson Island VR panorama or photosphere on a paneled VR panorama and photosphere selection menu.

In FIG. 8B, the panorama or photosphere selection menu of the user interface 800 has been scrolled to the right to show a preview image 842 for a Lizard Island VR panorama or photosphere. In such an approach, after a predetermined time period (or in response to selection of the preview image 842), the display of the preview image 842 can be zoomed in and/or a start button can be added to the preview image 842, where the Lizard Island VR panorama or photosphere can be selected (e.g., by clicking the preview image or the start button) for viewing by students participating in a corresponding VR expedition. Again, while students are exploring a VR panorama or photosphere selected using the user interface 800, audio can be played through the speaker 140. Such audio can include ambient sounds (e.g., ocean sounds), narration, music and/or other audio.

Figure 9A:
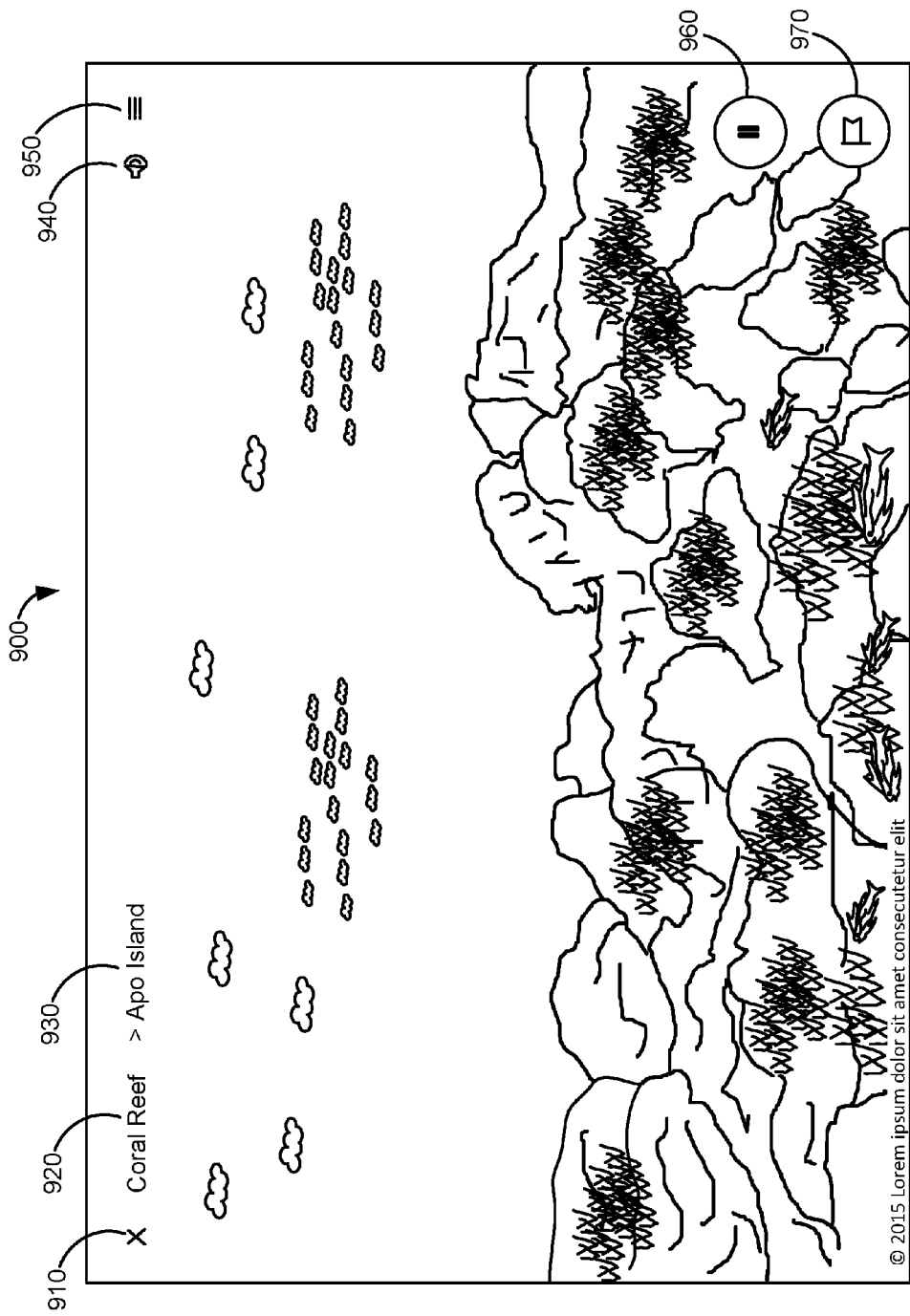
FIGS. 9A, 9B, 9C and 9D are diagrams illustrating a user interface for viewing and/or presenting a panorama (photosphere) selected from a set of panoramas (photospheres) that are included in a VR expedition, according to an implementation.

FIGS. 9A, 9B, 9C and 9D are diagrams illustrating a user interface 900 for viewing and/or presenting a VR panorama (photosphere) selected from a set of panoramas (photospheres) that are included in a selected VR expedition, according to an implementation. As shown in FIG. 9A, the user interface 900 can include a quit icon 910 (to stop viewing of the currently selected VR panorama or photosphere and/or stop the VR expedition), a selected VR expedition title 920 (Coral Reefs), a selected VR panorama or photosphere title 930 (Apo Island), an audio mute/unmute icon 940, an information panel activation icon 950, a play/pause explorer devices icon 960 and action icon 970 (e.g., which can be used to switch between VR panoramas or photospheres in a selected VR expedition) and an image attribution field 980 (which can contain copyright or other information regarding the selected VR panorama or photosphere).

Figure 9B:
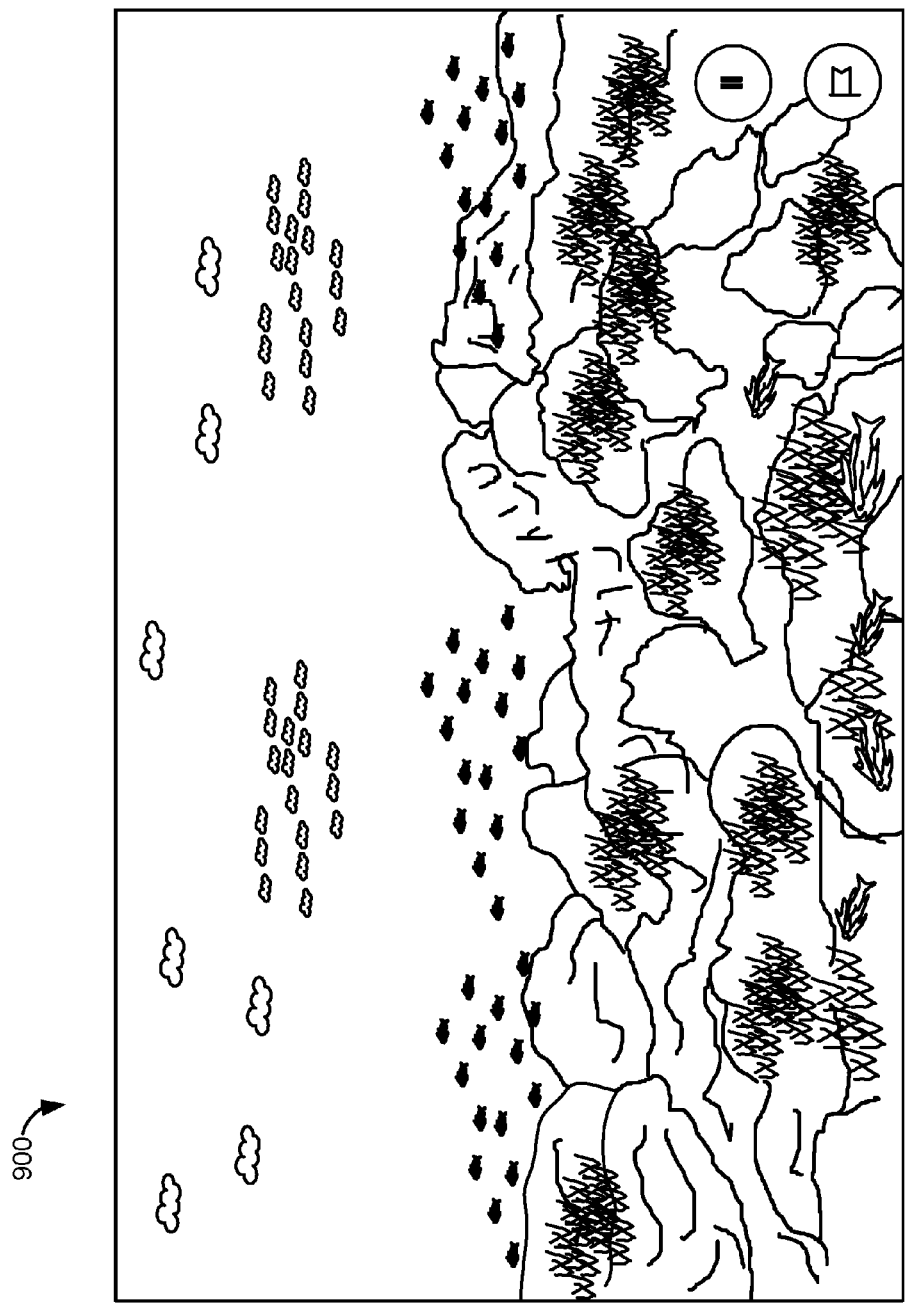

As shown in FIG. 9B, in like fashion as previously discussed, the menu items shown along the top of the user interface 900 can be hidden (e.g., automatically hidden after a timeout period, or manually). While shown in FIG. 9B, the play/pause icon 960 and the action icon 970 could also be hidden along with the other menu items that are displayed along the top of the user interface 900 in FIG. 9A.

Figure 9C:
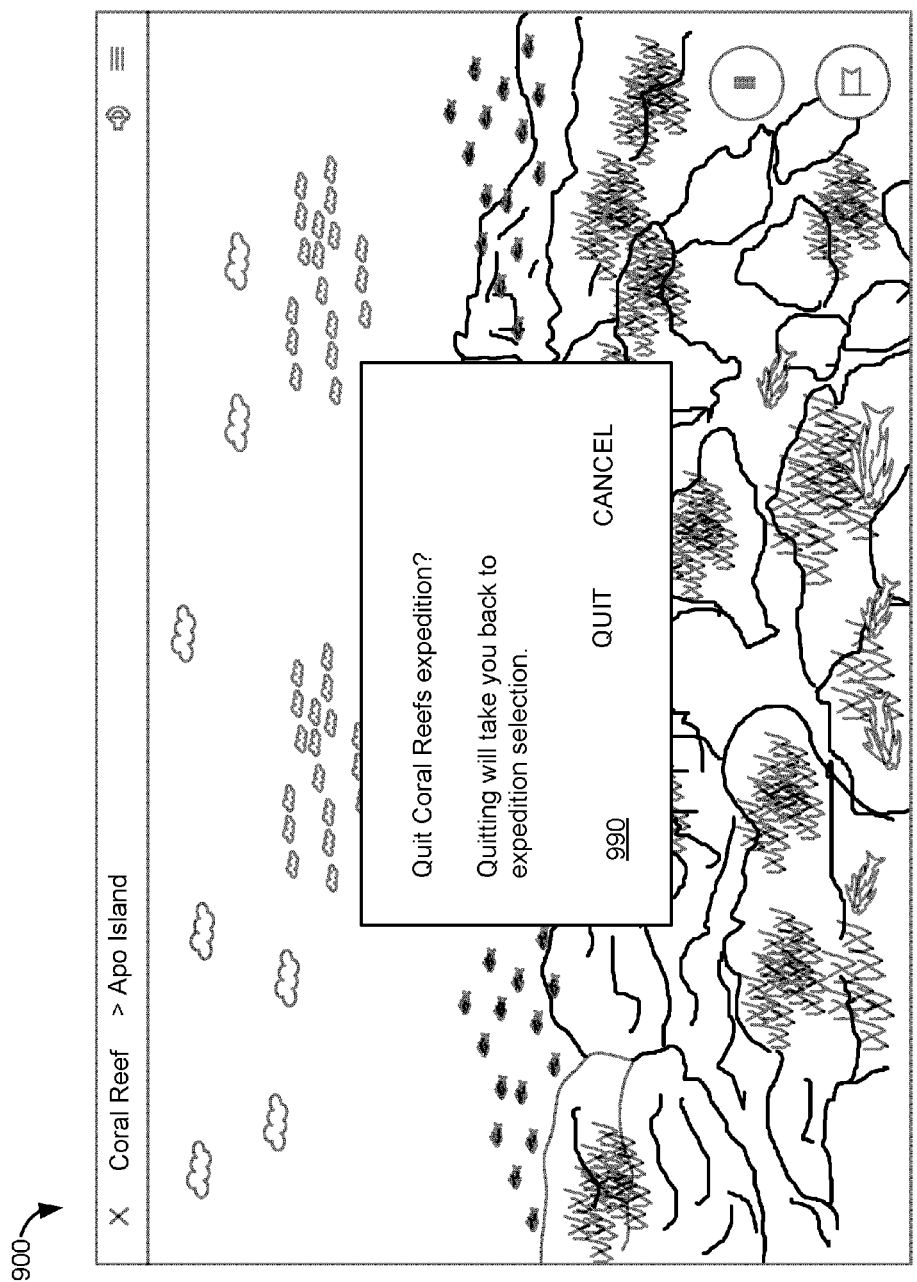
Figure 9D:
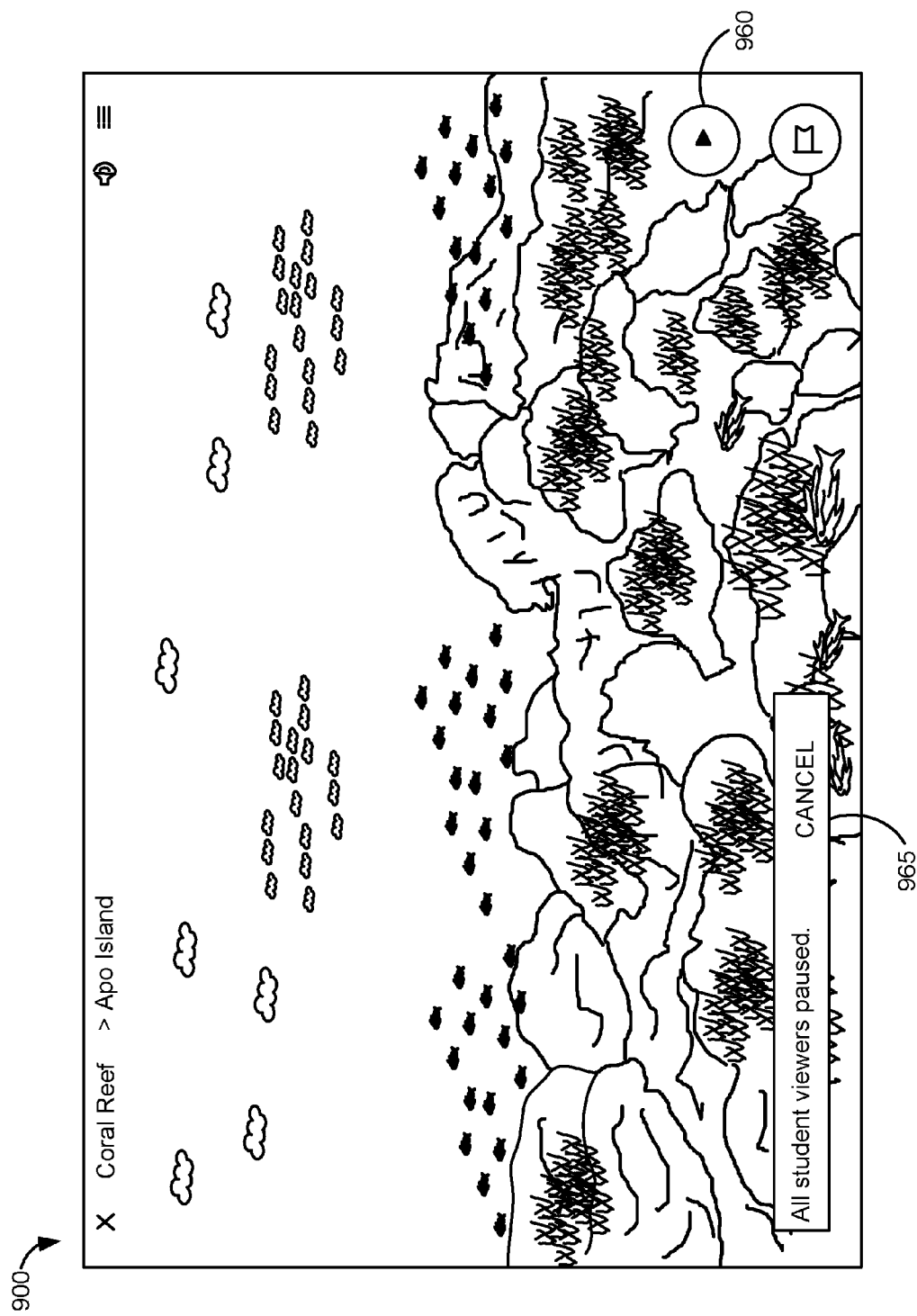

As shown in FIG. 9C, selecting the quit icon 910 on the guide device 110 may result in a quit dialog box 990 being displayed on the guide device 110. The teacher leading the corresponding VR expedition can then choose to quit presenting the currently selected VR expedition or cancel and continue presenting the currently selected VR expedition. As shown in FIG. 9D, selecting the play/pause icon 960 may result in pausing (or restarting) all explorer devices connected with (participating in) the current VR expedition and an information notification 965 can be displayed to indicate the current action being taken, or that has been taken.

Similarly, selection of the mute/un-mute icon 940 can cause audio associated with the current VR expedition to be muted or unmuted and selection of the action icon 970 can cause a VR panorama or photosphere selection menu (such as in the user interfaces 700 and 800) to be displayed to switch a selected VR panorama or photosphere.

Figure 10A:
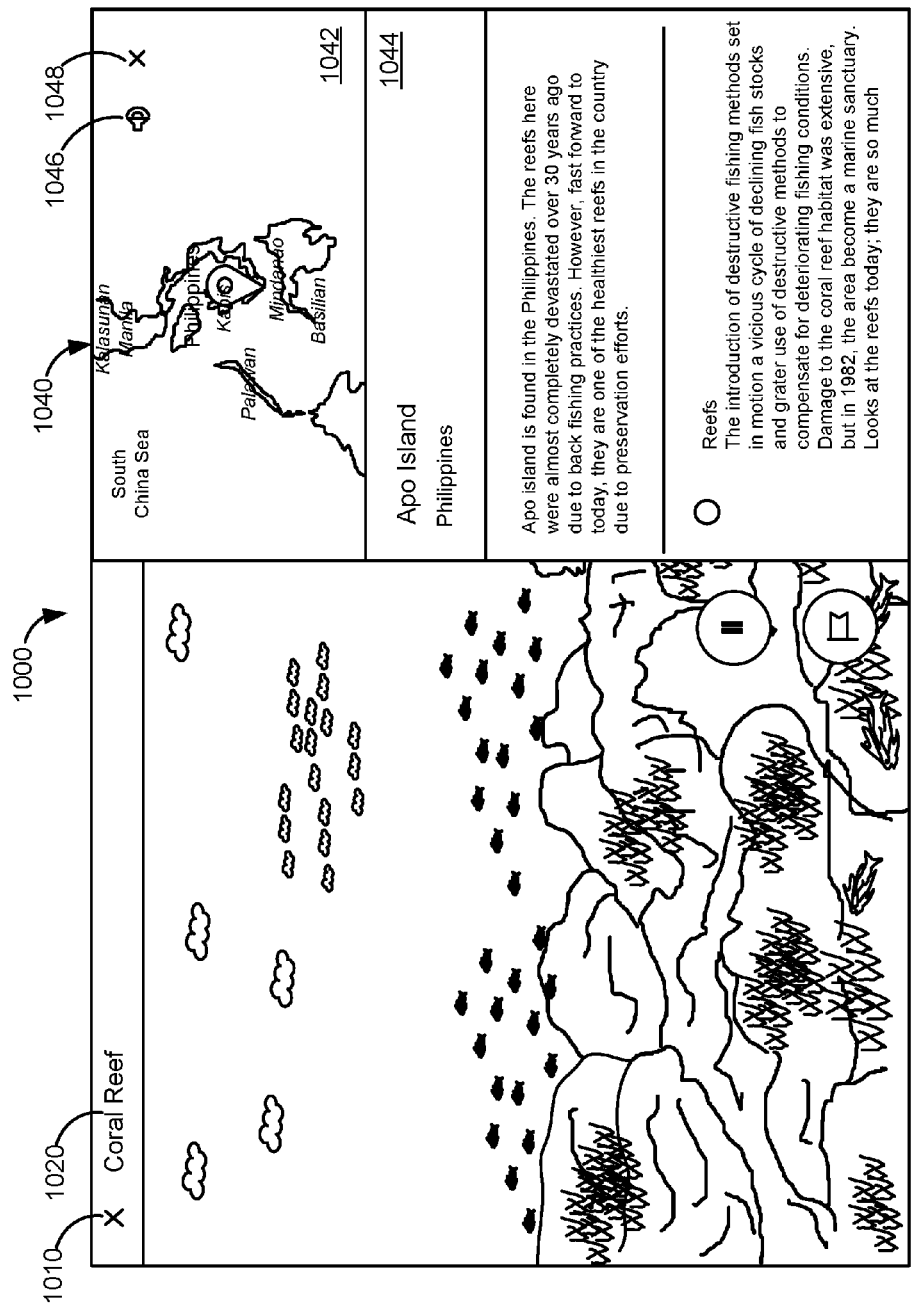
FIGS. 10A, 10B and 10C are diagrams illustrating another user interface (e.g., that can be implemented in conjunction with the user interface of FIGS. 9A-9D) for viewing and/or presenting a panorama (photosphere) with instructional annotations and information, according to an implementation.
Figure 10B:
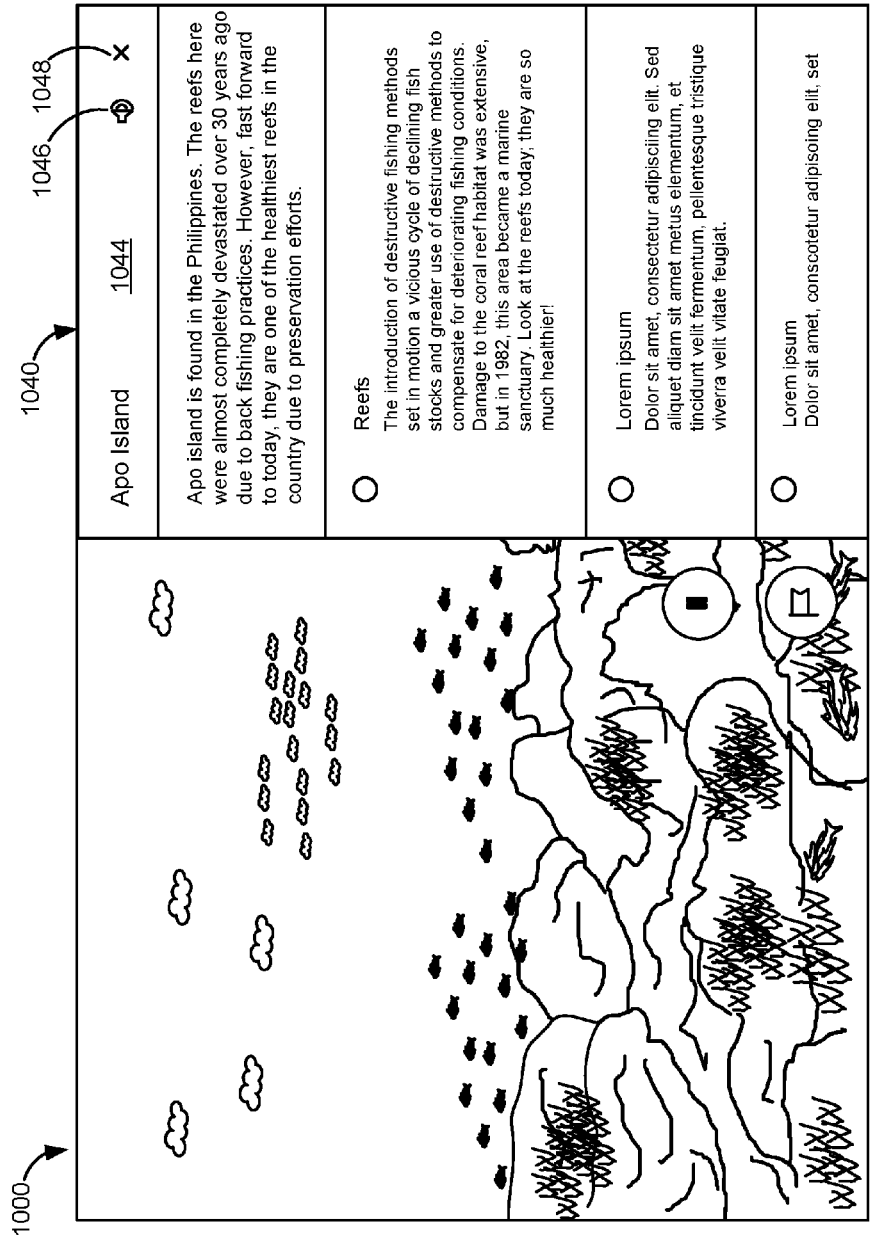
Figure 10C:
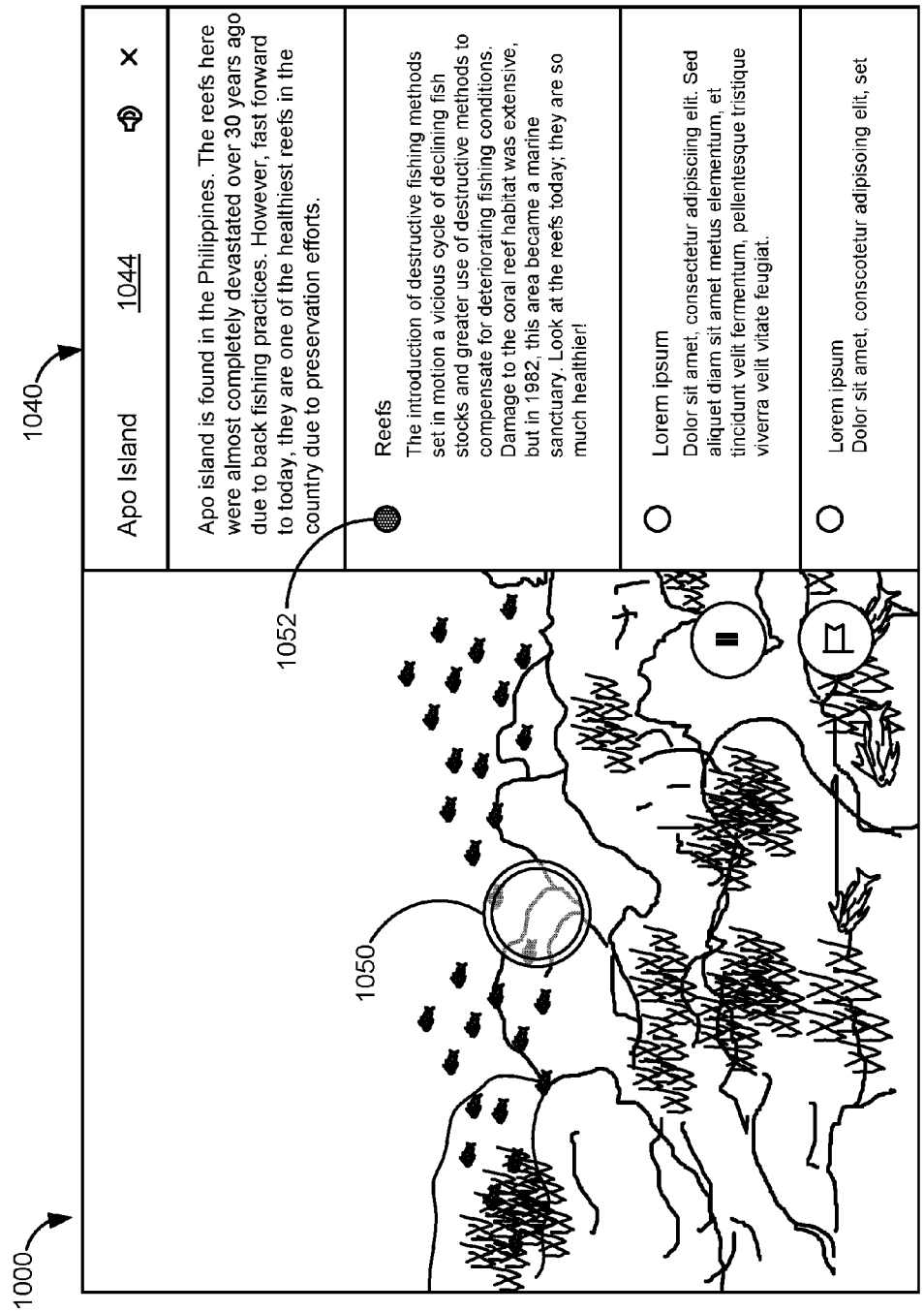

FIGS. 10A, 10B and 10C are diagrams illustrating another user interface 1000 (with similar features as the user interface 900) for viewing and/or presenting a VR panorama (photosphere) with instructional annotations and/or other information, according to an implementation. As shown in FIG. 10A, the user interface 1000 can include a quit icon 1010 (to stop viewing of the currently selected VR panorama or photosphere and/or stop the current VR expedition), a selected VR expedition title 1020 (Coral Reefs) and an information panel (drawer) that can be activated by, for example, the icon 950 in the user interface 900.

The information panel 1040 of FIG. 10A can include a map section 1042 (that shows a geographic location of the VR panorama or photosphere that is currently being viewed) and an annotation section 1044 that can include a title of the current VR panorama or photosphere (Apo Island) and informational annotations about the location being viewed. The information panel 1040 can also include an audio mute/un-mute icon 1046 (which can mute/un-mute audio associated with the information panel 1040) and a quit icon 1048 that can be used to close the information panel 1040. In comparison with the user interface 900, the title of the current VR panorama or photosphere being viewed in the user interface 1000 is included in the annotation panel 1044 of the information panel 1040, rather than next to the VR expedition's title 1020.

FIG. 10B illustrates the user interface 1000 with the quit icon 1010, the VR expedition title 1020 and the map panel 1042 of the information panel 1040 hidden (not visible), which could be accomplished manually, or after a timeout period has expired. Interacting with the user interface 1000 (e.g., using the guide device 110) could cause the menu items and/or the map panel 1042 to be displayed again.

FIG. 10C shows the user interface 1000 displayed with a site marker 1050 that can be used by a teacher (or included in associated VR content) to highlight (draw student's attention to) an aspect of the displayed VR panorama or photosphere, a reef in this example. As shown in FIG. 10C, an annotation 1052 corresponding with the site marker 1050 can be highlighted in the information panel 1040 of the user interface 1000. The specific annotation that is highlighted in correspondence with the site marker 1050 may depend on a language selection that is used in conjunction with the VR expedition, such as could be selected from a settings menu (e.g., as described with respect to FIGS. 6B and 6C).

Figure 11A:
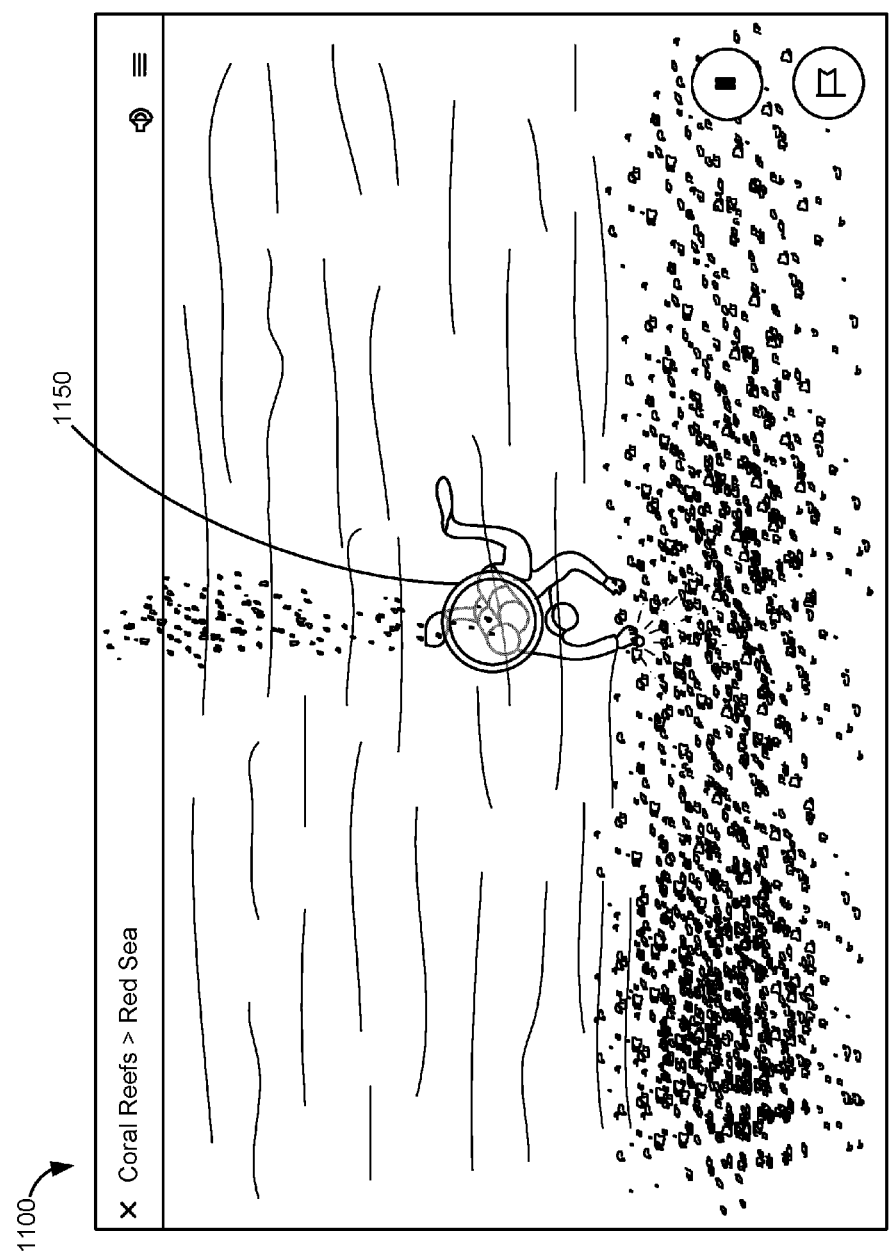
FIGS. 11A, 11B, 11C, 11D, 11E, 11F, 11G and 11H are diagrams illustrating the user interface of FIGS. 9A-9D (e.g., as shown on a participant device) including site markers and/or gaze indicators, according to an implementation.
Figure 11B:
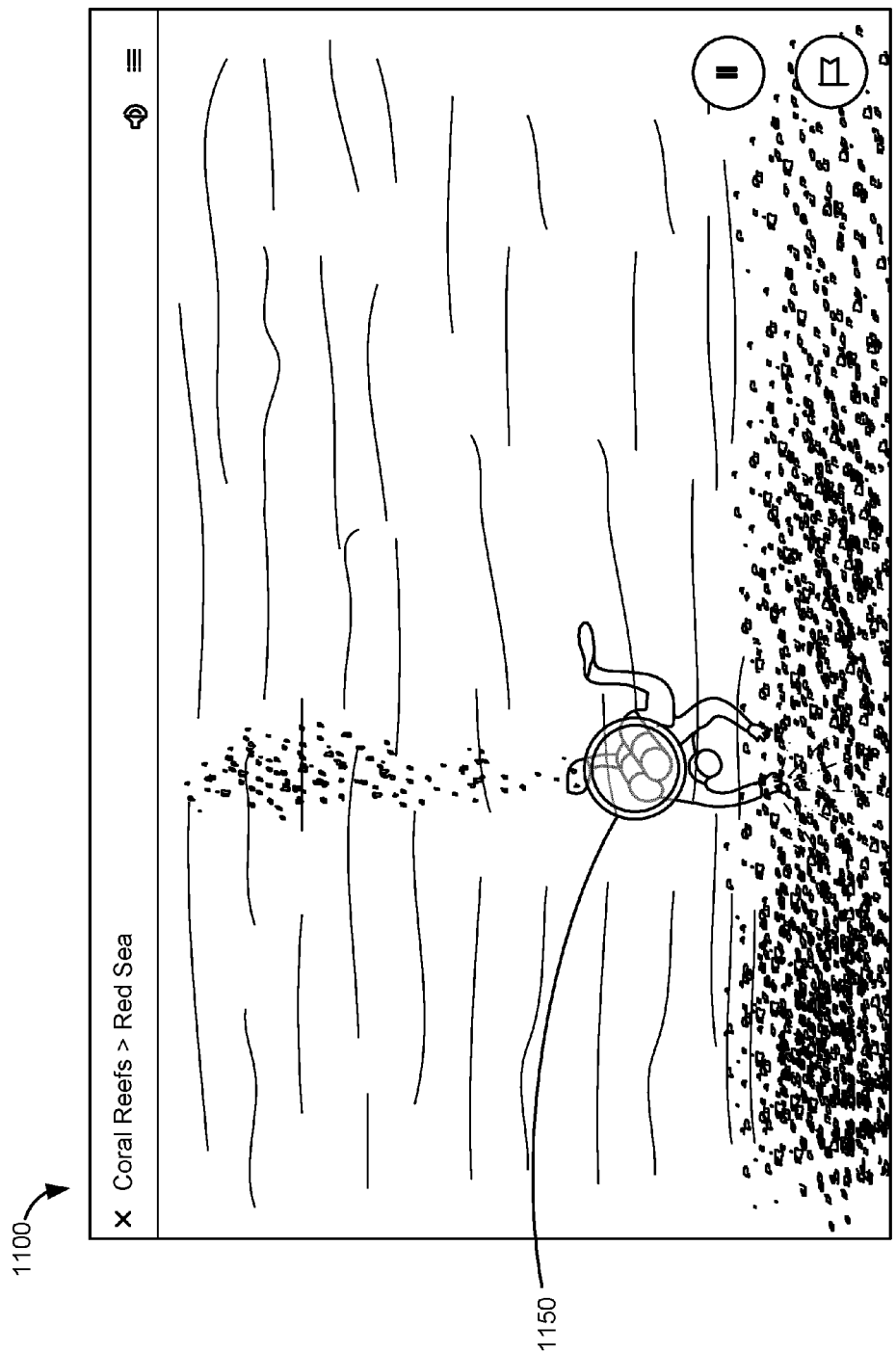

FIGS. 11A, 11B, 11C, 11D, 11E, 11F, 11G and 11H are diagrams illustrating a user interface 1100 (with similar features as the user interface 900 as can be displayed on a participant device 120) including site markers and/or gaze indicators, according to an implementation. The user interface 1100, as shown in FIG. 11A, includes a site marker 1150 to draw attention, e.g., of a student, to a scuba diver shown in the VR panorama or photosphere, where the scuba diver is centered in the current field of view of the VR panorama or photosphere. If a student, viewing this panorama or photosphere, moves his or her gaze away from the site marker 1150 (and the scuba diver), such as by moving his or her head up and to the right, the site marker 1150, as displayed by an explorer device 120, can move along with the object of interest (e.g., the scuba diver), such as is shown in FIG. 11B, as compared to FIG. 11A.

Figure 11C:
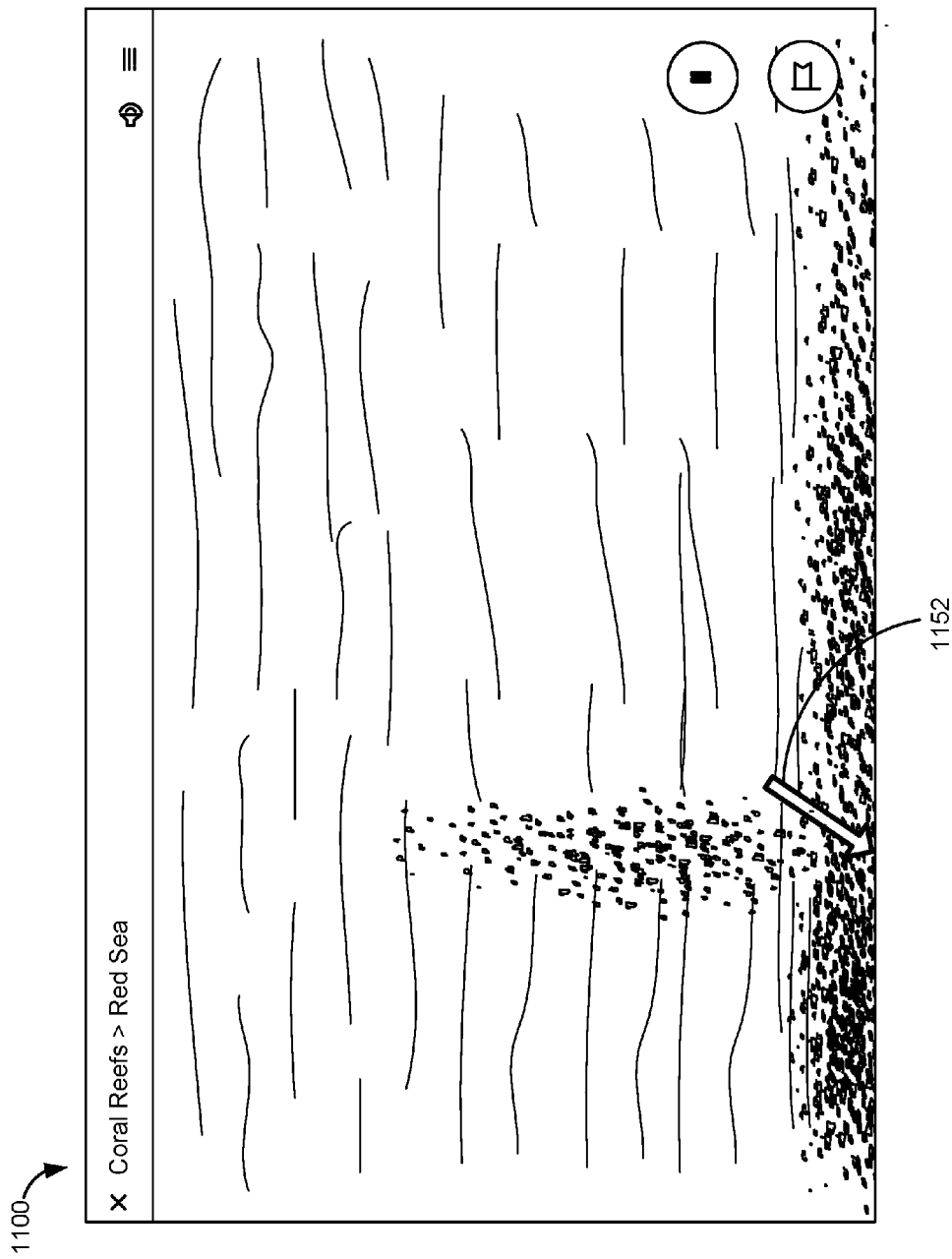

In the user interface 1100, if the student continues to move his or her gaze away from the site marker 1150 and the associated object of interest (scuba diver), such that the site marker 1150 and the associated object of interest moves out of the currently displayed portion of the VR panorama or photosphere, the site marker 1150 may change form (shape), such as to the site marker 1152 (an arrow shape) shown in FIG. 11C, which may indicate that the object of interest is outside the student's current field of view. The site marker 1152 in FIG. 11C can also provide directional assistance to the student on where to move his or her gaze in order to bring the object of interest back into his or her field of view. Once the object of interest is back within the student's current field of view, the site marker 1152 may change back to the site marker 1150. In other implementations, site markers having other configurations can be used. For instance, the site marker 1150 could be represented by an image of push pin, for example. In other implementations, the length and/or size of the site marker 1152, or other site marker configurations used when an associated object of interest is out a student's current field of view, may provide an indication of how far off of (away from) the currently visible portion of the VR panorama or photosphere (the student's current field of view) the object of interest is, such as by varying a size of the site marker 1152, for example.

Figure 11D:
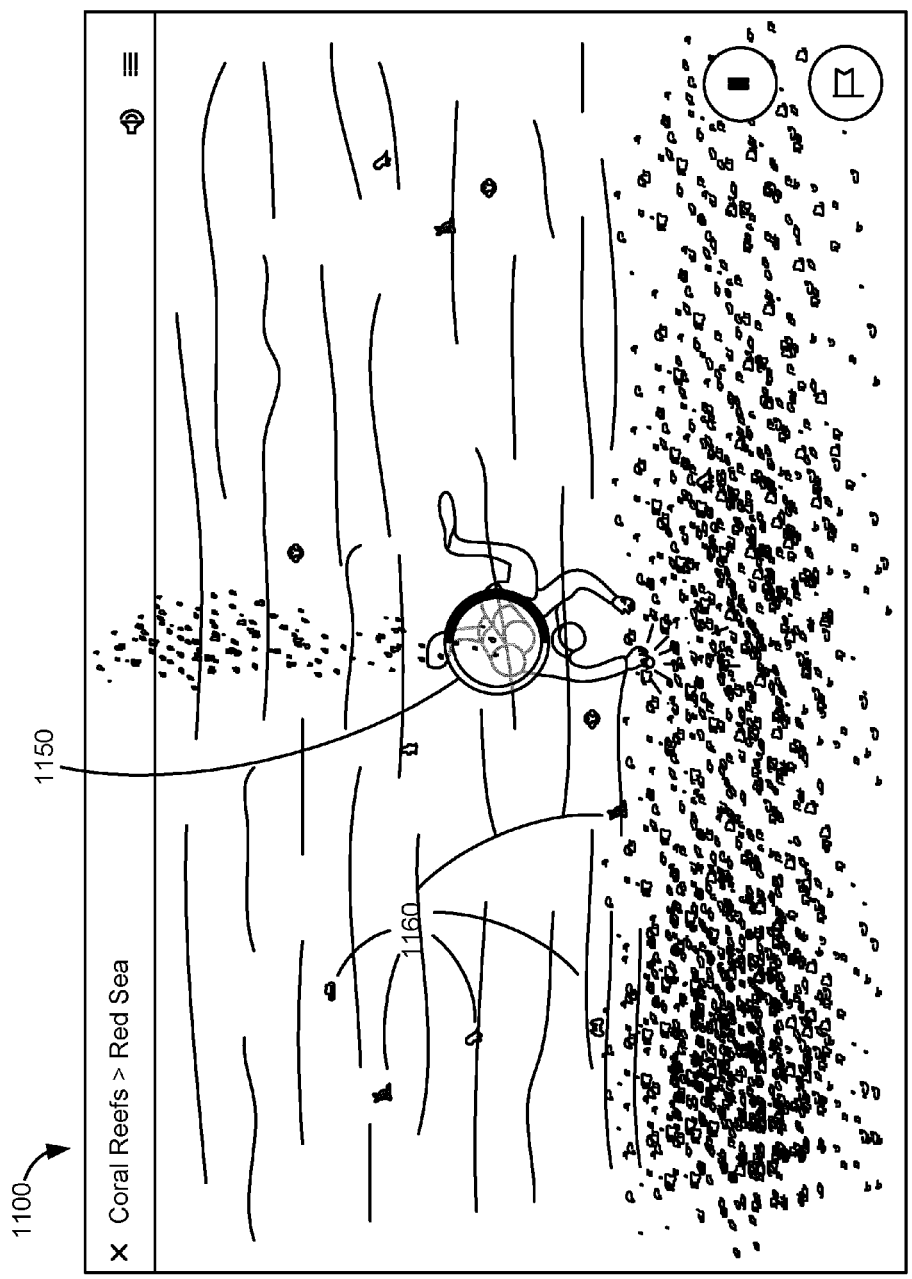
Figure 11E:
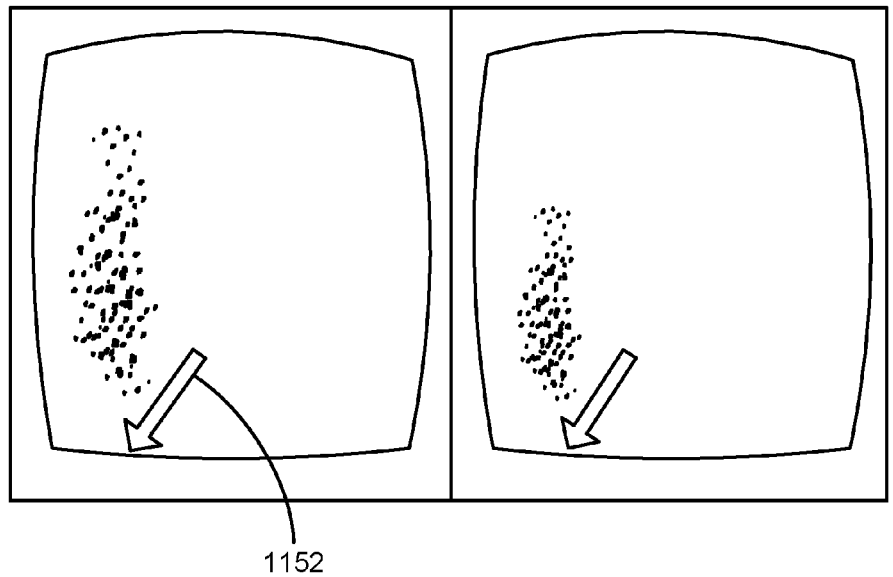
Figure 11F:
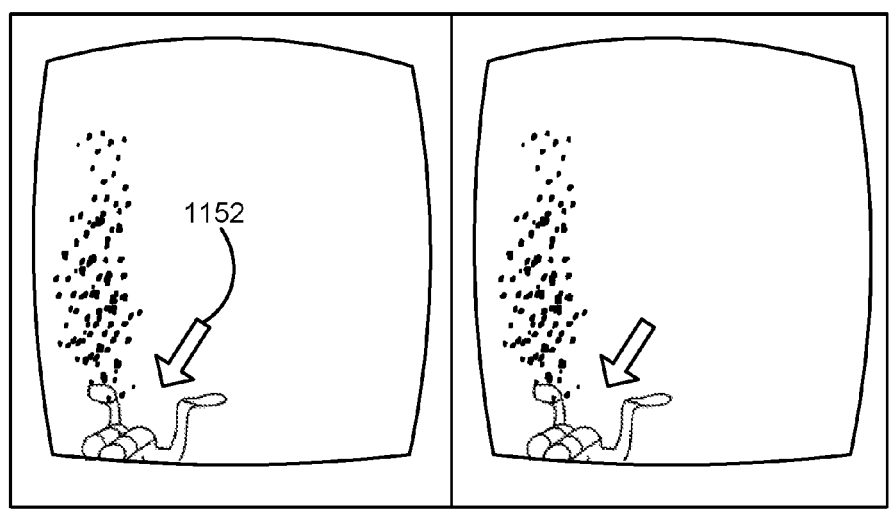
Figure 11G:
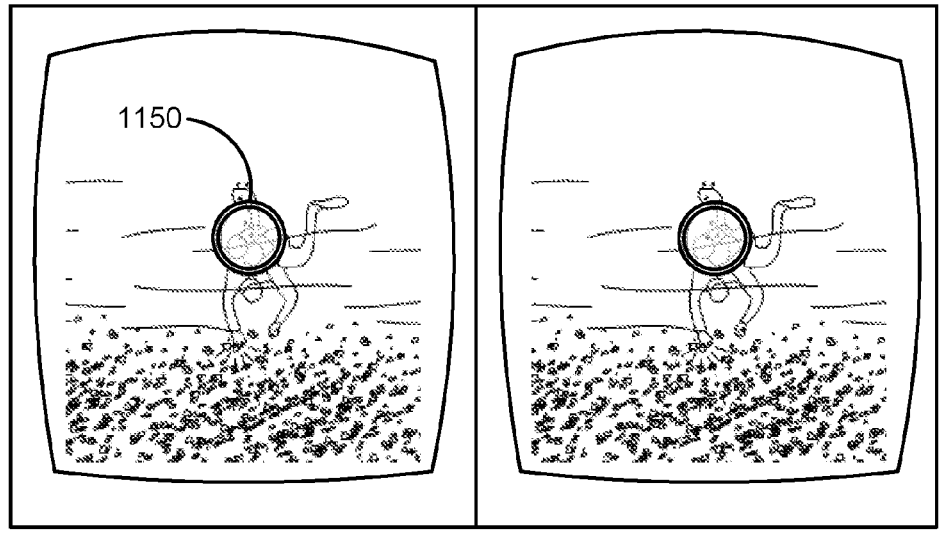
Figure 11H:
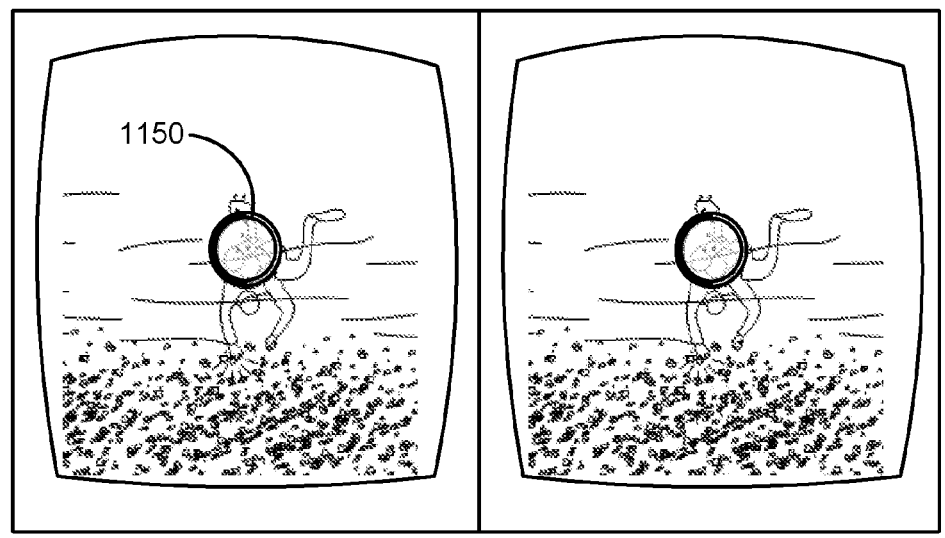

In FIG. 11D, the site marker 1150 is shown as including a dwell timer that can be used to keep track of a timeout period for the site marker 1150 in the user interface 1100 (shown at 50%). For instance, in some implementations the site marker 1150, after being displayed in the user interface 1100 continuously for a predetermined period of time, may timeout and then disappear (no longer be displayed) so as not to persistently obstruct the student's view of the VR panorama or photosphere shown in the user interface 1100.

The user interface 1100 in FIG. 11D also includes gaze indicators 1160, which can indicate to a teacher where the gaze of each student connected with a current VR expedition is looking. Based on those gaze indicators, the teacher can direct the students to move their gaze toward the object of interest. For example, each gaze indicator 1160 may indicate the center point of a respective student's current field of view, where each student is represented by a different gaze indicator 1160 icon. FIGS. 11E-11H illustrate stereoscopic images that illustrate implementation of site markers 1150 and 1152 with a dwell time indicator, such as may displayed using an explorer device 120 while participating in a VR expedition.

Figure 12:
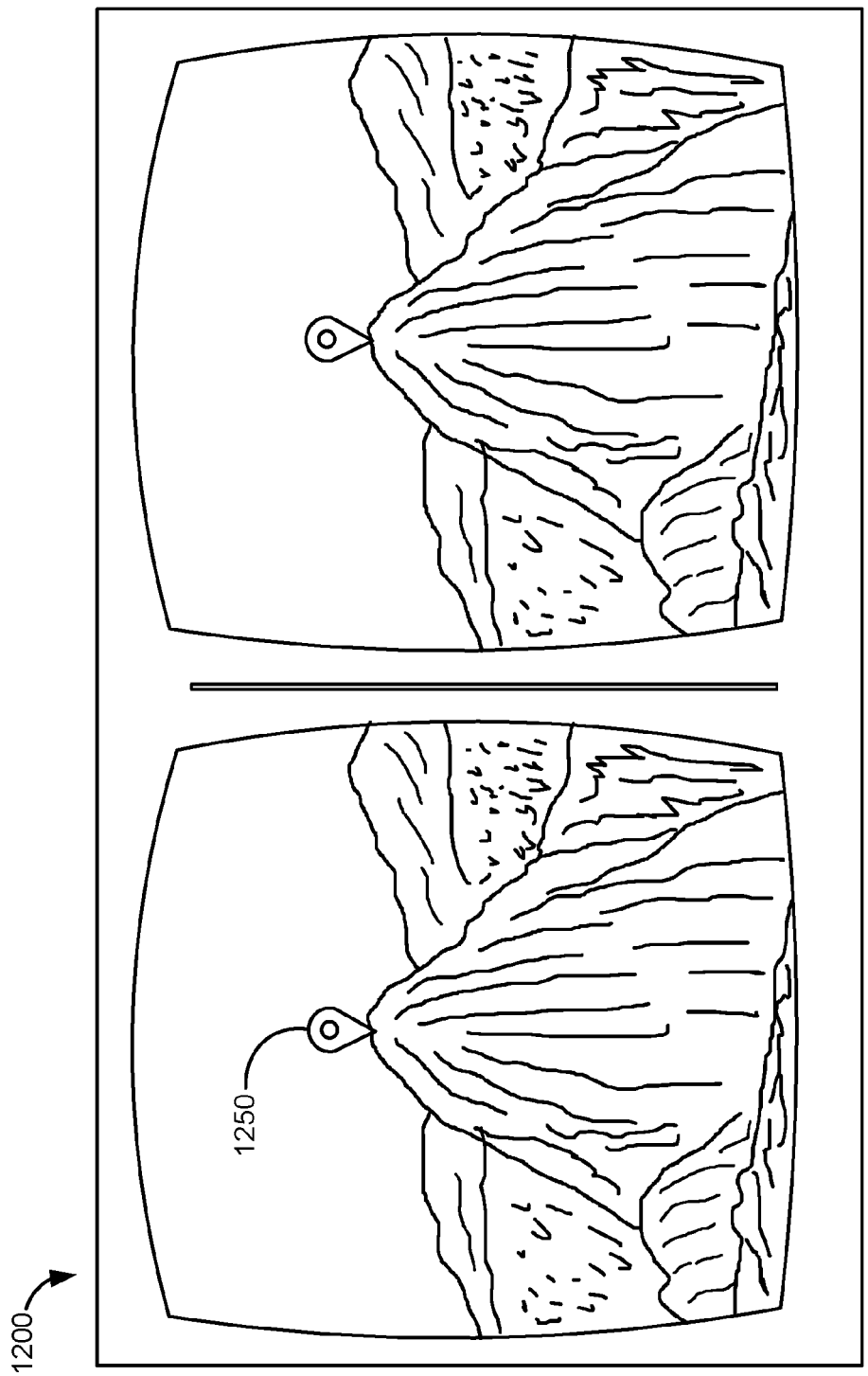
FIG. 12 is a stereoscopic image illustrating another site marker, according to an implementation.

FIG. 12 is a stereoscopic image 1200 illustrating another site marker configuration 1250, according to an implementation. In the image 1250, the site marker 1250 is implemented using an image of a push pin. In such an implementation, progress of a dwell timer timeout period could be indicated by gradually changing a color of the push pin, such as from blue to red, gradually filling the pin with red from the bottom as the timeout period passes.

FIGS. 13A, 13B, 13C, 13D, 13E and 13F are diagrams illustrating status screen displays 1310, 1320, 1330, 1340, 1350 and 1360 that can be implemented (e.g., on explorer/student devices 120) in conjunction with the system of FIG. 1, according to an implementation. In the example of the FIGS. 13A-13F, an explorer device 120 of the system 100 can be implemented using a non-integrated electronic device 124 and VR viewer 122, where the electronic device 124 can be inserted in the VR viewer 122 at the start of a VR expedition and removed from the VR viewer 122 after completion of the VR expedition.

Figure 13B:
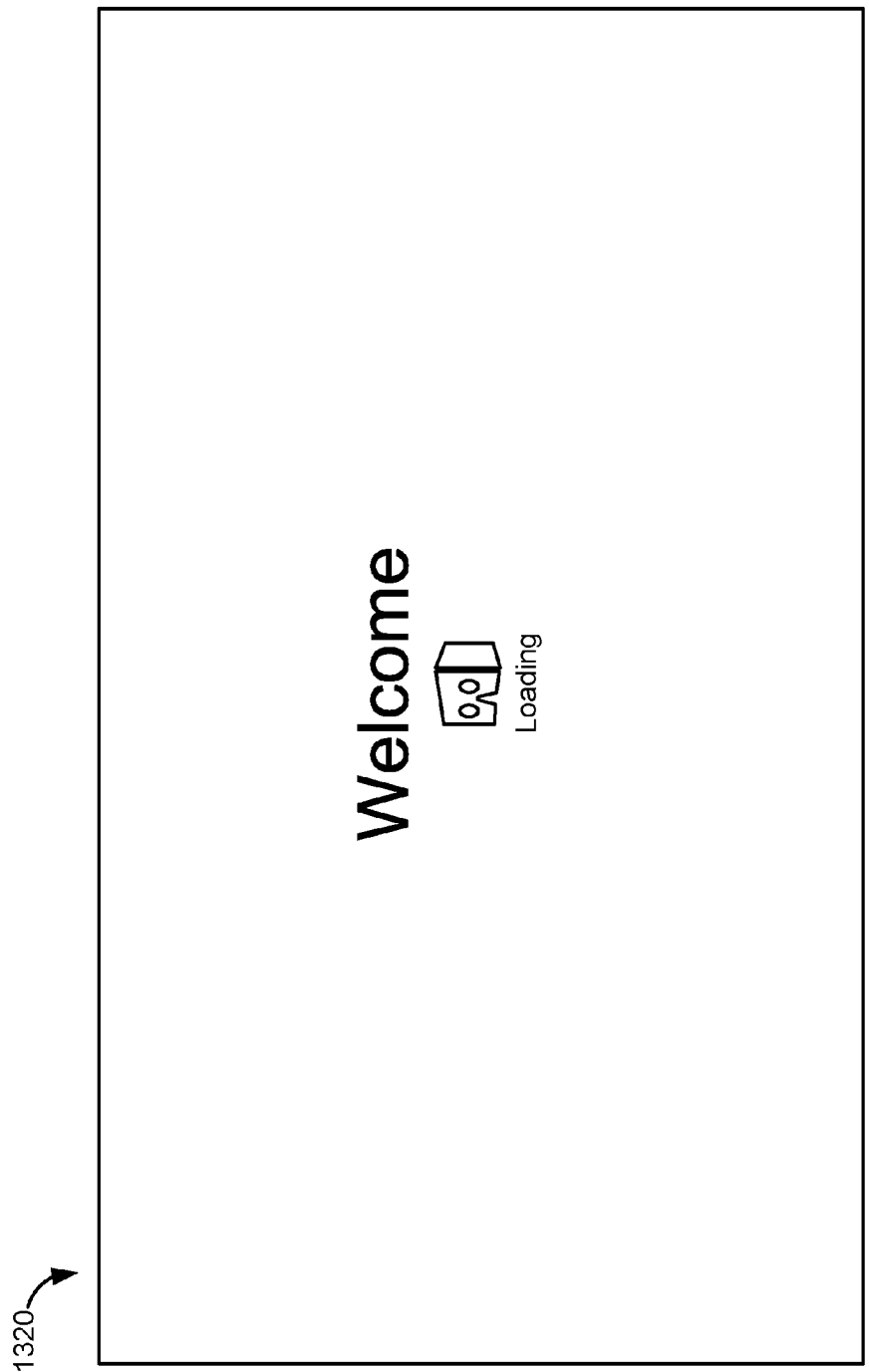
Figure 13C:
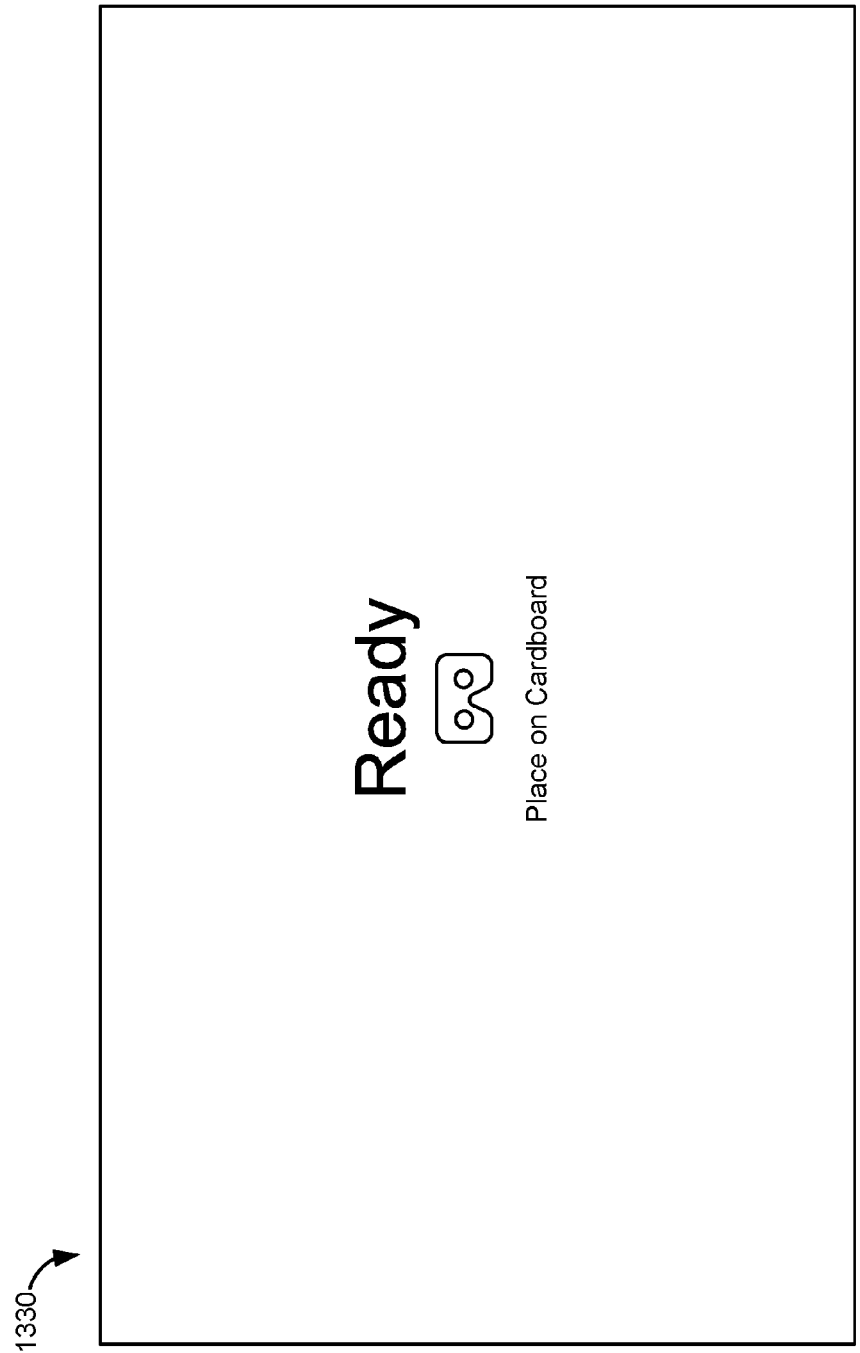

In this example, FIG. 13A illustrates a status screen 1310 that may be displayed while the electronic device 124 is in the process of connecting with the router 130 and/or with the guide device 110 of the system 100 in order to allow a student to join a VR expedition that is to be taken (presented) using the system 100. FIG. 13B illustrates a status screen 1320 that may be displayed while the electronic device 124 is in the process of loading/launching the explorer application 126. FIG. 13C illustrates a status screen 1330 that may be displayed once the explorer application 126 is loaded an electronic device 124 is ready to be inserted in the VR viewer 122 (e.g., a cardboard viewer).

Figure 13D:
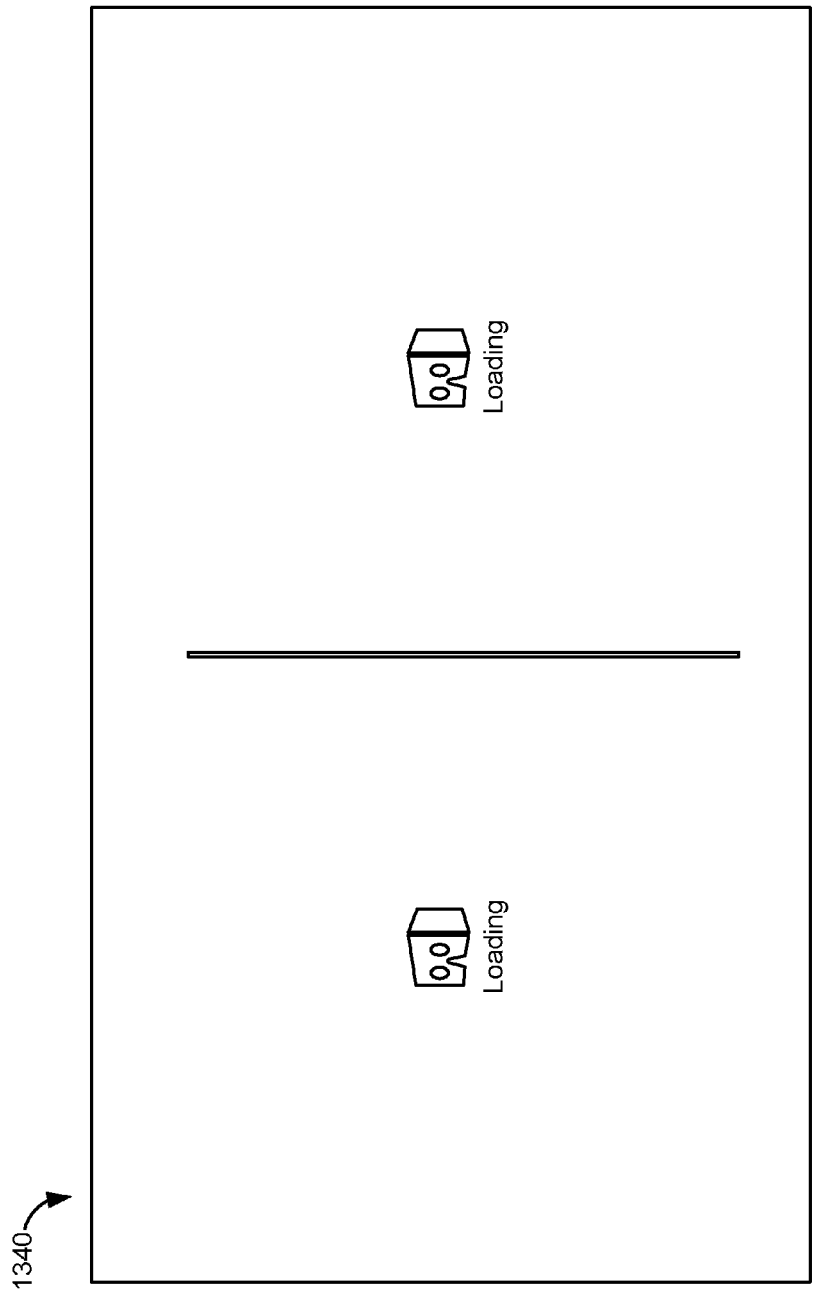
Figure 13E:
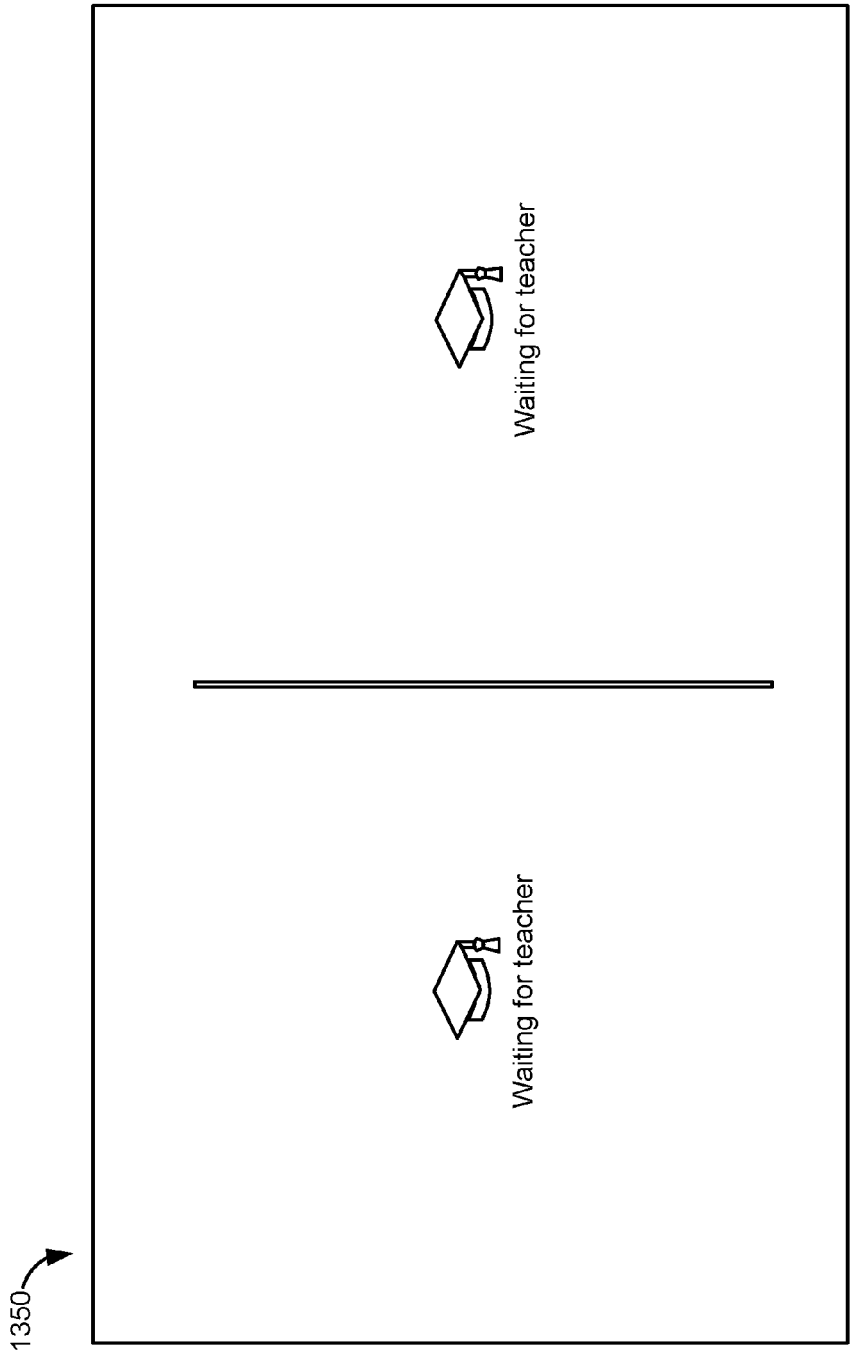
Figure 13F:
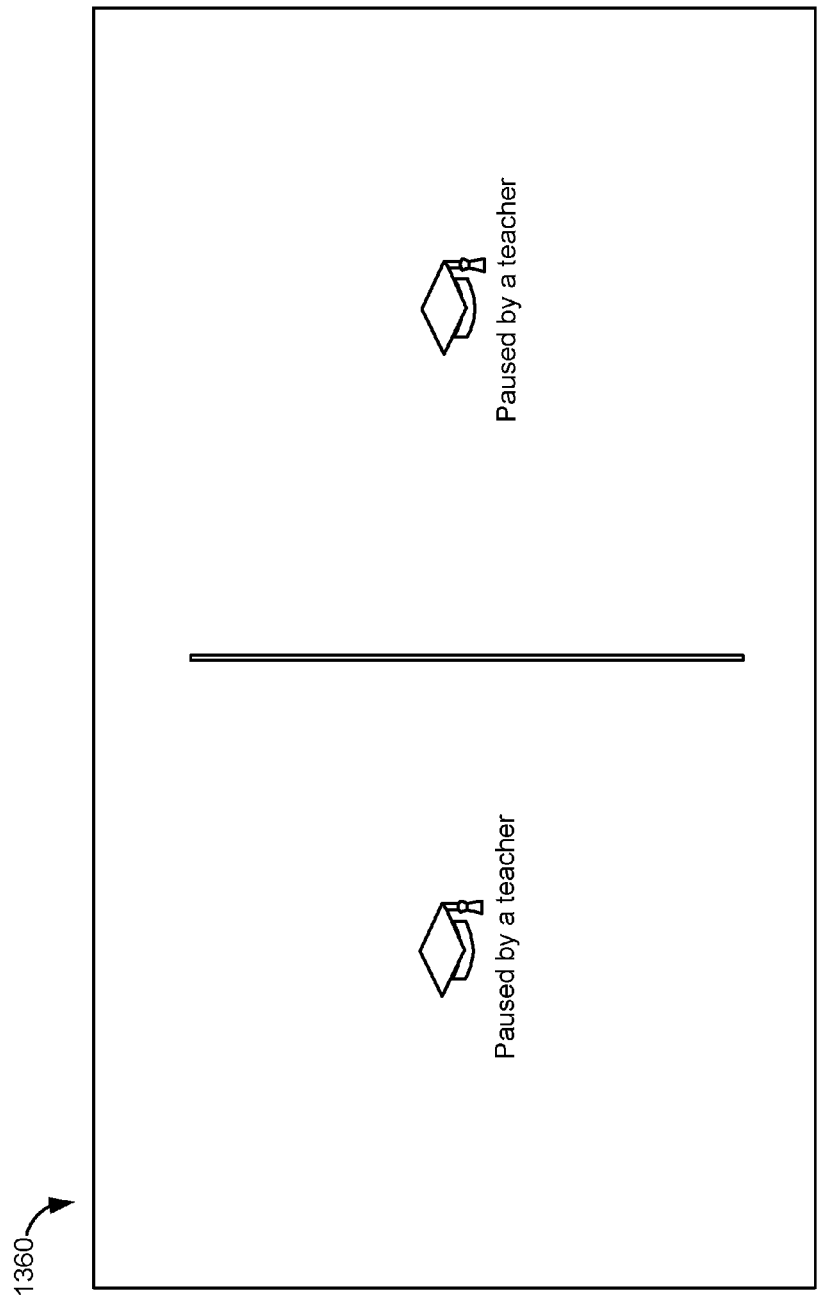

FIG. 13D illustrates a stereoscopic status screen 1340 that may be displayed to indicate that the electronic device is loading virtual trip content for a VR expedition (e.g., from the guide device 110 and/or into the explorer application 126) and/or waiting for the teacher (leader) to start the VR expedition. FIG. 13E illustrates a status screen 1350 that may be displayed to indicate that the electronic device 124 of the explorer device 120 is waiting for an action by the teacher, such as to start a VR expedition or start exploration of a new VR panorama or photosphere in the VR expedition. FIG. 13F illustrates a status screen 1360 that may be displayed to indicate that a VR expedition has been paused by the teacher (leader).

Figure 14A:
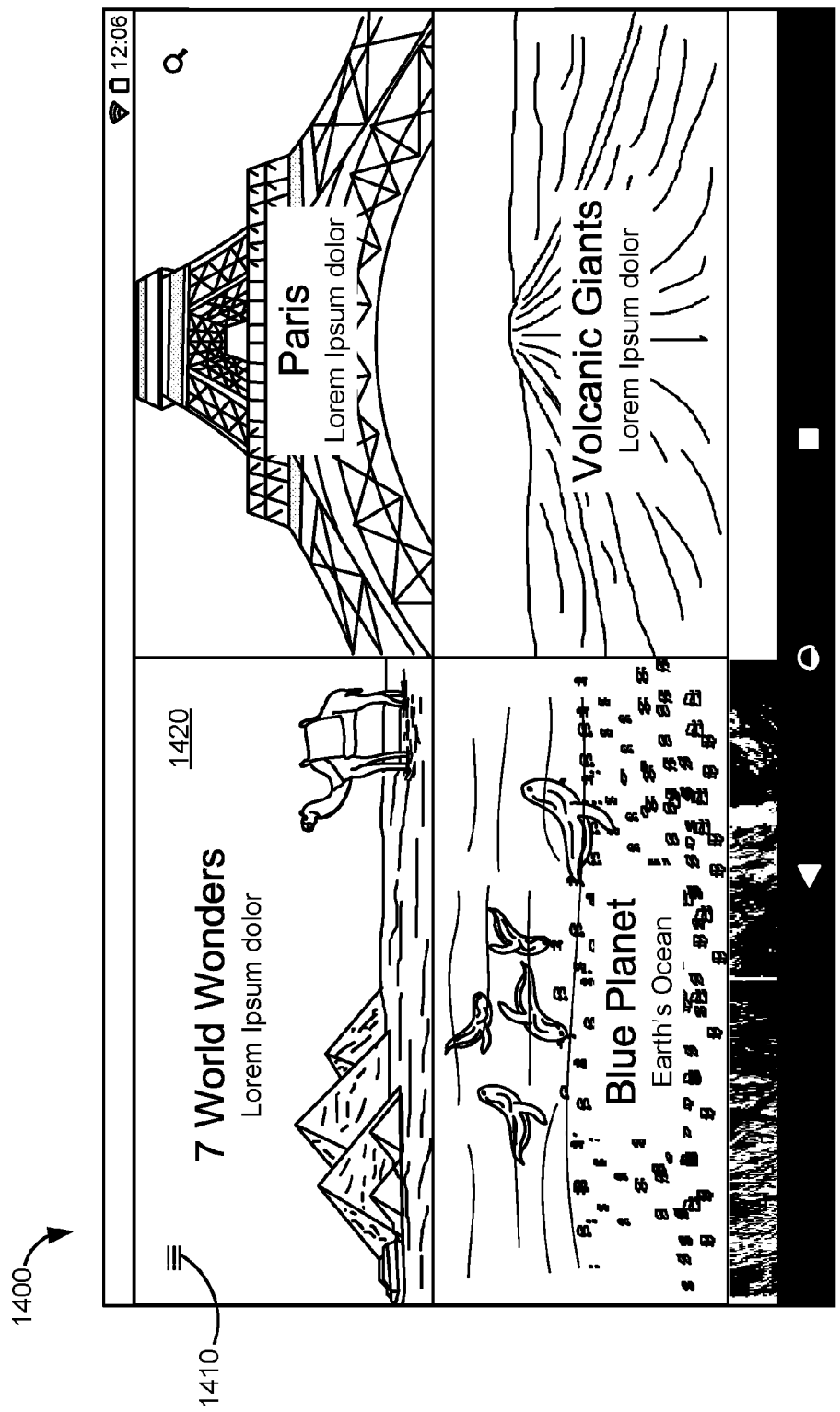
FIGS. 14A, 14B, 14C, 14D and 14E are diagrams illustrating another user interface for selecting a VR expedition (field trip), and selecting and/or presenting a panorama (photosphere) within the selected VR expedition, according to an implementation.

FIGS. 14A, 14B, 14C, 14D and 14E are diagrams illustrating another user interface 1400 for selecting and/or presenting a VR expedition (a VR field trip) and a panorama (or photosphere) within the selected VR expedition, according to an implementation. As shown in FIG. 14A, the user interface 1400 can include the main menu activation icon 1410 and the plurality of preview images for available expeditions, including the preview image 1420 for a 7 World Wonders VR expedition. In some implementations, the plurality of preview images can be scrolled (e.g., up and down, or left and right) so as to view other available VR expeditions.

Figure 14B:
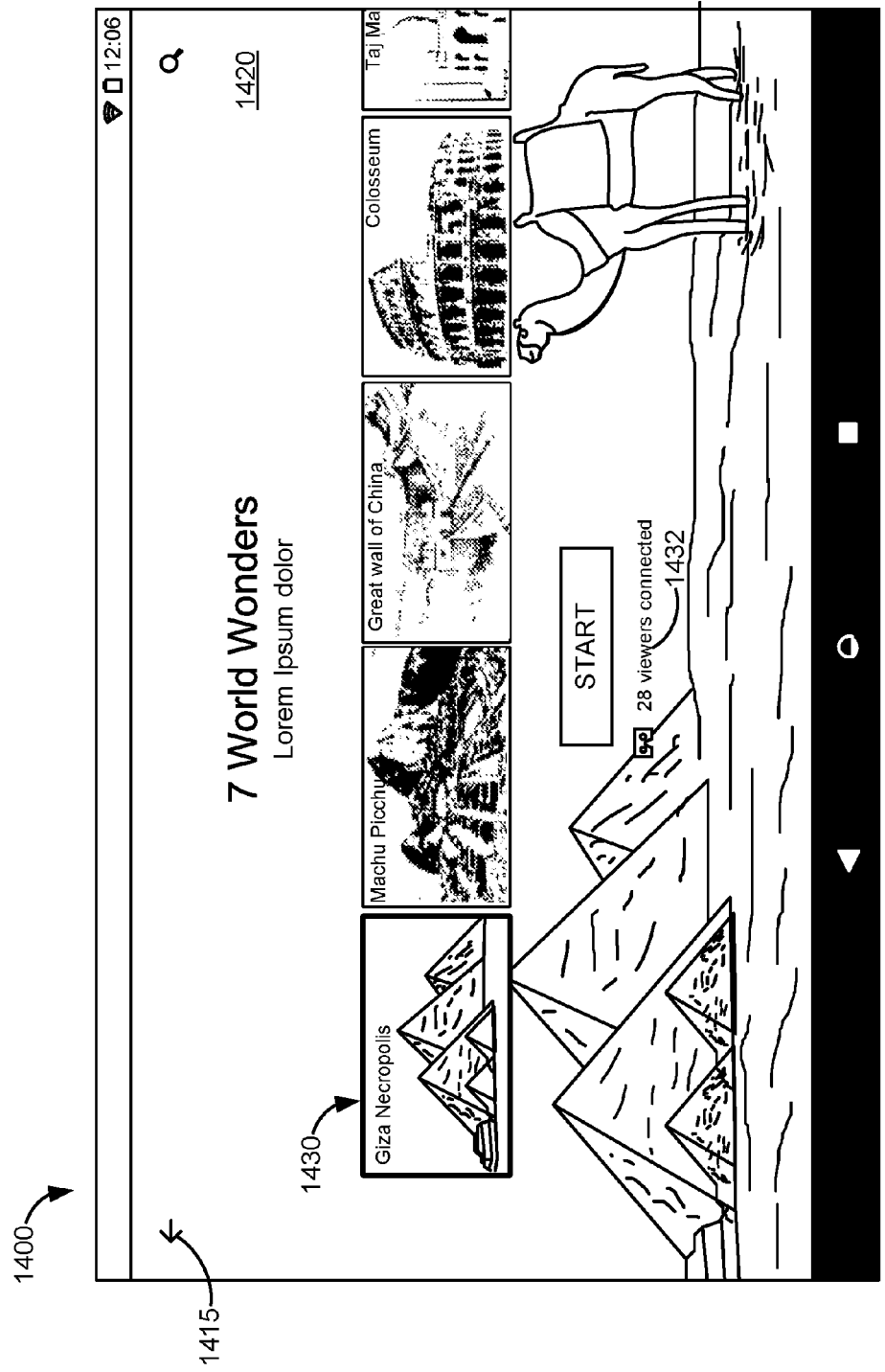

FIG. 14B illustrates the user interface 1400 after selection of the preview image 1420 as shown in FIG. 14A. The user interface 1400 in FIG. 14B includes a back icon 1415 (which may result in the user interface 1400 returning to the plurality of VR expedition preview pictures shown in FIG. 14 A), a menu 1430 of preview pictures for available VR panoramas or photospheres for the selected VR expedition an indicator 1432 of a number of students connected with the VR expedition.

Figure 14C:
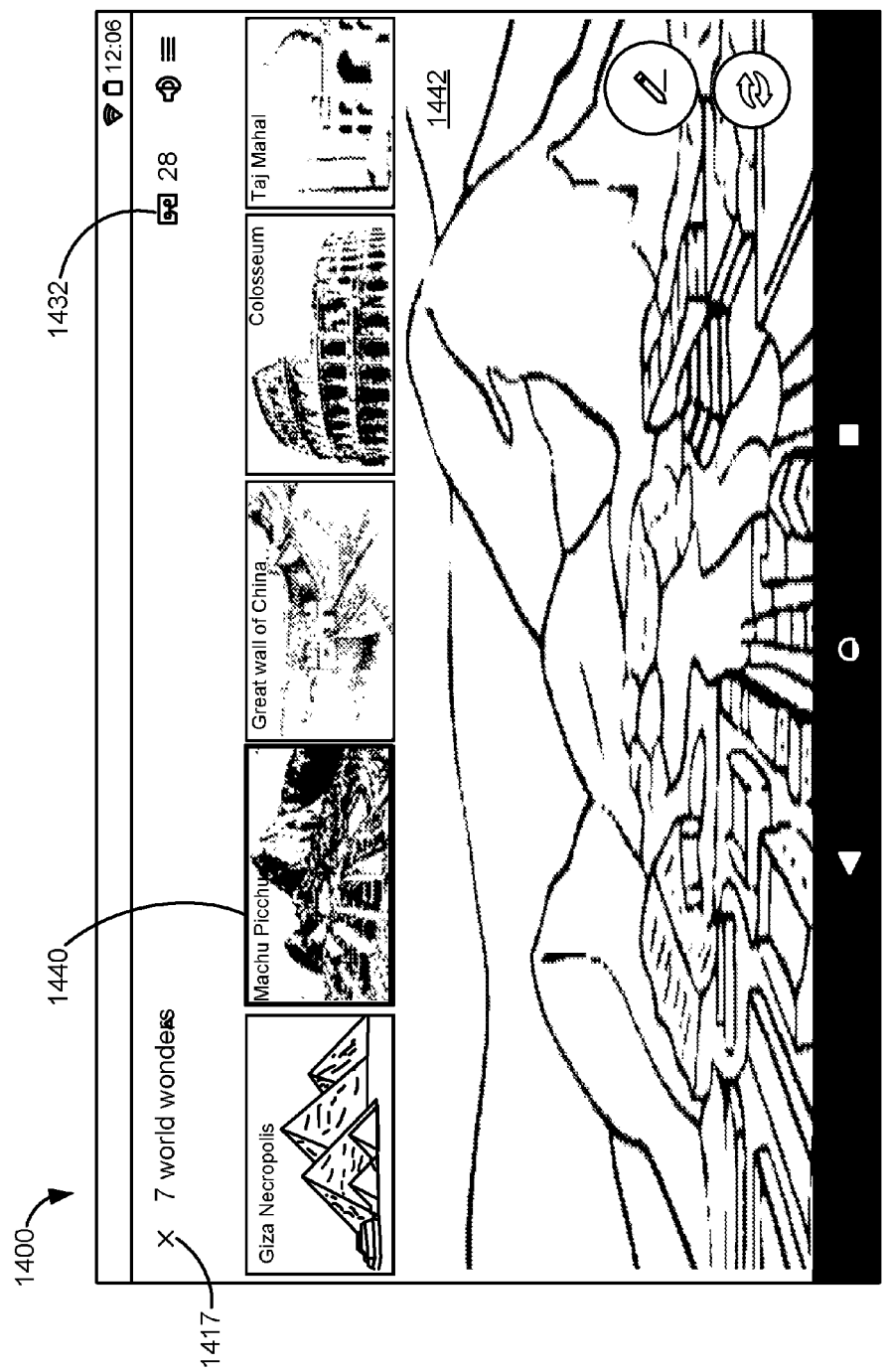

In FIG. 14C, the user interface 1400 is shown after highlighting the preview picture 1440 for the Machu Picchu VR panorama or photosphere within the 7 World Wonders VR expedition. The user interface 1400, as shown in FIG. 14 C, includes an exit icon 1417 that may cause the user interface 1400 to return to the VR expedition selection screen shown in FIG. 14 A. Additionally in FIG. 14C, a larger preview picture 1442 is loaded in response to highlighting of the preview picture 1440. Also in FIG. 14C, the indicator 1432 showing the number of explorer devices connected with the VR expedition is moved to the upper right corner of the user interface 1400 from the center of the user interface 1400, as was shown in FIG. 14A.

Figure 14D:
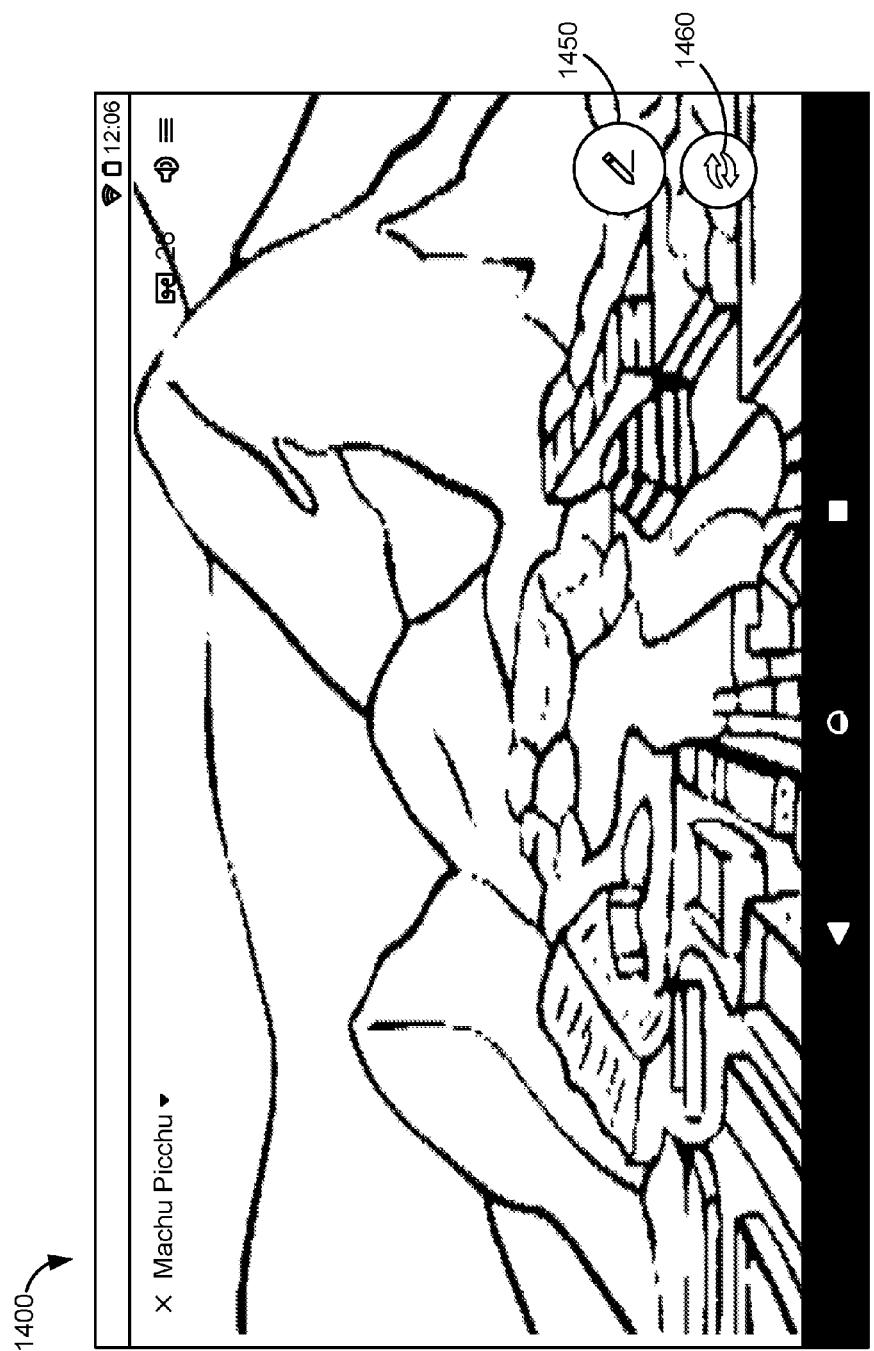
Figure 14E:
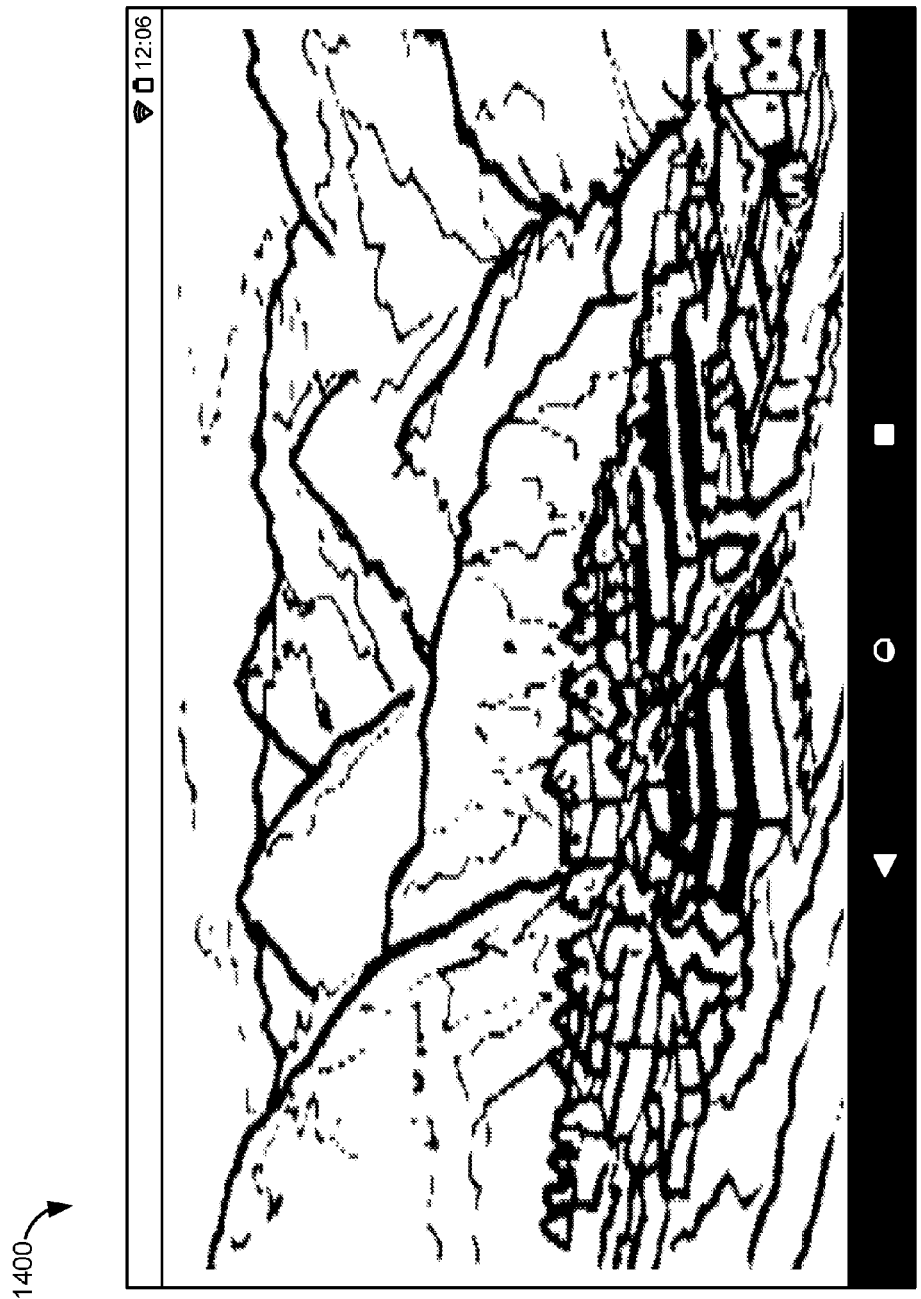

After starting/loading the Machu Picchu VR panorama or photosphere (e.g., using a start button not shown in FIG. 14 C), the user interface 1400 may appear as shown in FIG. 14D. The user interface 1400, as shown in FIG. 14D, includes a button 1450 that may be used to enable/disable entry of handwritten notations on the selected VR panorama or photosphere. The user interface 1400 in FIG. 14D also includes a button 1460 that may be used to enable/disable auto-panning of the selected VR panorama or photosphere on explorer devices 120 participating in the VR expedition. FIG. 14E illustrates the user interface 1400 with the menu item along the top of the user interface 1400, as well as the buttons 1450 and 1460 hidden (e.g., after an auto-hide timeout period has expired).

Figure 15B:
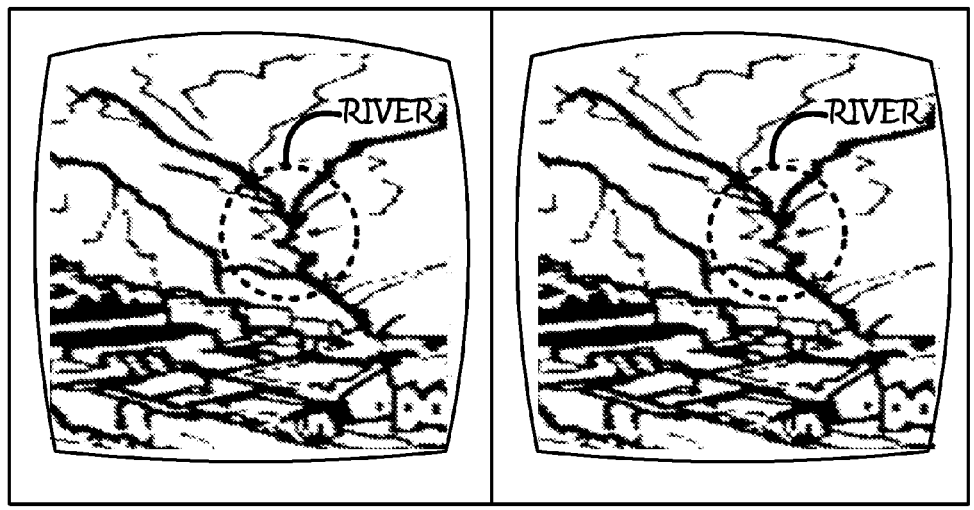

FIGS. 15A and 15B are diagrams illustrating a user interface 1500 and 1550 for presenting hand-written notations in a VR expedition, according to an implementation. FIG. 15A shows the user interface 1500 with a handwritten notation of "RIVER" with a circle indicating the river, as such a notation may be displayed on the guide device 110 of the system 100. FIG. 15B shows a stereoscopic user interface image 1550 with the handwritten notation of FIG. 15A as it may be displayed on explorer devices 120 associated with a corresponding VR expedition.

Figure 16A:
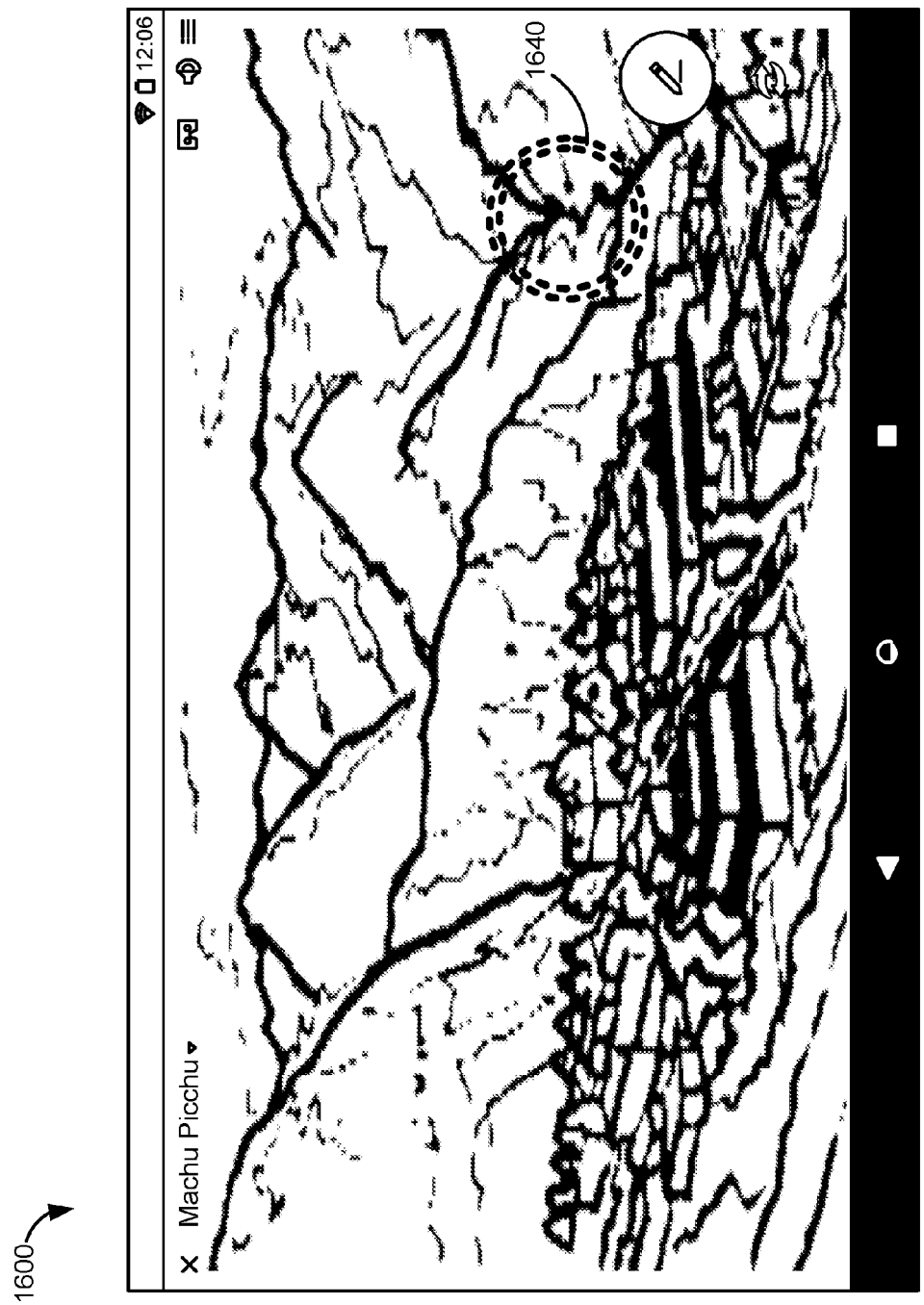
FIGS. 16A and 16B are diagrams illustrating use of a touch-screen input to note points of interest in a VR expedition, according to an implementation.
Figure 16B:
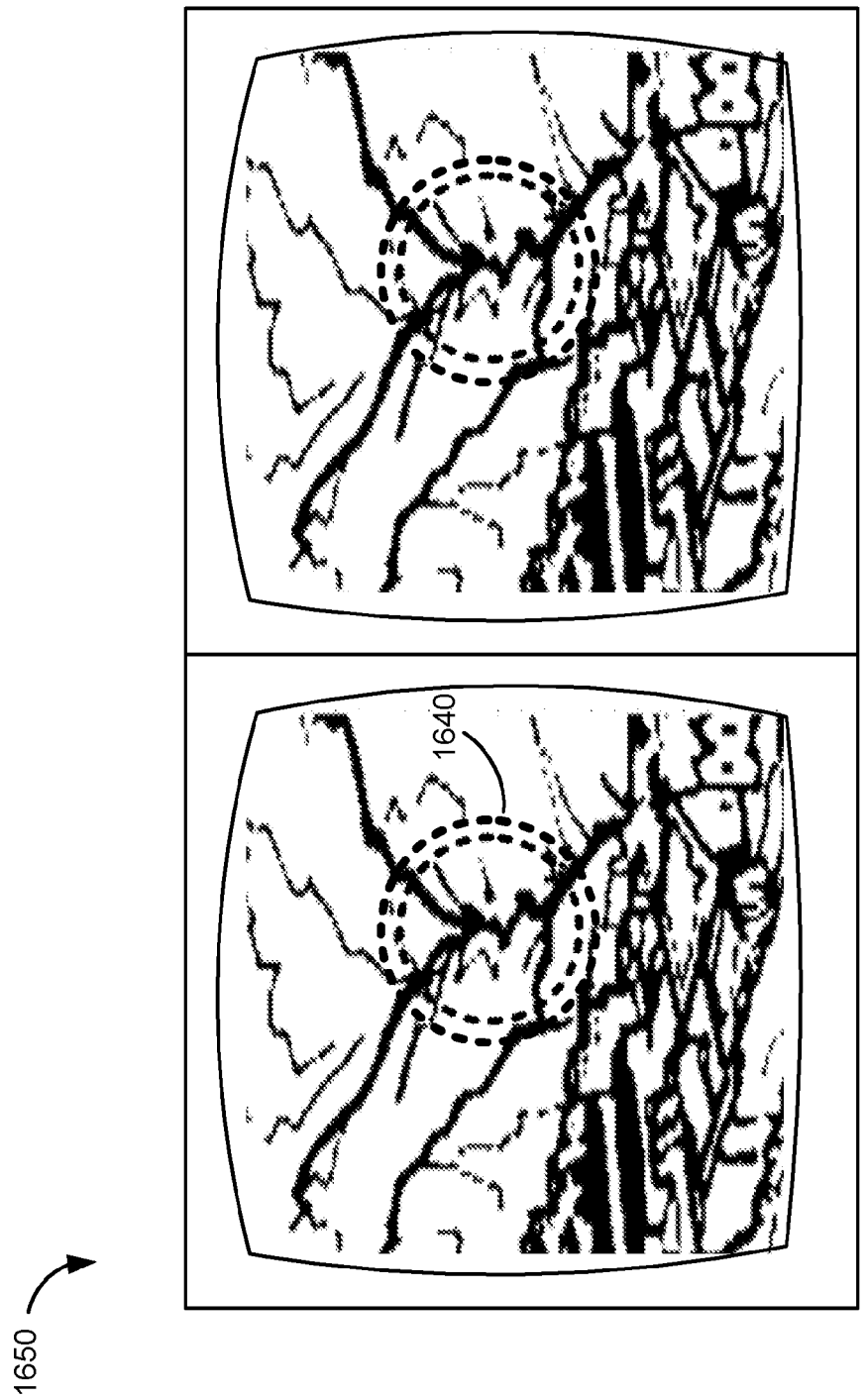

FIGS. 16A and 16B are diagrams illustrating use of a touch-screen input to note points of interest in a VR expedition, according to an implementation. In the approach illustrated in FIGS. 16A and 16B, a teacher leading a VR expedition may indicate a point of interest by interacting with a touchscreen display. For instance, the teacher may execute a "long-press" on the touchscreen display at the point of interest (e.g., the river noted in FIGS. 15A and 15B). After the long-press, the point of interest may be marked with the concentric circle site marker 1640 shown in FIG. 16 A on the guide device 110 of the system 100. FIG. 16B shows a stereoscopic user interface image 1650 with the concentric circle site marker 1640 of FIG. 16A as it may be displayed on explorer devices 120 associated with a corresponding VR expedition to indicate the point of interest. In other implementations, the site marker 1640 of FIGS. 16A and 16B may have a different appearance, such as an appearance corresponding with site markers described herein, or site markers having other appearances.

Figure 17:
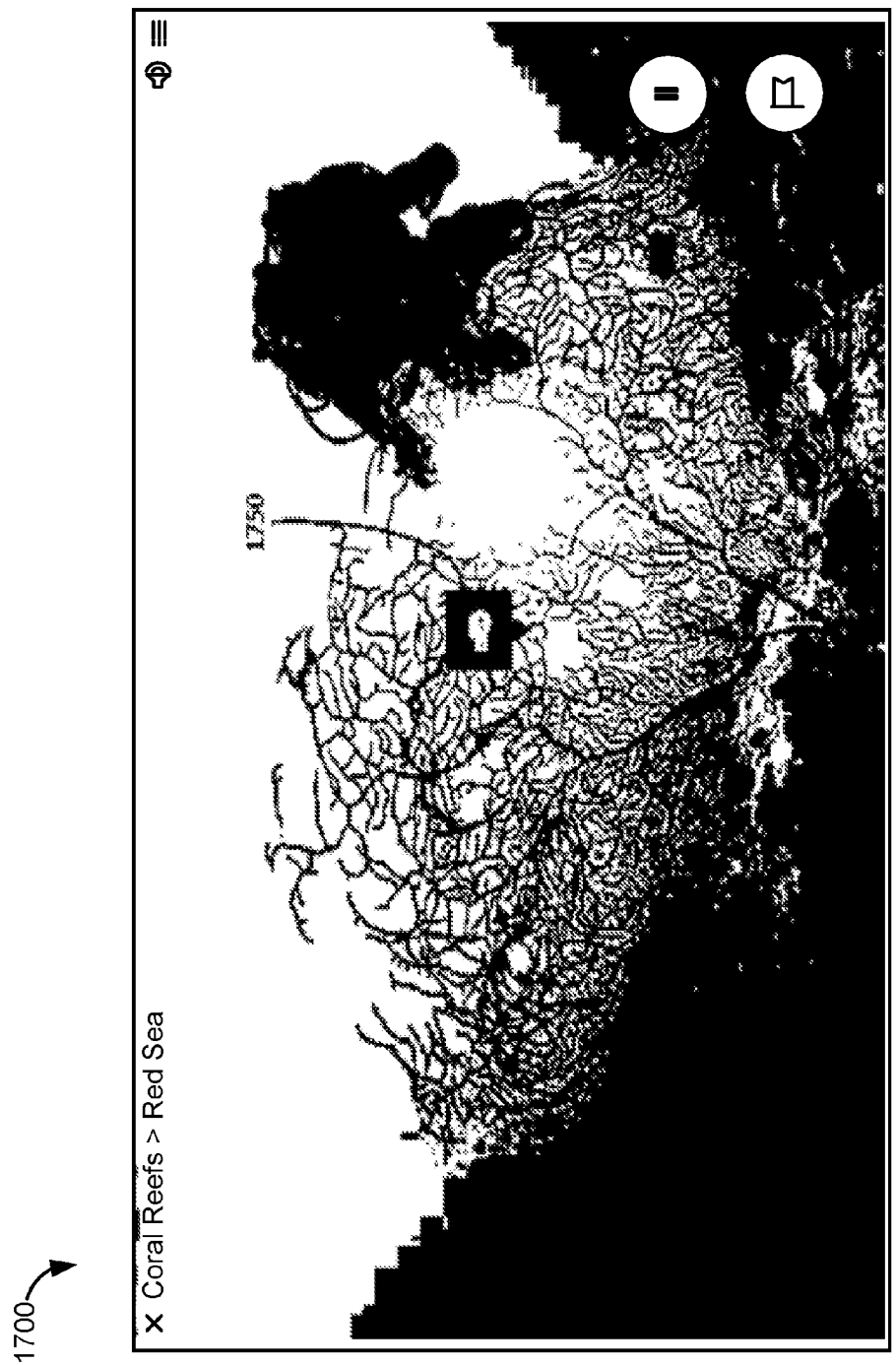
FIG. 17 is a diagram illustrating a user interface noting a point of interest in a VR expedition, according to an implementation.

FIG. 17 is a diagram illustrating a user interface 1700 that notes a point of interest in a VR expedition, according to an implementation. The point of interest in the user interface 1700 in FIG. 17 is indicated by a site marker 1750. The site marker 1750 in FIG. 17 may be added by a student (participant) experiencing a corresponding VR expedition, such as by using an input mechanism on an associated explorer device 120 (e.g., through a menu selection or other appropriate mechanism). Directional site markers and gaze indicators, such as those described herein, can also be used in conjunction with the approaches illustrated in, for example, FIGS. 11A-11H.

In a general aspect, a system can include a leader device. The leader device can include an interface configured to display a plurality of preview images, each preview image corresponding with respective virtual reality (VR) content. The leader device can also include a selection device configured to select a preview image of the plurality of preview images and a leader application configured to control presentation of the respective VR content associated with the selected preview image. The system can further include a plurality of participant devices that are operationally coupled with the leader device. Each participant device of the plurality of participant devices can be configured to, responsive to the leader device, display at least one image included in the respective VR content corresponding with the selected preview image.

Implementations can include one or more of the following features. For example, the at least one image can include a three-dimensional (3D) panorama. The at least one image can include a 3D photosphere.

The system can include a data network router. The plurality of participant devices can be operationally coupled with the leader device via the data network router. The leader device can include a wireless data network interface. The plurality of participant devices can be operationally coupled with the leader device via the wireless data network interface.

The system can include at least one audio device that is configured to, responsive to the leader device, play audio content of the selected VR content associated with the selected preview image. The at least one audio device can be wirelessly coupled with the leader device. The at least one audio device can include a plurality of audio devices. Each audio device of the plurality of audio devices can be included in a respective participant device of the plurality of participant devices.

The interface can be configured, during presentation of the respective VR content associated with the selected preview image, to display a plurality of gaze indicators. Each gaze indicator of the plurality of gaze indicators can correspond with a respective participant device of the plurality of participant devices and indicating a location in the respective VR content associated with the selected preview image where a user of the respective participant is currently looking.

Each of the participant devices can include a VR visual content viewer.

The interface can be configured, during presentation of the respective VR content associated with the selected preview image, to display a panel including information corresponding with the respective VR content associated with the selected preview image. The leader device can be further configured to facilitate presentation of information from the panel. The presentation of information from the panel can include displaying a text annotation on the plurality of participant devices, playing an audio clip on at least one audio device that is operationally coupled with the leader device and/or displaying a map on the plurality of participant devices.

The interface can be configured, during presentation of the respective VR content associated with the selected preview image, to receive a selection indicating a point of interest in the respective VR content associated with the selected preview image. The plurality of participant devices can be further configured to, in response to the selection indicating the point of interest, display a marker in association with the selected point of interest. The marker, for each participant device, can indicate whether the point of interest is within or outside a respective field of view of the participant device. Receiving the selection indicating the point of interest can include receiving input on a touchscreen of the leader device within the interface. The marker can include an indication of a dwell time corresponding with the marker. The marker can be configured to disappear after expiration of the dwell time.

The system can include a container configured to store and charge the leader device and the plurality of participant devices The interface can include at least one button. Selection of a button of the at least one button on the leader device can concurrently control a corresponding function on each of the participant devices of the plurality of participant devices.

The interface can include an indication of a number of participant devices that are operationally coupled with the leader device.

In another general aspect, a system can include a leader device means, such as the leader device means illustrated in FIGS. 1 and 4 and described above. The leader device means can include an interface means for displaying a plurality of preview images, such as the interface means illustrated in FIGS. 6A-10C and 14A-17 and described herein. Each preview image can correspond with respective virtual reality (VR) content. The leader device means can further include a selection means, such as the selection means described herein, including a touchscreen, mouse, trackpad, etc., for selecting a preview image of the plurality of preview images. The leader device means can still further include a leader application means for controlling presentation of the respective VR content associated with the selected preview image, as such as leader (guide) application 112 illustrated in FIG. 4 and described herein. The system can also include a plurality of participant device means that are operationally coupled with the leader device means, such as the participant (explorer) devices illustrated in FIGS. 1 and 5 and described herein. Each participant device means of the plurality of participant device means for, responsive to the leader device means, displaying at least one image included in the respective VR content corresponding with the selected preview image.

Implementations can include one or more of the following features. For example, the system can include a data networking means for operationally coupling the plurality of participant device means with the leader device means, such as shown in FIG. 1 and described herein. The system can include an audio device means for, responsive to the leader device means, playing audio content of the selected VR content associated with the selected preview image, such as the audio devices described herein and illustrated, e.g., in FIG. 1.

Figure 18:
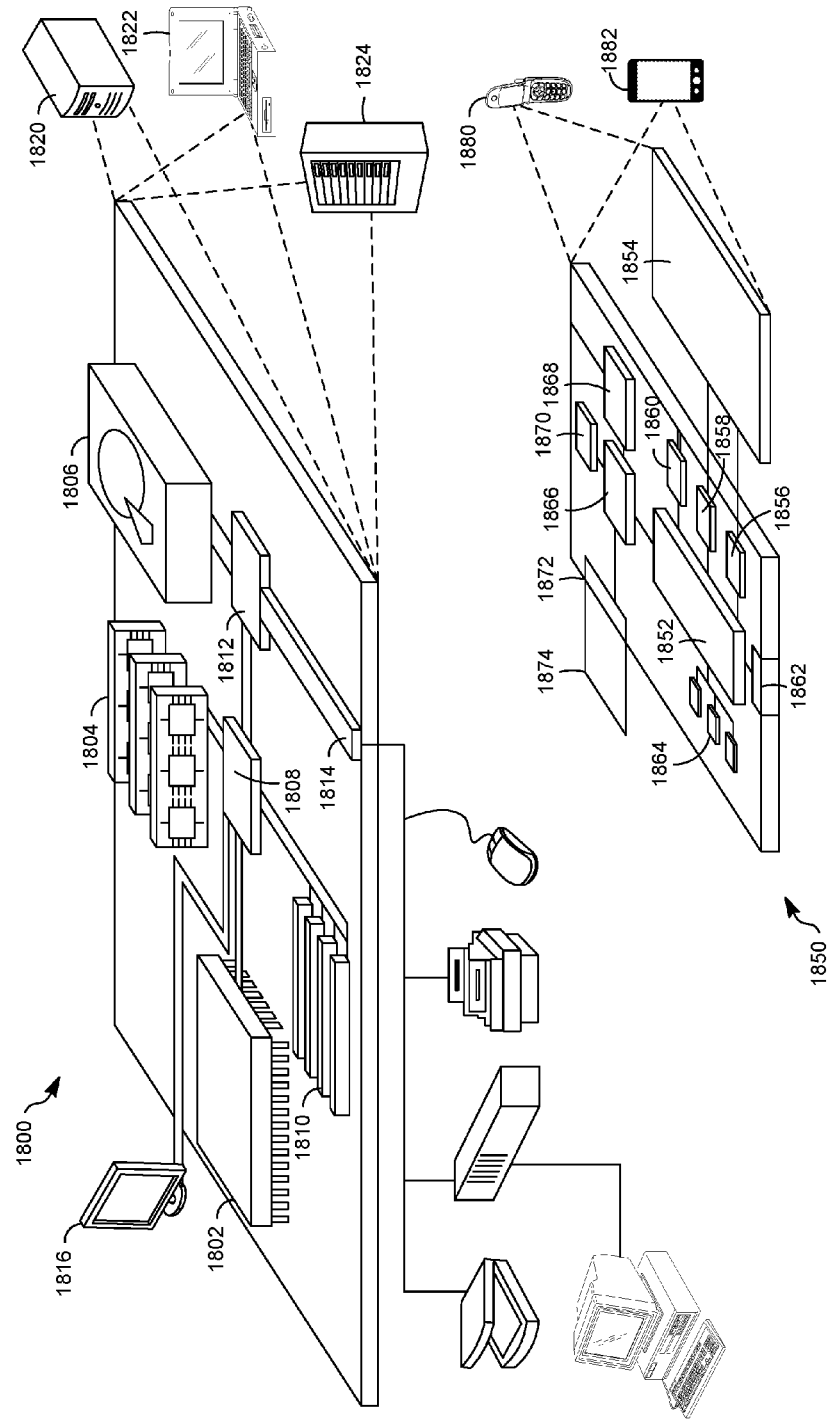
FIG. 18 shows an example of a computer device and a mobile computer device that can be used to implement the techniques described here.

FIG. 18 shows an example of a generic computer device 1800 and a generic mobile computer device 1850, which may be used with the techniques described here. Computing device 1800 is intended to represent various forms of digital computers, such as laptops, desktops, workstations, personal digital assistants, servers, blade servers, mainframes, and other appropriate computers. Computing device 1850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1800 includes a processor 1802, memory 1804, a storage device 1806, a high-speed interface 1808 connecting to memory 1804 and high-speed expansion ports 1810, and a low speed interface 1812 connecting to low speed bus 1814 and storage device 1806. Each of the components 1802, 1804, 1806, 1808, 1810, and 1812, are interconnected using various busses, and may be mounted on a common motherboard or in other manners as appropriate. The processor 1802 can process instructions for execution within the computing device 1800, including instructions stored in the memory 1804 or on the storage device 1806 to display graphical information for a GUI on an external input/output device, such as display 1816 coupled to high speed interface 1808. In other implementations, multiple processors and/or multiple buses may be used, as appropriate, along with multiple memories and types of memory. Also, multiple computing devices 1800 may be connected, with each device providing portions of the necessary operations (e.g., as a server bank, a group of blade servers, or a multi-processor system).

The memory 1804 stores information within the computing device 1800. In one implementation, the memory 1804 is a volatile memory unit or units. In another implementation, the memory 1804 is a non-volatile memory unit or units. The memory 1804 may also be another form of computer-readable medium, such as a magnetic or optical disk.

The storage device 1806 is capable of providing mass storage for the computing device 1800. In one implementation, the storage device 1806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1804, the storage device 1806, or memory on processor 1802.

The high speed controller 1808 manages bandwidth-intensive operations for the computing device 1800, while the low speed controller 1812 manages lower bandwidth-intensive operations. Such allocation of functions is exemplary only. In one implementation, the high-speed controller 1808 is coupled to memory 1804, display 1816 (e.g., through a graphics processor or accelerator), and to high-speed expansion ports 1810, which may accept various expansion cards (not shown). In the implementation, low-speed controller 1812 is coupled to storage device 1806 and low-speed expansion port 1814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1800 may be implemented in a number of different forms, as shown in the figure. For example, it may be implemented as a standard server 1820, or multiple times in a group of such servers. It may also be implemented as part of a rack server system 1824. In addition, it may be implemented in a personal computer such as a laptop computer 1822. Alternatively, components from computing device 1800 may be combined with other components in a mobile device (not shown), such as device 1850. Each of such devices may contain one or more of computing device 1800, 1850, and an entire system may be made up of multiple computing devices 1800, 1850 communicating with each other.

Computing device 1850 includes a processor 1852, memory 1864, an input/output device such as a display 1854, a communication interface 1866, and a transceiver 1868, among other components. The device 1850 may also be provided with a storage device, such as a microdrive or other device, to provide additional storage. Each of the components 1850, 1852, 1864, 1854, 1866, and 1868, are interconnected using various buses, and several of the components may be mounted on a common motherboard or in other manners as appropriate.

The processor 1852 can execute instructions within the computing device 1850, including instructions stored in the memory 1864. The processor may be implemented as a chipset of chips that include separate and multiple analog and digital processors. The processor may provide, for example, for coordination of the other components of the device 1850, such as control of user interfaces, applications run by device 1850, and wireless communication by device 1850.

Processor 1852 may communicate with a user through control interface 1858 and display interface 1856 coupled to a display 1854. The display 1854 may be, for example, a TFT LCD (Thin-Film-Transistor Liquid Crystal Display) or an OLED (Organic Light Emitting Diode) display, or other appropriate display technology. The display interface 1856 may comprise appropriate circuitry for driving the display 1854 to present graphical and other information to a user. The control interface 1858 may receive commands from a user and convert them for submission to the processor 1852. In addition, an external interface 1862 may be provide in communication with processor 1852, so as to enable near area communication of device 1850 with other devices. External interface 1862 may provide, for example, for wired communication in some implementations, or for wireless communication in other implementations, and multiple interfaces may also be used.

The memory 1864 stores information within the computing device 1850. The memory 1864 can be implemented as one or more of a computer-readable medium or media, a volatile memory unit or units, or a non-volatile memory unit or units. Expansion memory 1874 may also be provided and connected to device 1850 through expansion interface 1872, which may include, for example, a SIMM (Single In Line Memory Module) card interface. Such expansion memory 1874 may provide extra storage space for device 1850, or may also store applications or other information for device 1850. Specifically, expansion memory 1874 may include instructions to carry out or supplement the processes described above, and may include secure information also. Thus, for example, expansion memory 1874 may be provide as a security module for device 1850, and may be programmed with instructions that permit secure use of device 1850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1864, expansion memory 1874, or memory on processor 1852, that may be received, for example, over transceiver 1868 or external interface 1862.

Device 1850 may communicate wirelessly through communication interface 1866, which may include digital signal processing circuitry where necessary. Communication interface 1866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1868. In addition, short-range communication may occur, such as using a Bluetooth, Wi-Fi, or other such transceiver (not shown). In addition, GPS (Global Positioning System) receiver module 1870 may provide additional navigation- and location-related wireless data to device 1850, which may be used as appropriate by applications running on device 1850.

Device 1850 may also communicate audibly using audio codec 1860, which may receive spoken information from a user and convert it to usable digital information. Audio codec 1860 may likewise generate audible sound for a user, such as through a speaker, e.g., in a handset of device 1850. Such sound may include sound from voice telephone calls, may include recorded sound (e.g., voice messages, music files, etc.) and may also include sound generated by applications operating on device 1850.

The computing device 1850 may be implemented in a number of different forms, as shown in the figure. For example, it may be implemented as a cellular telephone 1880. It may also be implemented as part of a smart phone 1882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
   a leader device; and
   a plurality of participant devices that are operationally coupled with the leader device,
   the leader device including:
      an interface configured to display a plurality of preview images, each preview image corresponding with respective virtual reality (VR) content;
      a selection device configured to select a preview image of the plurality of preview images; and
      a leader application configured to:
         control presentation of the respective VR content associated with the selected preview image on the leader device and the plurality of participant devices; and
         control at least one function of each of the plurality of participant devices,
   each participant device of the plurality of participant devices being configured to, responsive to the control of the leader device, display at least one image included in the respective VR content corresponding with the selected preview image.

2. The system of claim 1, where the at least one image includes one of a three-dimensional (3D) panorama and a 3D photosphere.

3. The system of claim 1, further comprising a data network router, the plurality of participant devices being operationally coupled with the leader device via the data network router.

4. The system of claim 1, wherein the leader device further includes a wireless data network interface, the plurality of participant devices being operationally coupled with the leader device via the wireless data network interface.

5. The system of claim 1, further comprising at least one audio device that is configured to, responsive to the leader device, play audio content of the selected VR content associated with the selected preview image.

6. The system of claim 5, wherein the at least one audio device is wirelessly coupled with the leader device.

7. The system of claim 5, wherein the at least one audio device includes a plurality of audio devices, each audio device of the plurality of audio devices being included in a respective participant device of the plurality of participant devices.

8. The system of claim 1, wherein the interface is further configured, during presentation of the respective VR content associated with the selected preview image, to display a plurality of gaze indicators, each gaze indicator of the plurality of gaze indicators corresponding with a respective participant device of the plurality of participant devices and indicating a location in the respective VR content associated with the selected preview image where a user of the respective participant is currently looking.

9. The system of claim 1, wherein each of the participant devices includes a VR visual content viewer.

10. The system of claim 1, wherein the interface is further configured, during presentation of the respective VR content associated with the selected preview image, to display a panel including information corresponding with the respective VR content associated with the selected preview image.

11. The system of claim 10, wherein the leader device is further configured to facilitate presentation of information from the panel, the presentation of information from the panel including at least one of:
displaying a text annotation on the plurality of participant devices;
playing an audio clip on at least one audio device that is operationally coupled with the leader device; and
displaying a map on the plurality of participant devices.

12. The system of claim 1, wherein:
the interface is further configured, during presentation of the respective VR content associated with the selected preview image, to receive a selection indicating a point of interest in the respective VR content associated with the selected preview image; and
the plurality of participant devices are further configured to, in response to the selection indicating the point of interest, display a marker in association with the selected point of interest.

13. The system of claim 12, wherein the marker, for each participant device, indicates whether the point of interest is within or outside a respective field of view of the participant device.

14. The system of claim 12, wherein receiving the selection indicating the point of interest includes receiving input on a touchscreen of the leader device within the interface.

15. The system of claim 12, wherein the marker includes an indication of a dwell time corresponding with the marker, the marker disappearing after expiration of the dwell time.

16. The system of claim 1, further comprising a container configured to store and charge the leader device and the plurality of participant devices.

17. The system of claim 1, wherein the interface includes at least one button, wherein selection of a button of the at least one button on the leader device concurrently controls a corresponding function on each of the participant devices of the plurality of participant devices.

18. The system of claim 1, wherein the interface includes an indication of a number of participant devices that are operationally coupled with the leader device.

19. A system comprising:
a leader device means; and
a plurality of participant device means that are operationally coupled with the leader device,
the leader device means including:
an interface means for displaying a plurality of preview images, each preview image corresponding with respective virtual reality (VR) content;
a selection means for selecting a preview image of the plurality of preview images; and
a leader application means for:
controlling presentation of the respective VR content associated with the selected preview image on the leader device means and the plurality of participant device means; and
controlling at least one function of each participant device means of the plurality of participant device means,
each participant device means of the plurality of participant device means, responsive to the control of the leader device means, displaying at least one image included in the respective VR content corresponding with the selected preview image.

20. The system of claim 19, further comprising:
a data networking means for operationally coupling the plurality of participant device means with the leader device means; and
an audio device means for, responsive to the leader device means, playing audio content of the selected VR content associated with the selected preview image.

* * * * *